Feb. 16, 1965  M. M. ASTRAHAN ETAL  3,170,142
DATA PROCESSING MACHINE
Filed Sept. 26, 1956  38 Sheets-Sheet 16

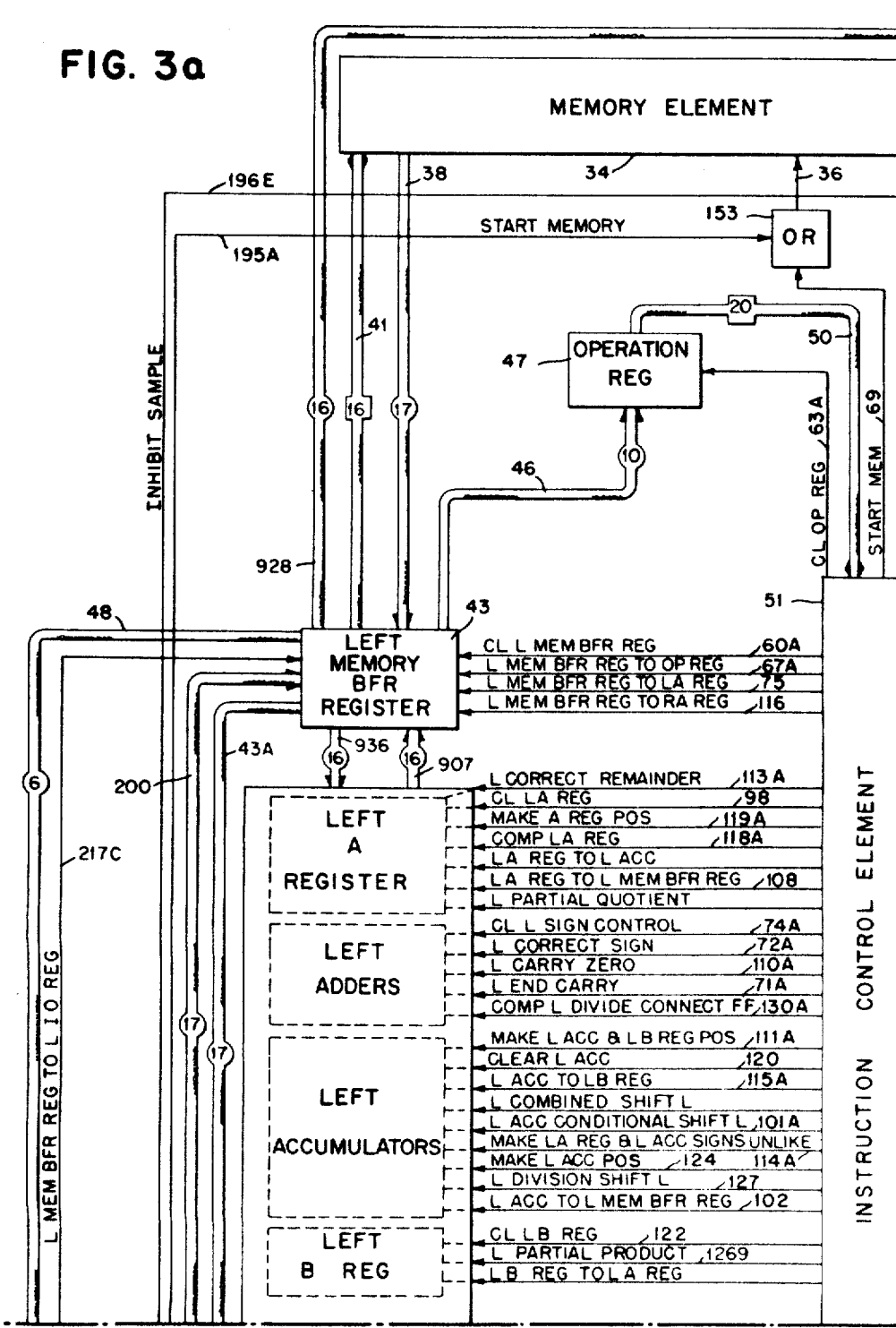

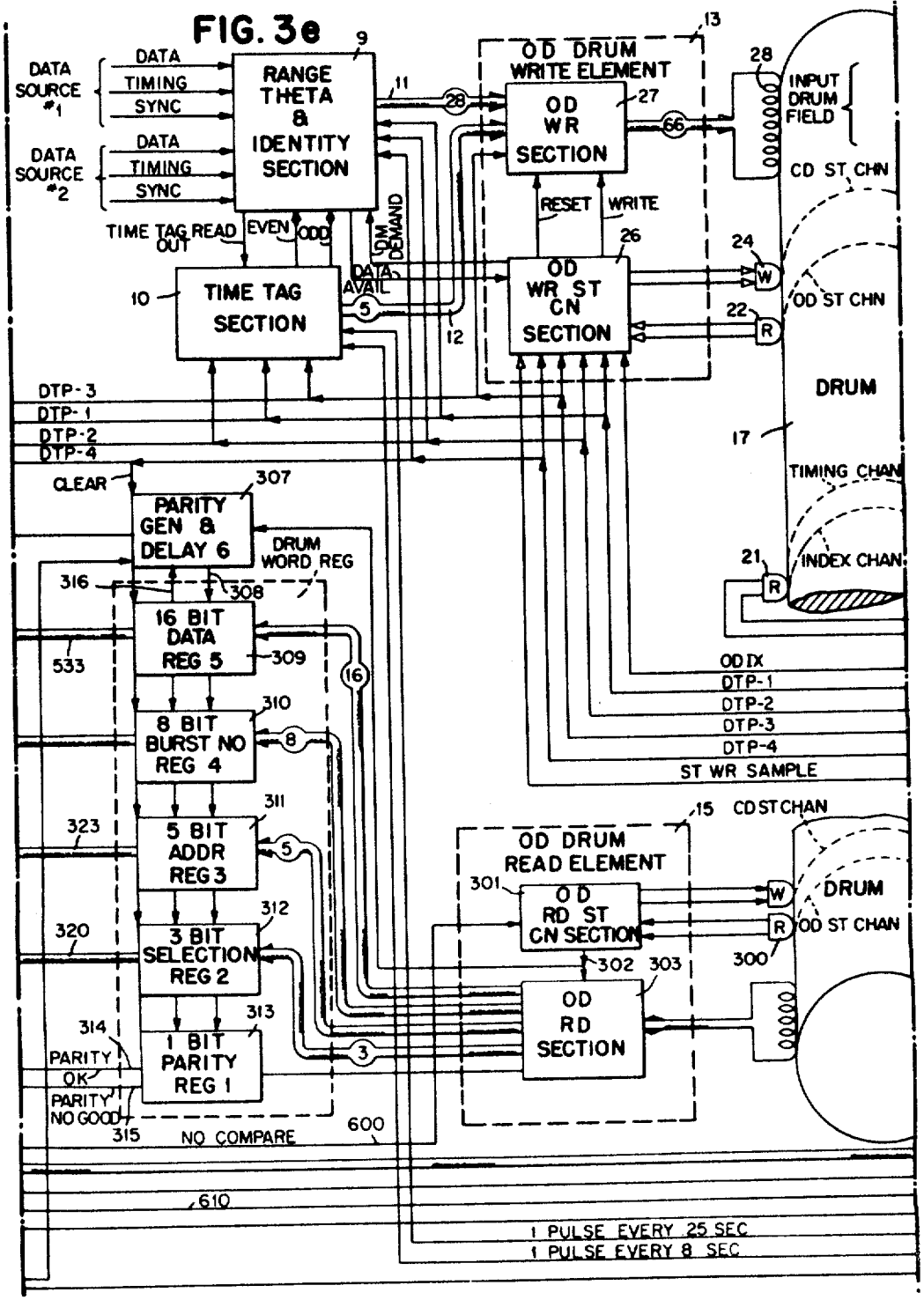

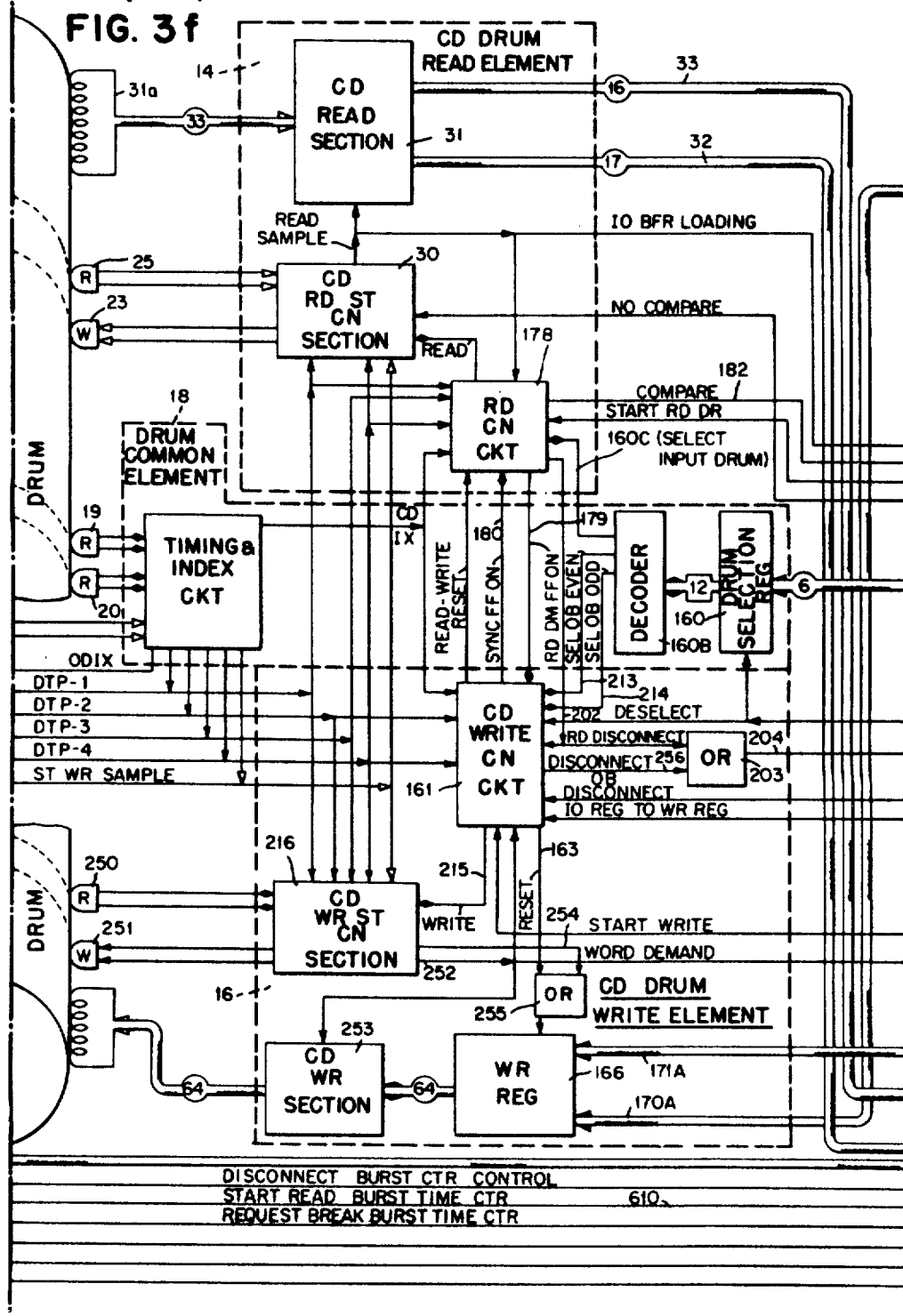

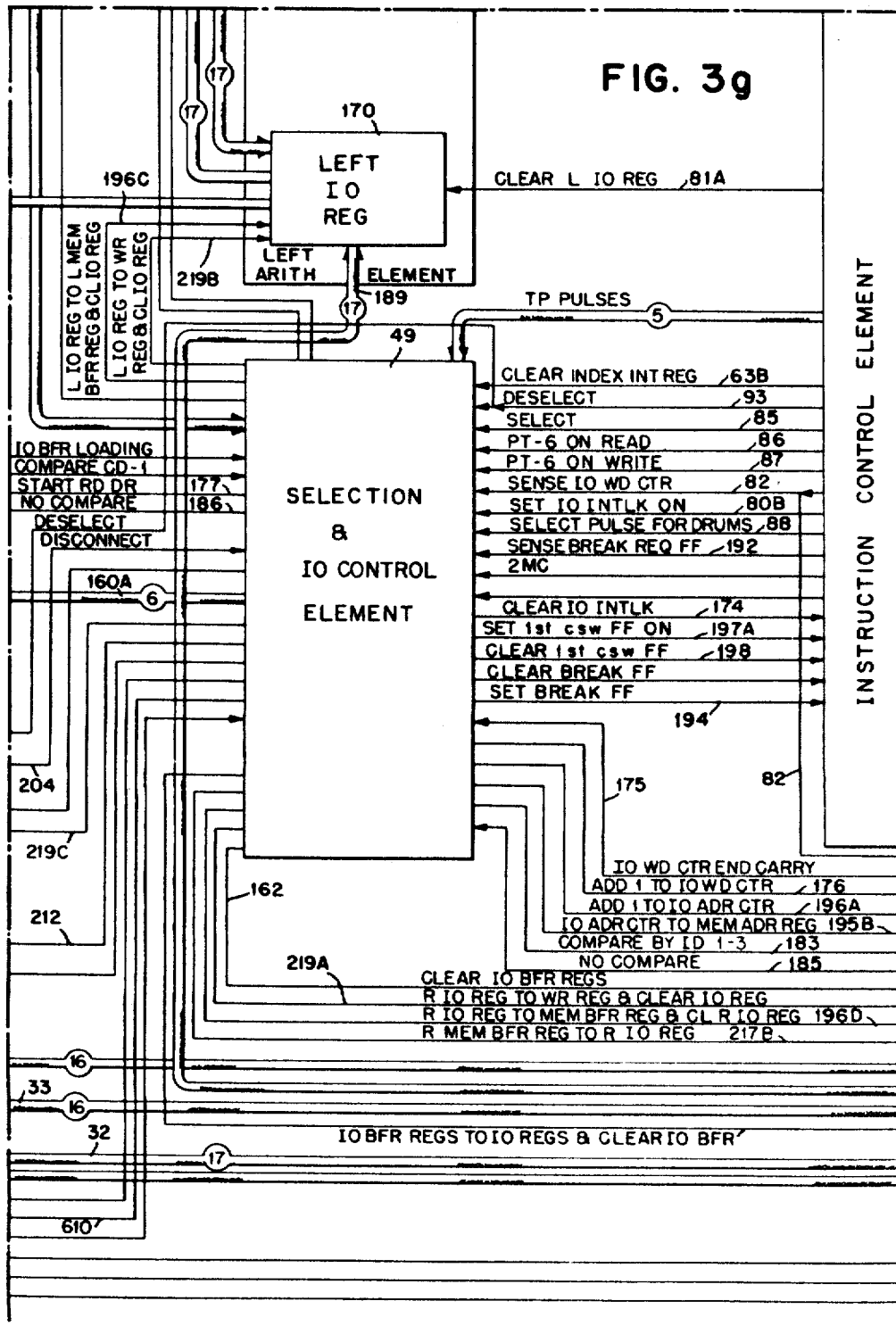

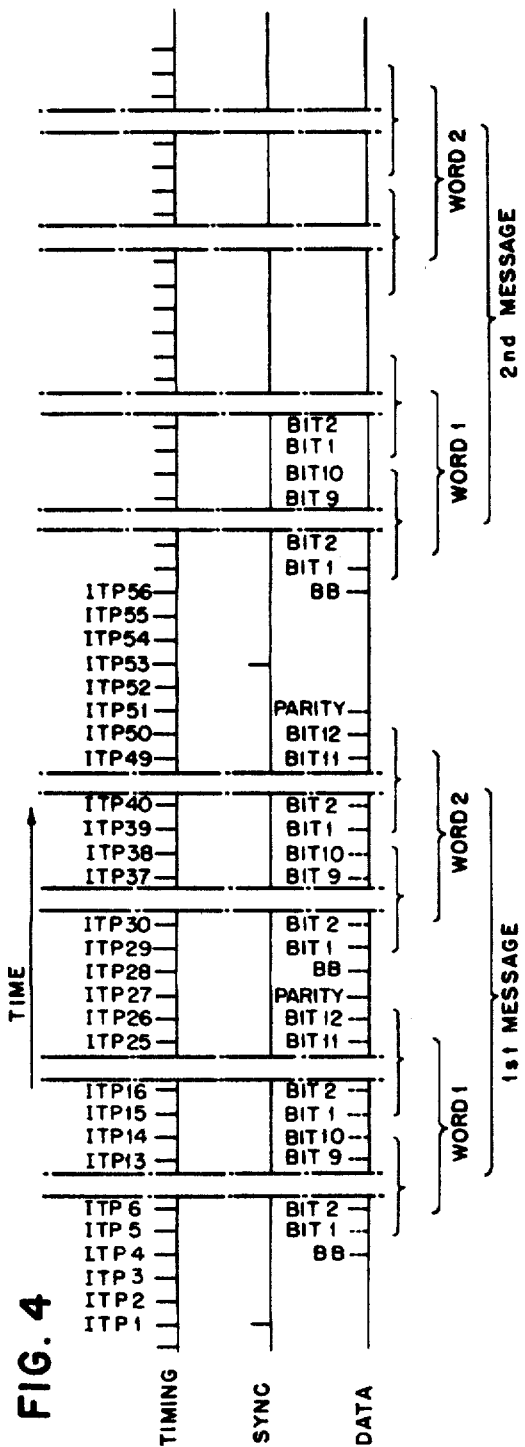
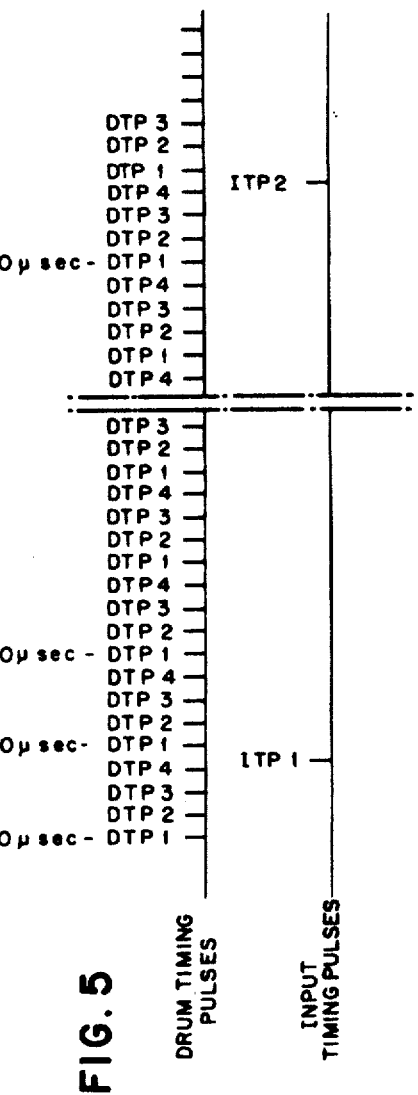
FIG. 4
FIG. 5

FIG. 11a — LOAD ADDRESS COUNTER (ldc)

FIG. 11b — SELECT DRUMS (sdr)

FIG. 11c — SELECT (sel)

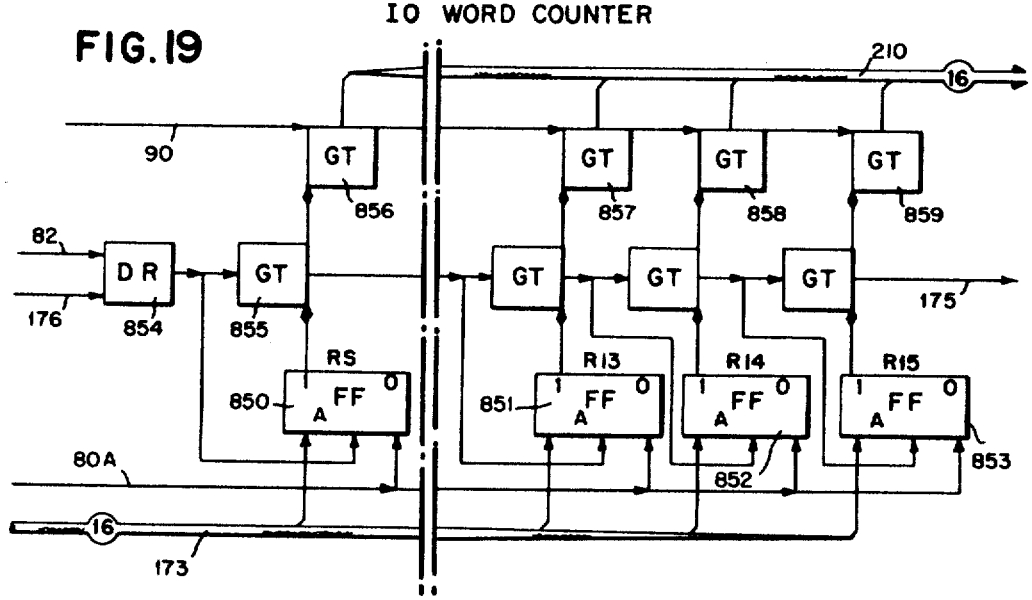
FIG.19 — IO WORD COUNTER
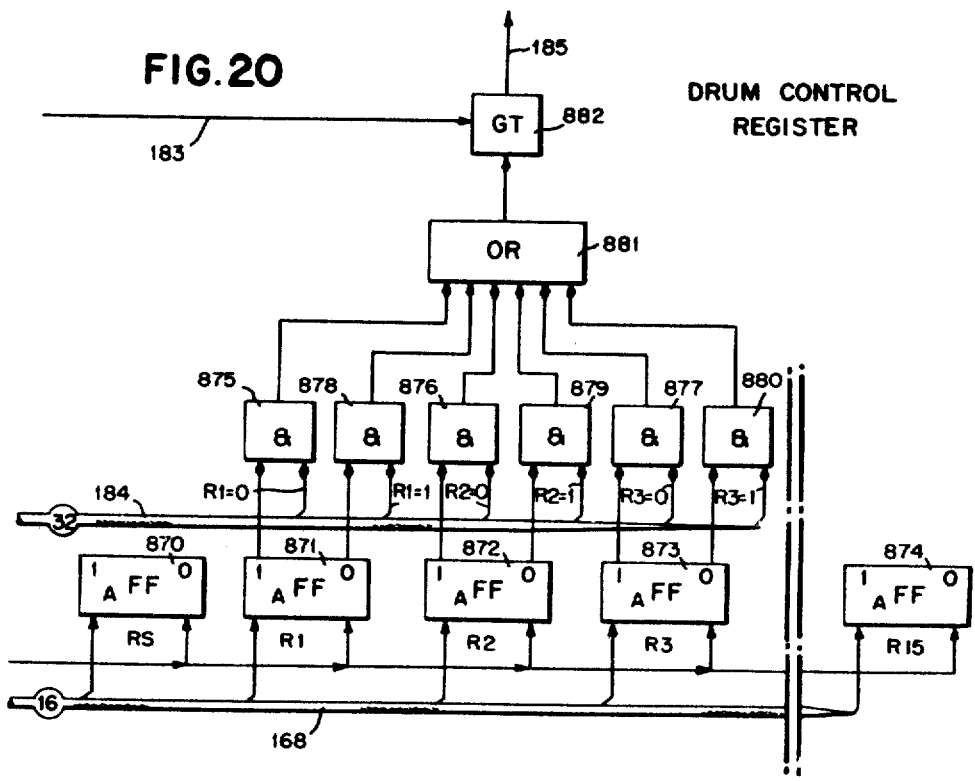
FIG.20 — DRUM CONTROL REGISTER

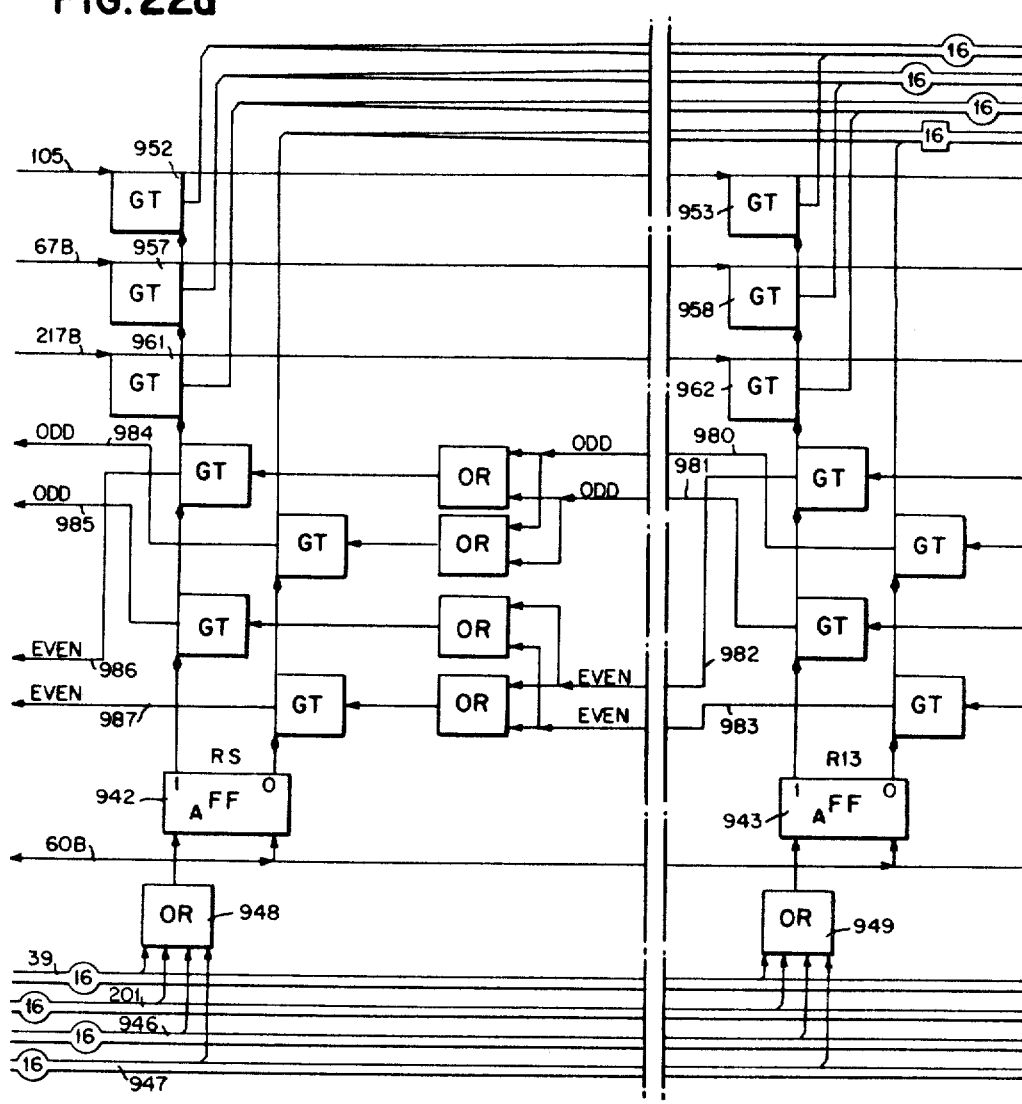
FIG. 22a  RIGHT MEMORY BUFFER REGISTER
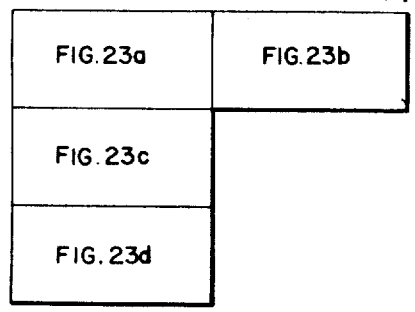
FIG. 23

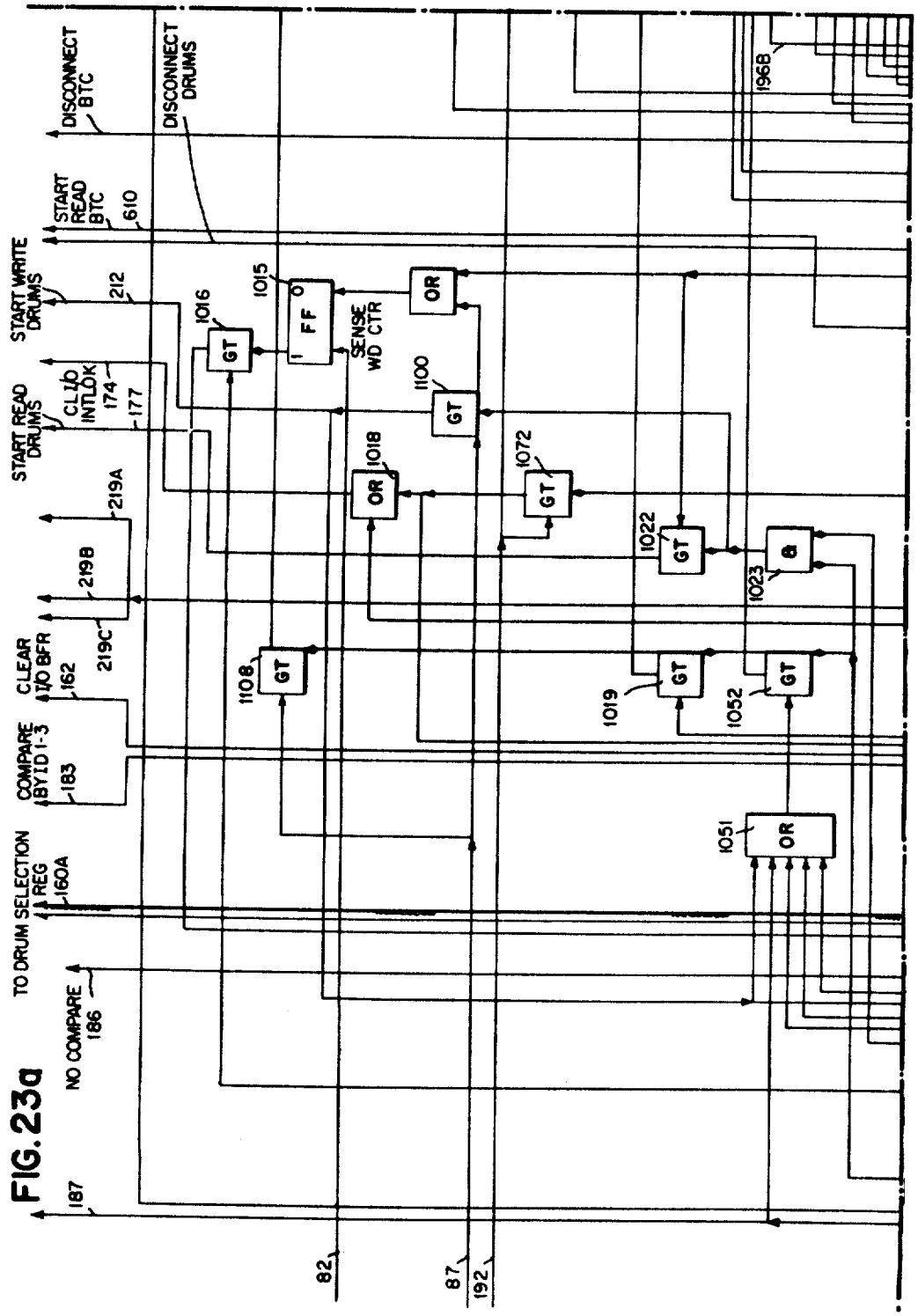

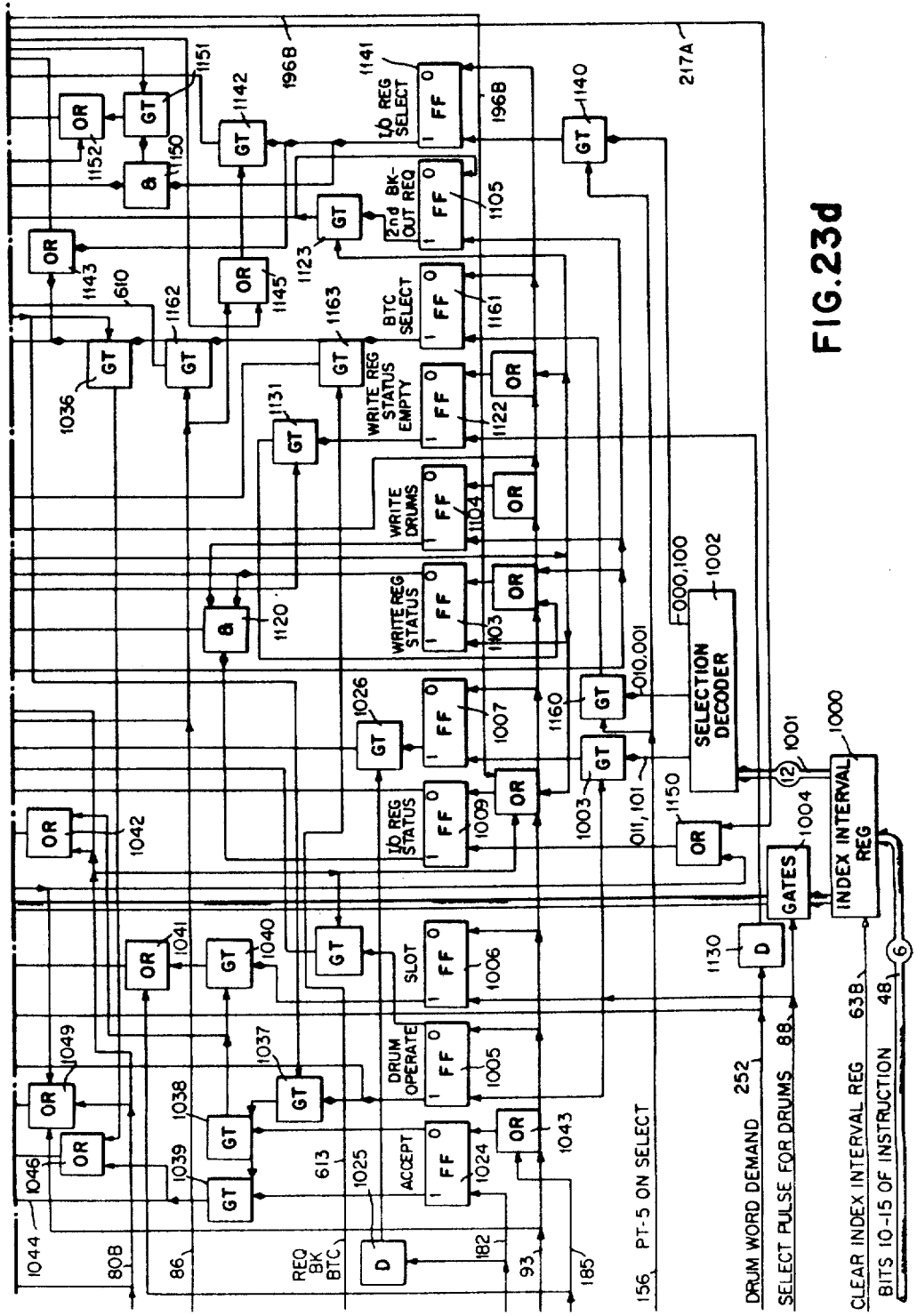

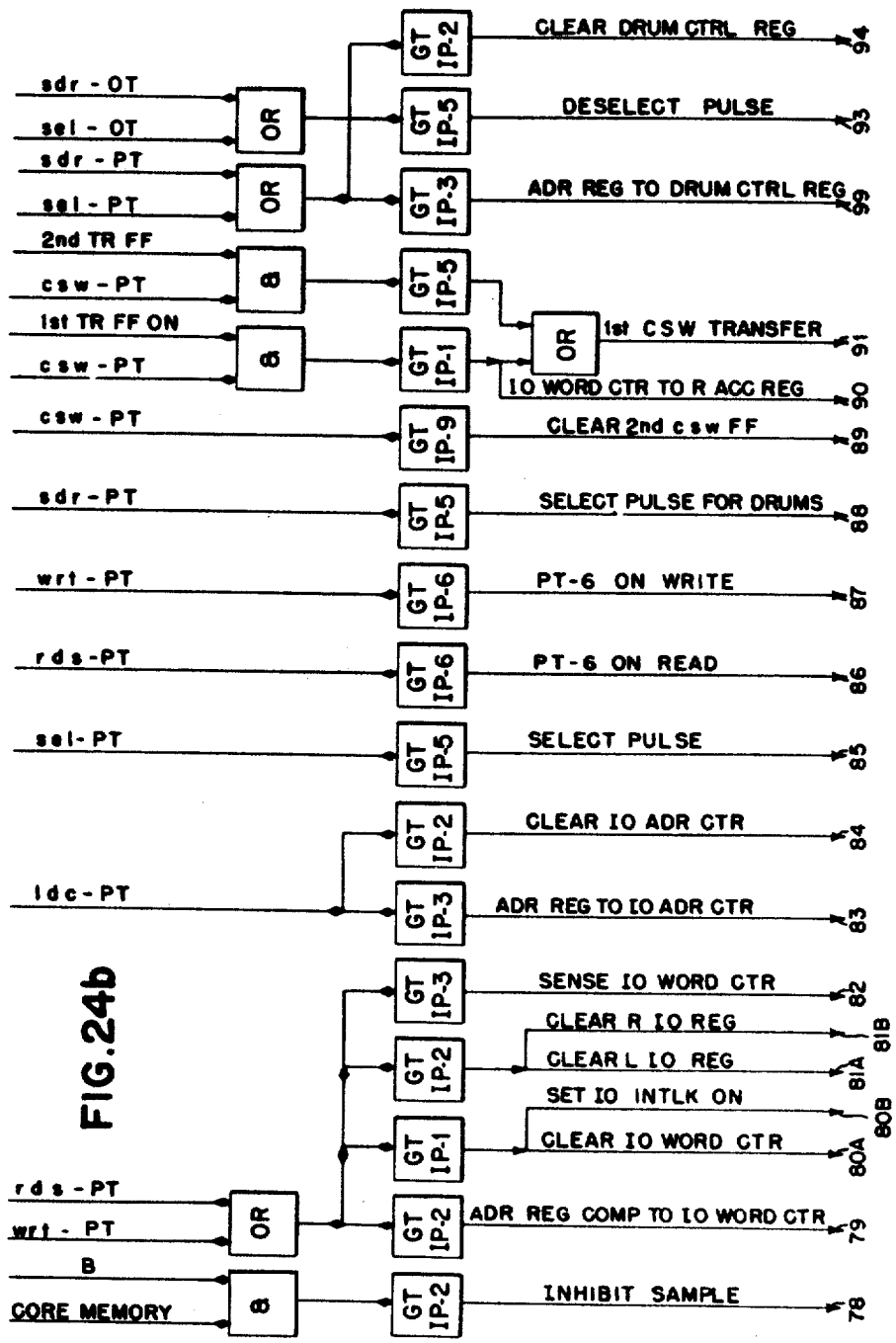

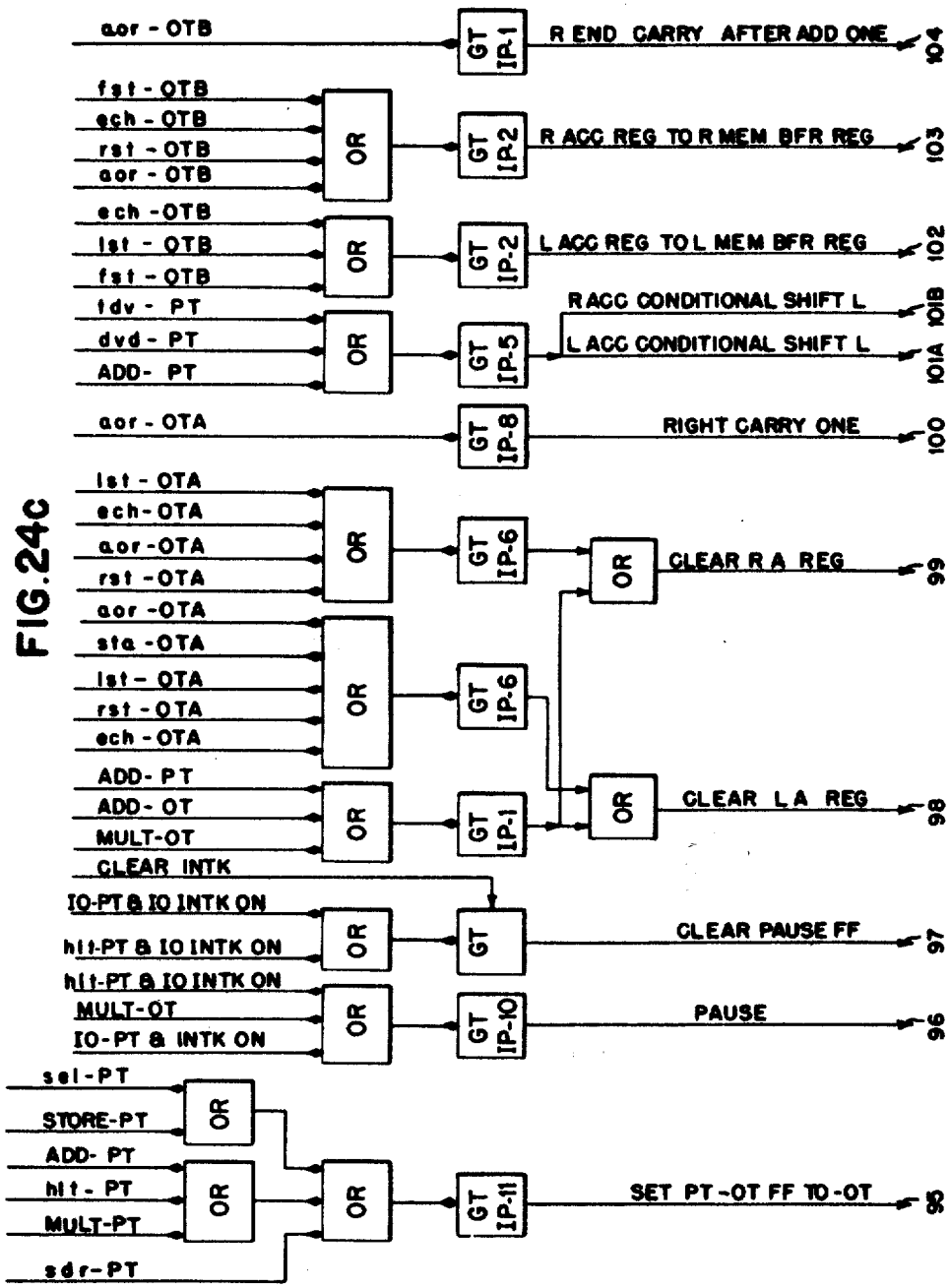

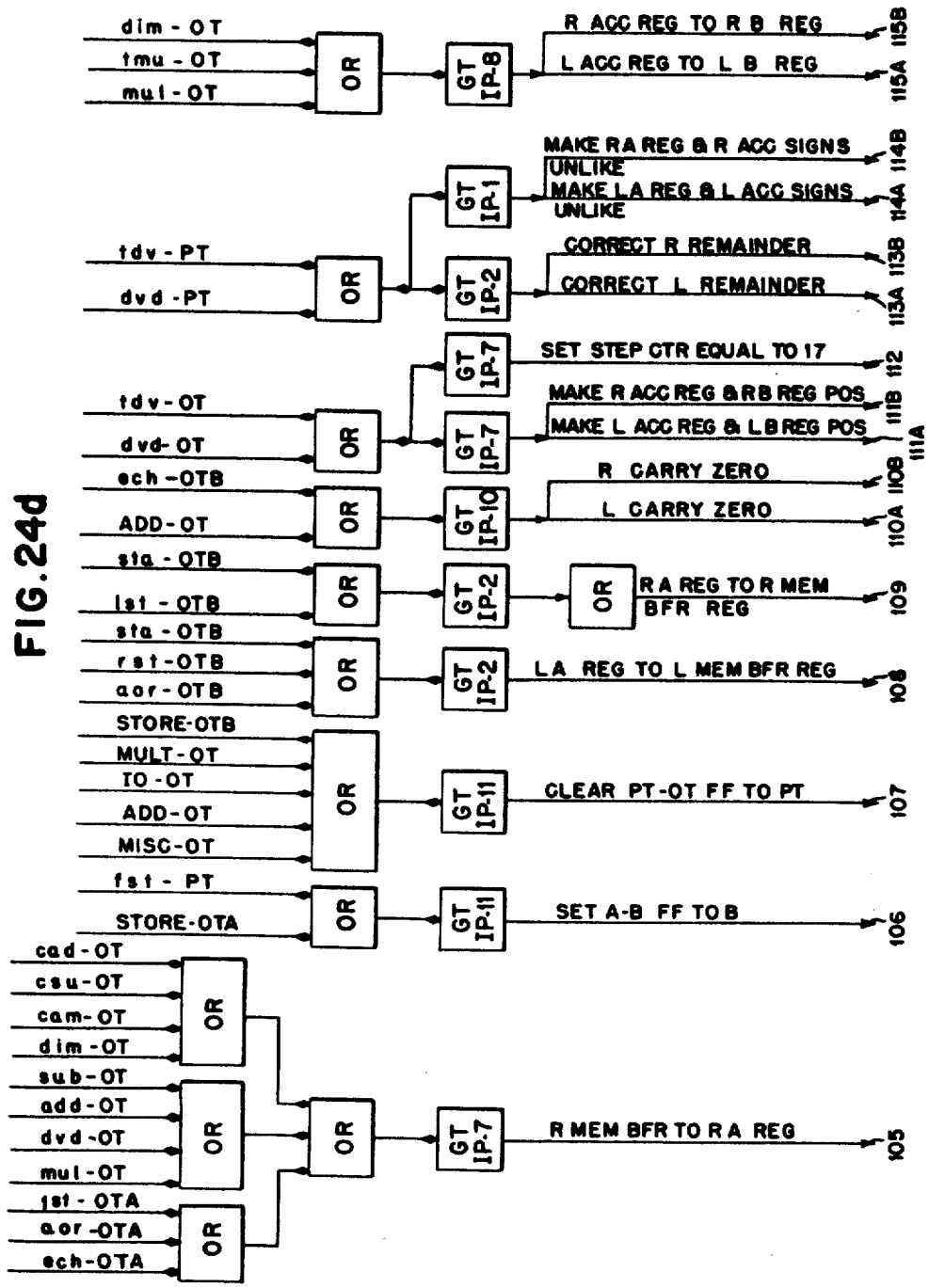

Feb. 16, 1965   M. M. ASTRAHAN ETAL   3,170,142
DATA PROCESSING MACHINE
Filed Sept. 26, 1956   38 Sheets-Sheet 37

CYCLE CONTROL CIRCUIT

MEMORY UNIT SELECTION

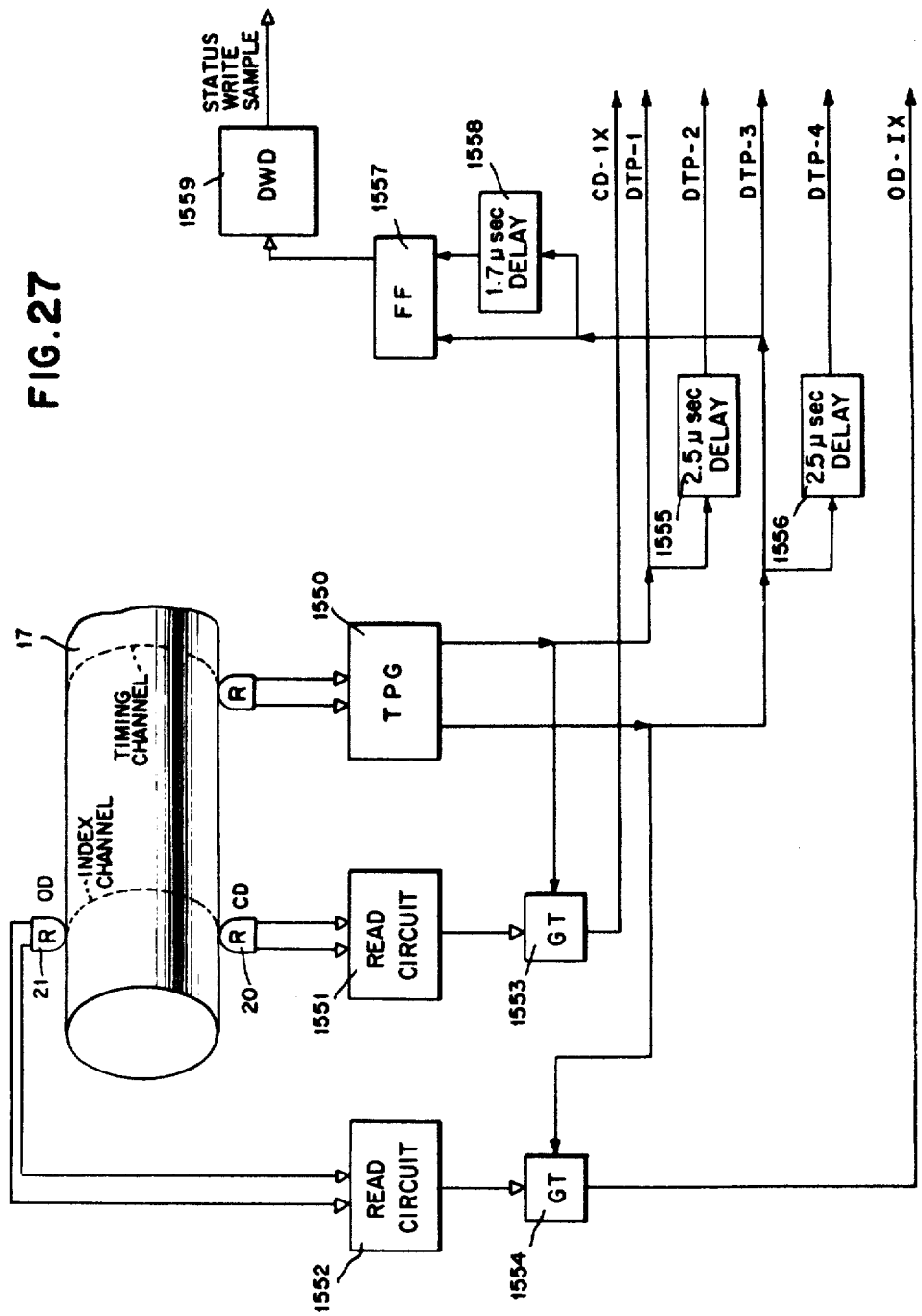

United States Patent Office 3,170,142
Patented Feb. 16, 1965

3,170,142
DATA PROCESSING MACHINE
Morton M. Astrahan, San Jose, Calif., and Bennett Housman, Poughkeepsie, Hrand L. Kurkjian, Hyde Park, and Bernard L. Sarahan, Poughkeepsie, N.Y., assignors to International Business Machines Corporation, New York, N.Y., a corporation of New York
Filed Sept. 26, 1956, Ser. No. 612,265
9 Claims. (Cl. 340—172.5)

This invention relates to data processing machines and more particularly to the transmission of signals to and from the memory element of such machines.

Various copending patent applications will be referred to in the following specification. Those applications are incorporated herein by reference and will be referred to as copending application "A," "B," etc. as follows:

It is an object of this invention to provide an improved data processing machine of the stored program type wherein information signals are randomly stored in a storage device and retrieved on the basis of part of the information content of the storage device.

It is another object of this invention to provide an improved data processing machine wherein signal transfers between memory and input-output devices are effected by a control device which receives identifying information from the instruction signals of the stored program.

It is still another object of this invention to provide an improved data processing machine which includes a buffer storage device of the status operated type for incoming signals and a control device responsive to instruction signals of the stored program which control device causes transfer of only selected ones of the signals from the buffer storage to memory.

| Reference | Copending Application ||||| 
|---|---|---|---|---|---|
| | Application Serial No. | Now Patent No. | Title | Inventor/s | Filing Date |
| A | 494,982 | 2,988,735, issued June 13, 1961. | Magnetic Data Storage | R. Everett et al | 3/17/55. |
| B | 582,578 | 3,040,299, issued June 19, 1962. | Data Storage System | J. Crosby et al | 5/3/56. |
| C | 597,612 | 3,056,110, issued Sept. 25, 1962. | Digital Data Transmission System. | R. Cypser et al | 7/13/56. |
| D | 570,199 | 2,914,248, issued November 24, 1959. | Electronic Data Processing Machine. | H. Ross et al | 3/7/56. |
| E | 576,976 | 3,007,141, issued January 31, 1961. | Magnetic Memory | R. Counihan et al | 4/9/56. |
| F | 586,247 | 2,968,791, issued January 17, 1961. | Buffer Storage System | E. Johnson et al | 5/21/56. |
| G | 582,576 | 2,932,010, issued April 5, 1960. | Data Storage System | R. Mayer et al | 5/3/56. |
| H | 414,459 | 2,994,478, issued August 1, 1961. | Electronic Digital Computer. | B. Sarahan et al | 3/5/54. |
| I | 612,267 | 3,018,959, issued January 30, 1962. | Computing Device | Walker Thomas | Filed Concurrently. |
| J | 484,677 | 2,846,669, issued July 5, 1958. | Magnetic Core Circuit | W. McMillan et al | 1/28/55. |
| K | 612,266 | | Control Equipment | R. Cypser et al | Filed Concurrently. |

As described in detail in copending application "A," signals from each of several data sources may be placed at random in a buffer storage and yet the identity of the source from which a given signal came can be maintained by providing identity signals which accompanying those signals. As described in copending application "K," signals which are received in a given time order may be placed at random in a buffer storage and yet the identity of that time order can be maintained by providing identity of time signals which accompany those signals. Such signals having identity tags can be delivered directly from the random storage to a data processing machine which, through a suitable sorting program, can arrange the signals in a desired order for subsequent data processing. When the data processing machine is required to perform such sorting operations, the efficiency of the machine is impaired since in most instances the machine is designed to do other more complex operations such as arithmetic operations and operations involving logic or complex decision making. In accordance with the principles of this invention the sorting operations are performed when the signals are delivered from the buffer storage to the data processing machine.

Other objects of the invention will be pointed out in the following description and claims and illustrated in the accompanying drawings, which disclose, by way of example, the principle of the invention and the best mode, which has been contemplated, of applying that principle.

Figure 1A:
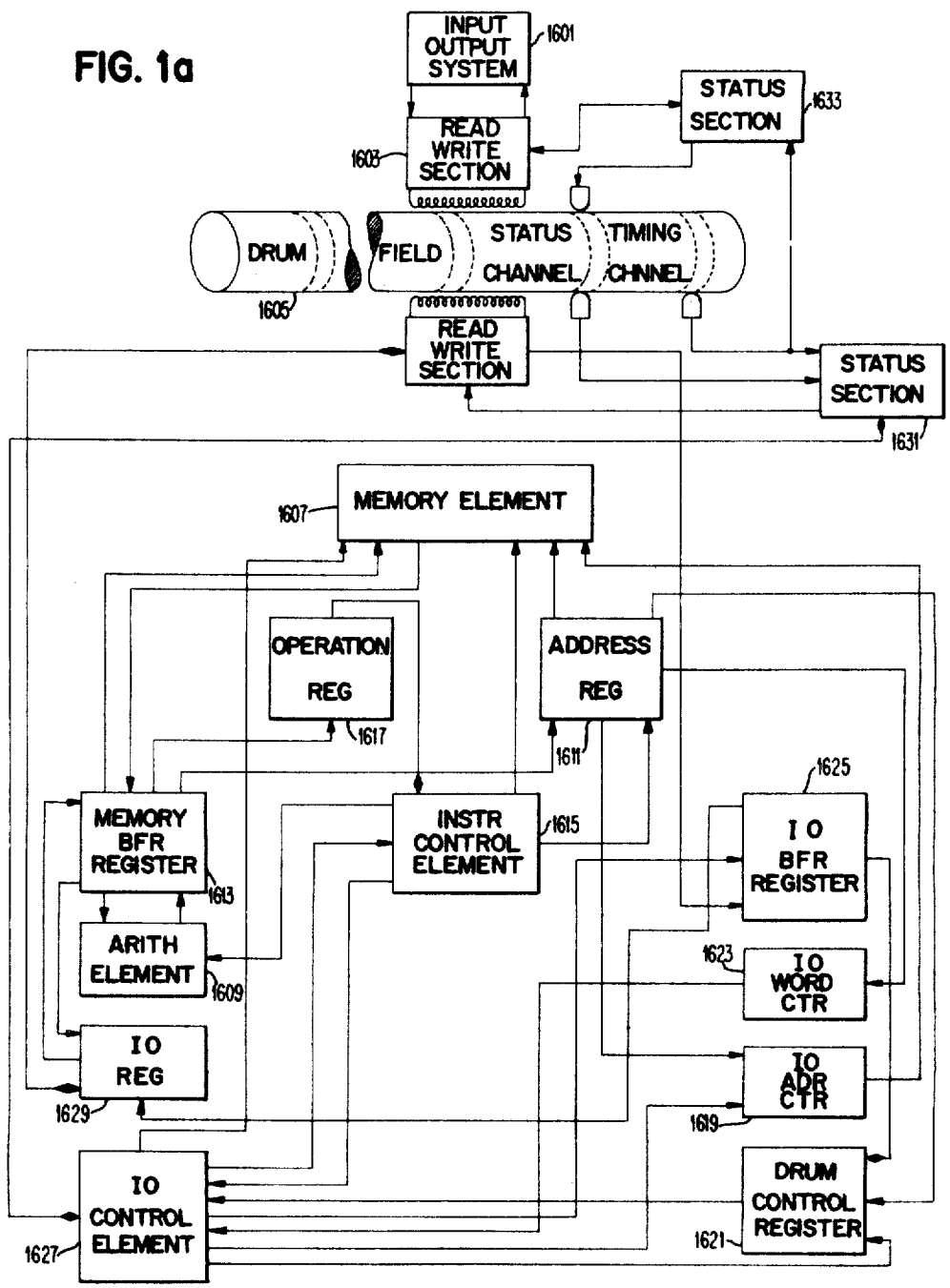
FIG. 1a is a simplified block diagram of a computing device constructed in accordance with the principles of this invention.
Figure 1:
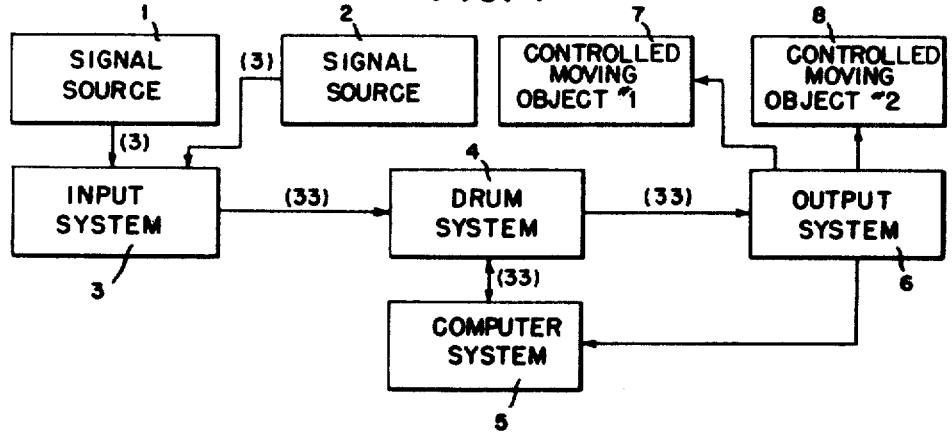
FIG. 1 is a simplified block diagram of a control equipment constructed in accordance with the principles of this invention.
Figure 3:
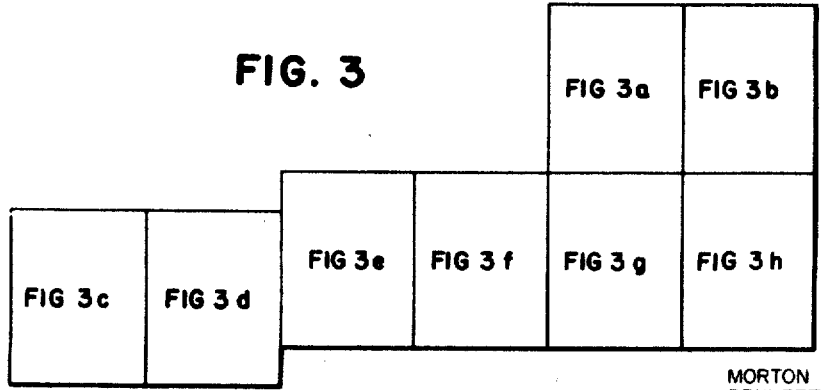
FIG. 3 is a diagram which illustrates the manner in which FIGS. 3a through 3h should be arranged to effect interconnection of the circuits in those figures.

FIGS. 3a through 3h, when arranged according to FIG. 3, are a simplified block diagram of parts of FIG. 1 identified as the input system, output system, drum system and computer system.

FIG. 4 is a timing diagram illustrating the timing relationship between timing, sync. and data signals received by the input system.

FIG. 5 is a timing diagram illustrating the timing relationship between the input timing signals and the drum timing signals.

Figure 6:
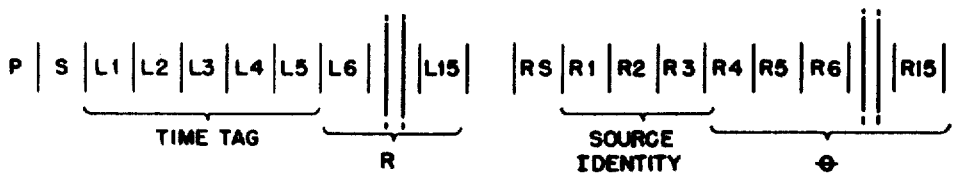

FIG. 6 is a diagram illustrating the drum word layout of signals delivered by the input system to the drum system.

Figure 7:
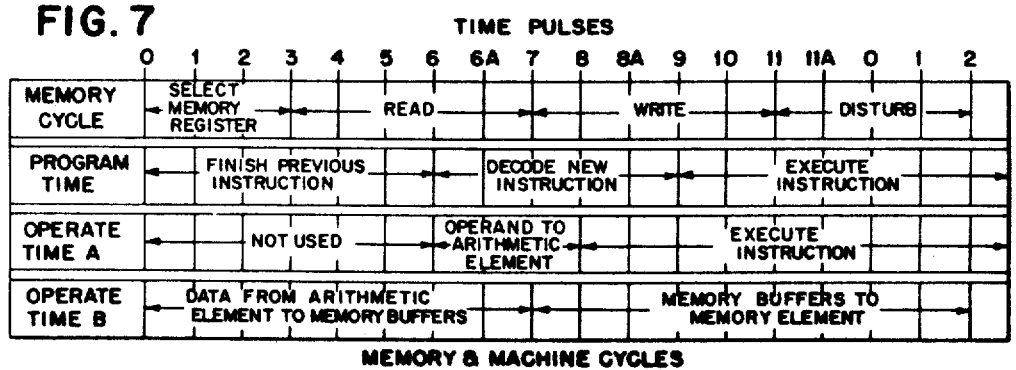

FIG. 7 is a timing chart which illustrates timing relationship between various cycles of operation in the computer system.

Figure 8:
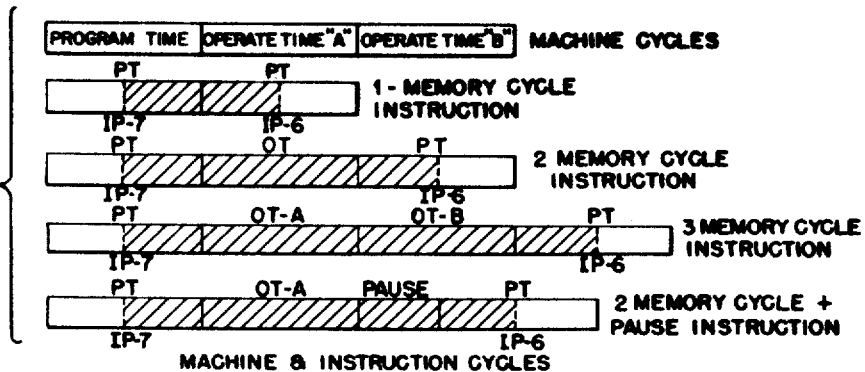

FIG. 8 is a timing chart which illustrates the timing relationship between computer system machine cycles and the different length instruction cycles.

Figure 9:
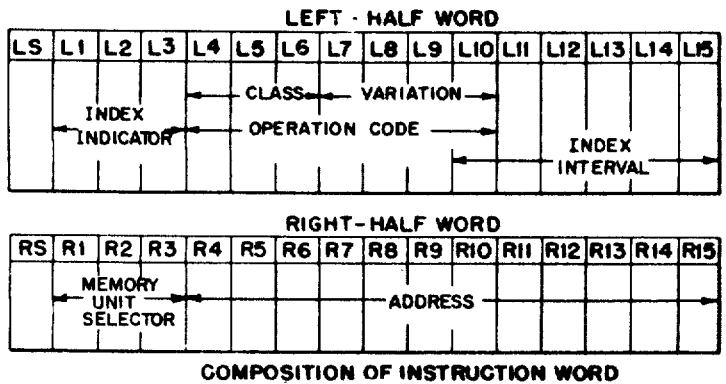

FIG. 9 is a diagram which illustrates word lay-out and bit assignments of computer system instruction words.

Figure 10A:
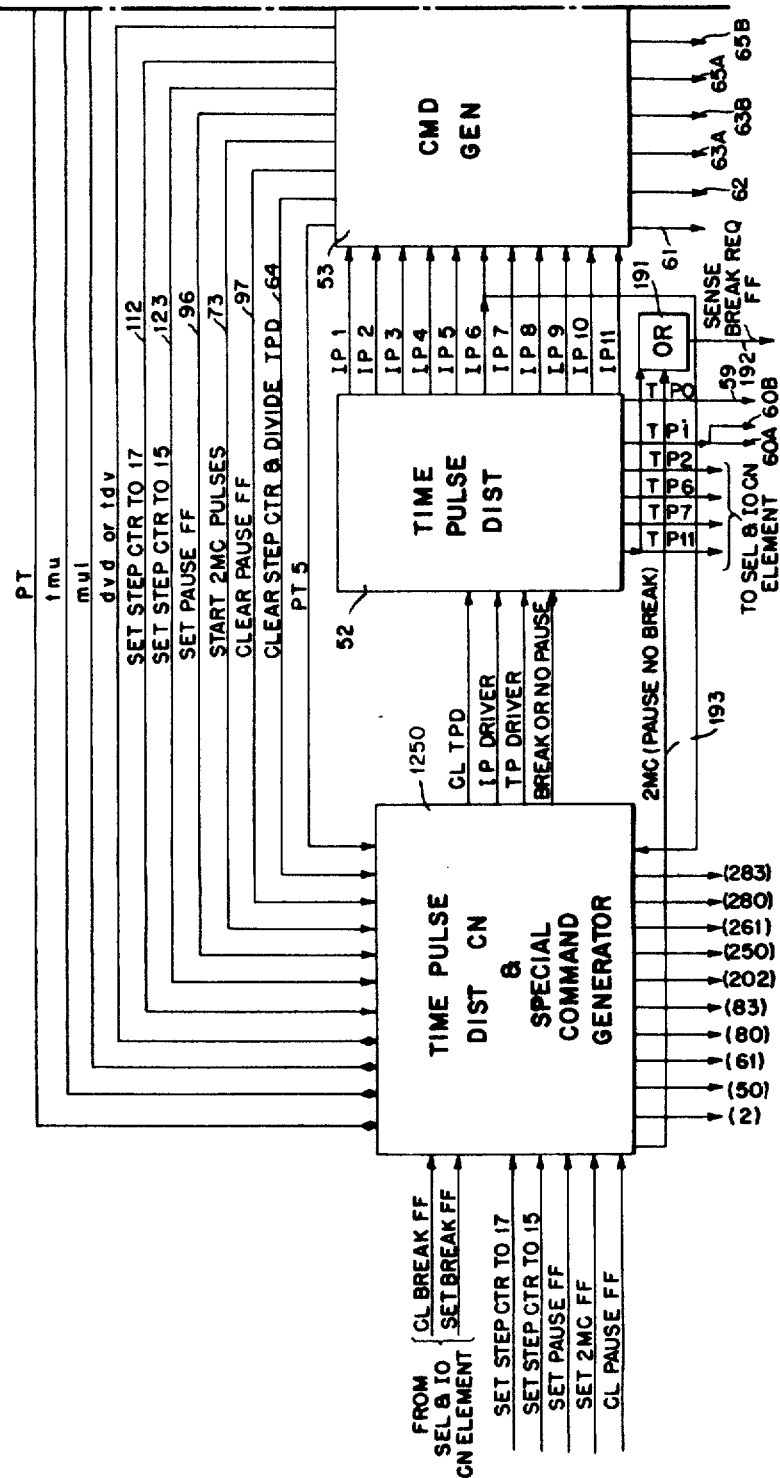
Figure 10B:
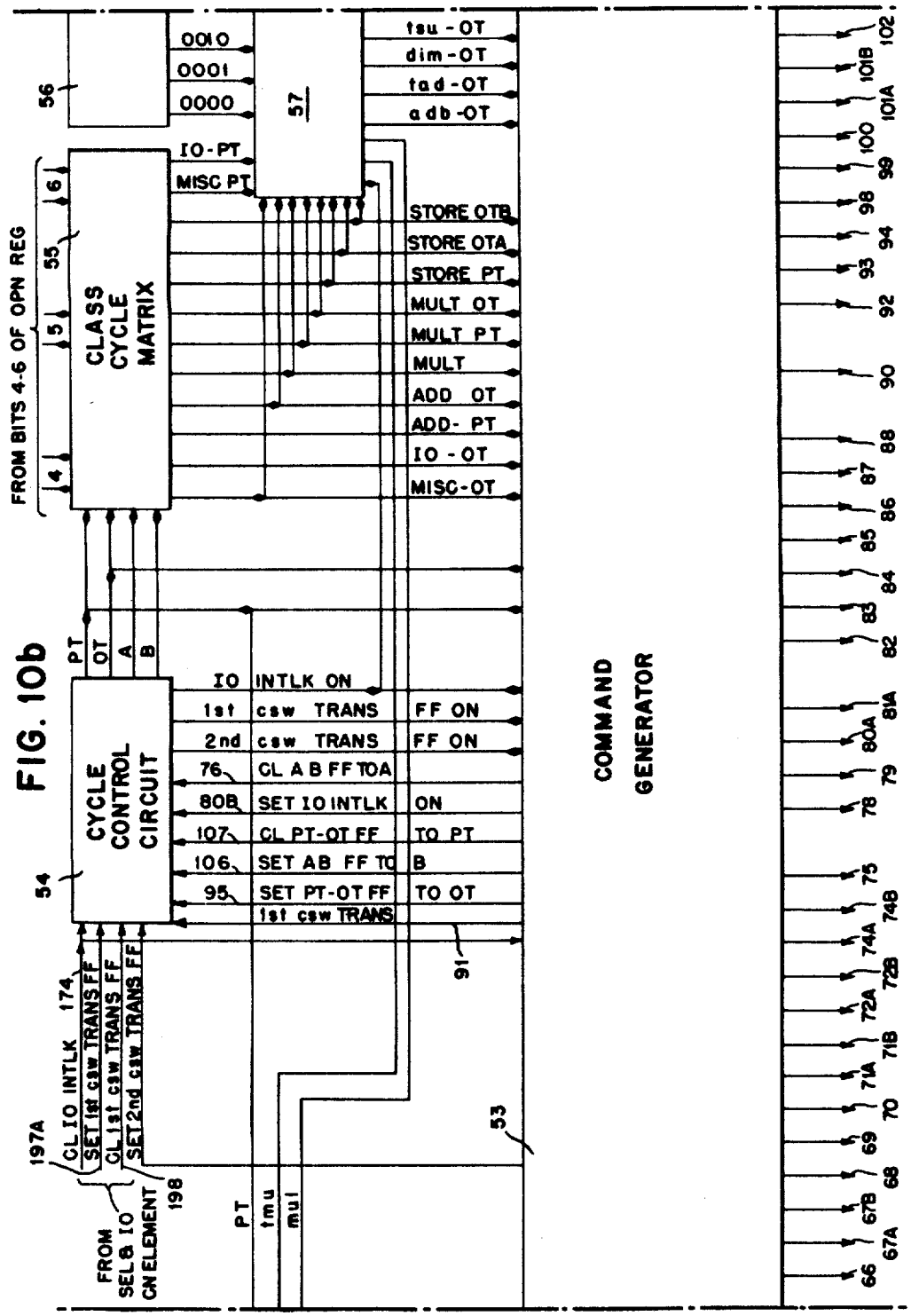
Figure 10C:
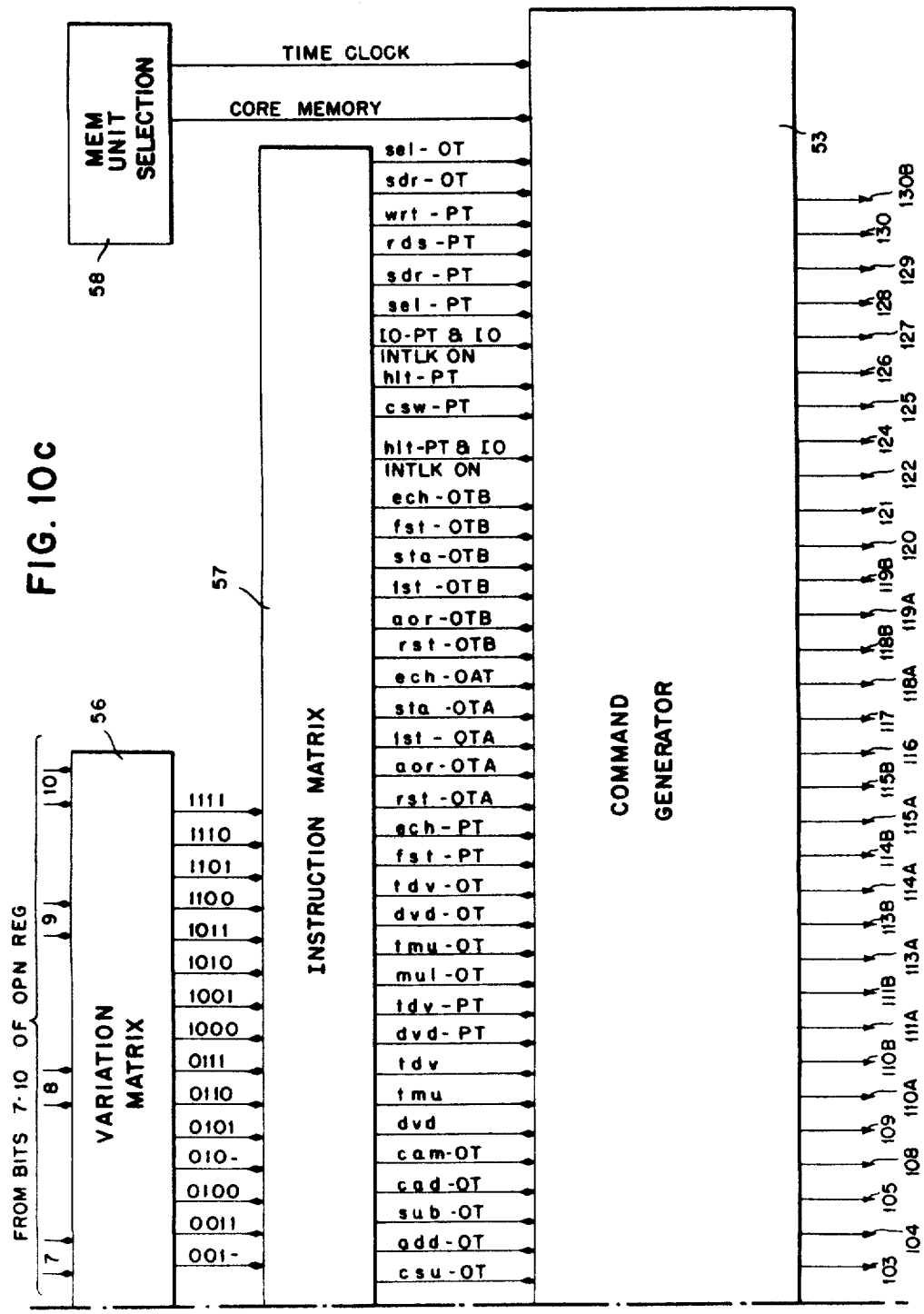

FIGS. 10a, 10b and 10c, when arranged end to end in that order from left to right, is an interconnected block diagram of the Instruction Control Element shown as block 51 in FIGS. 3a, 3b, 3g and 3h.

FIGS. 11a through 11e are timing charts which illustrate the commands which are generated and the time of those commands for each of several instructions that the computer system may perform.

Figure 12:
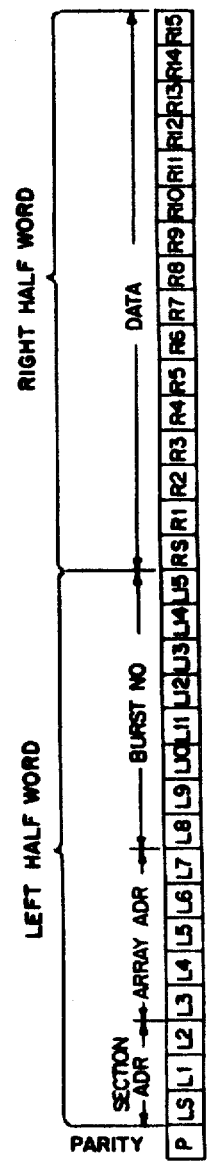

FIG. 12 is a chart which illustrates the functions of the various bits of the words read from the drum and delivered to the output system.

Figure 13:
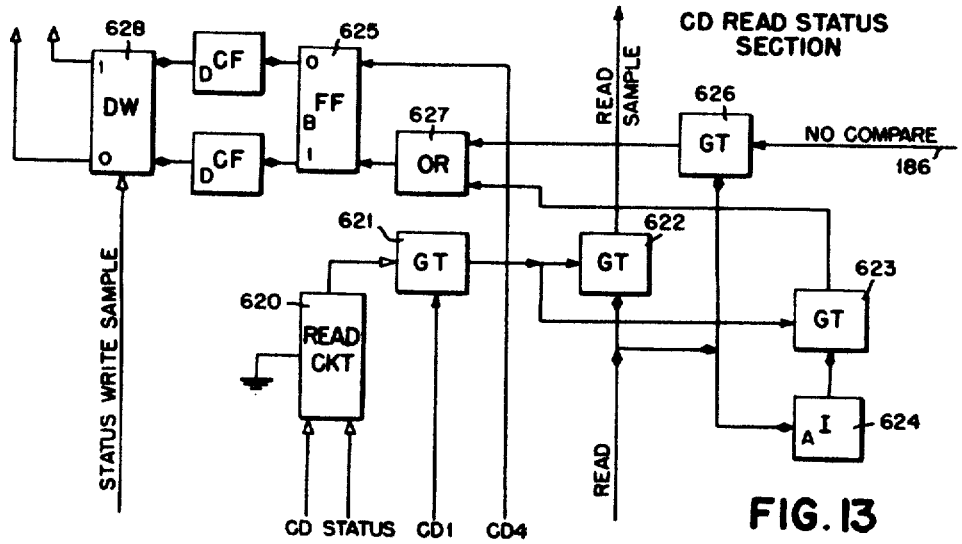

FIG. 13 is a logical block diagram of the Read Status Control Section shown as blocks 30 and 301 in FIGS. 3f and 3e, respectively.

Figure 14:
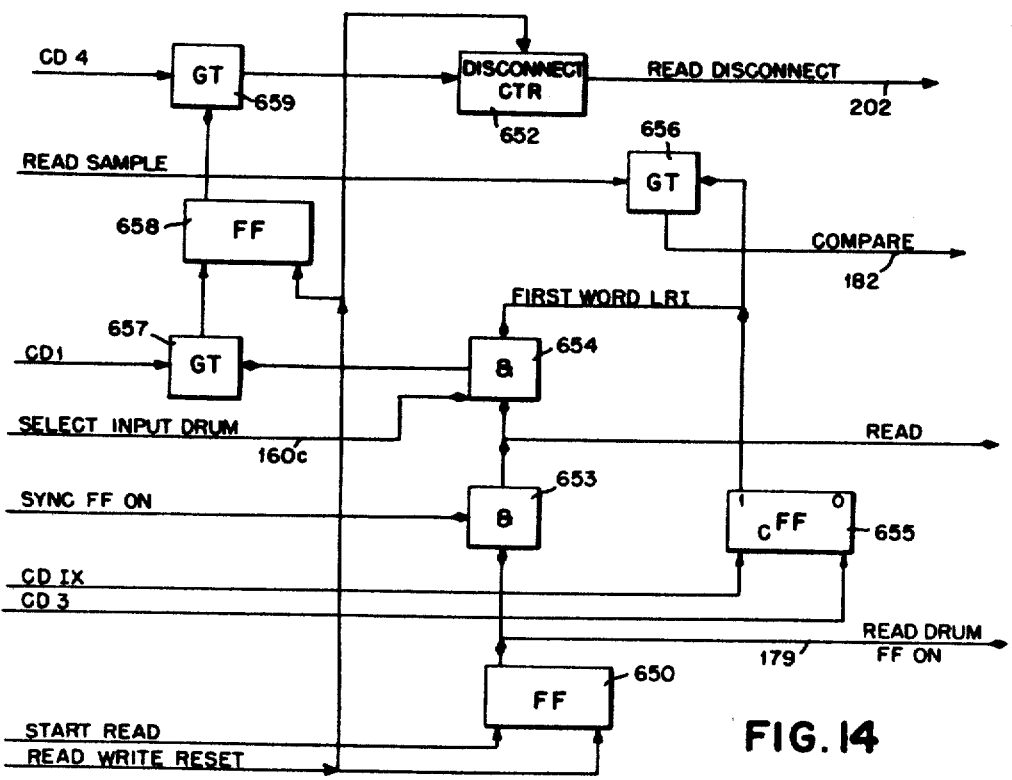

FIG. 14 is a logical block diagram of the Read Control Circuit shown as block 178 in FIG. 3f.

Figure 3B:
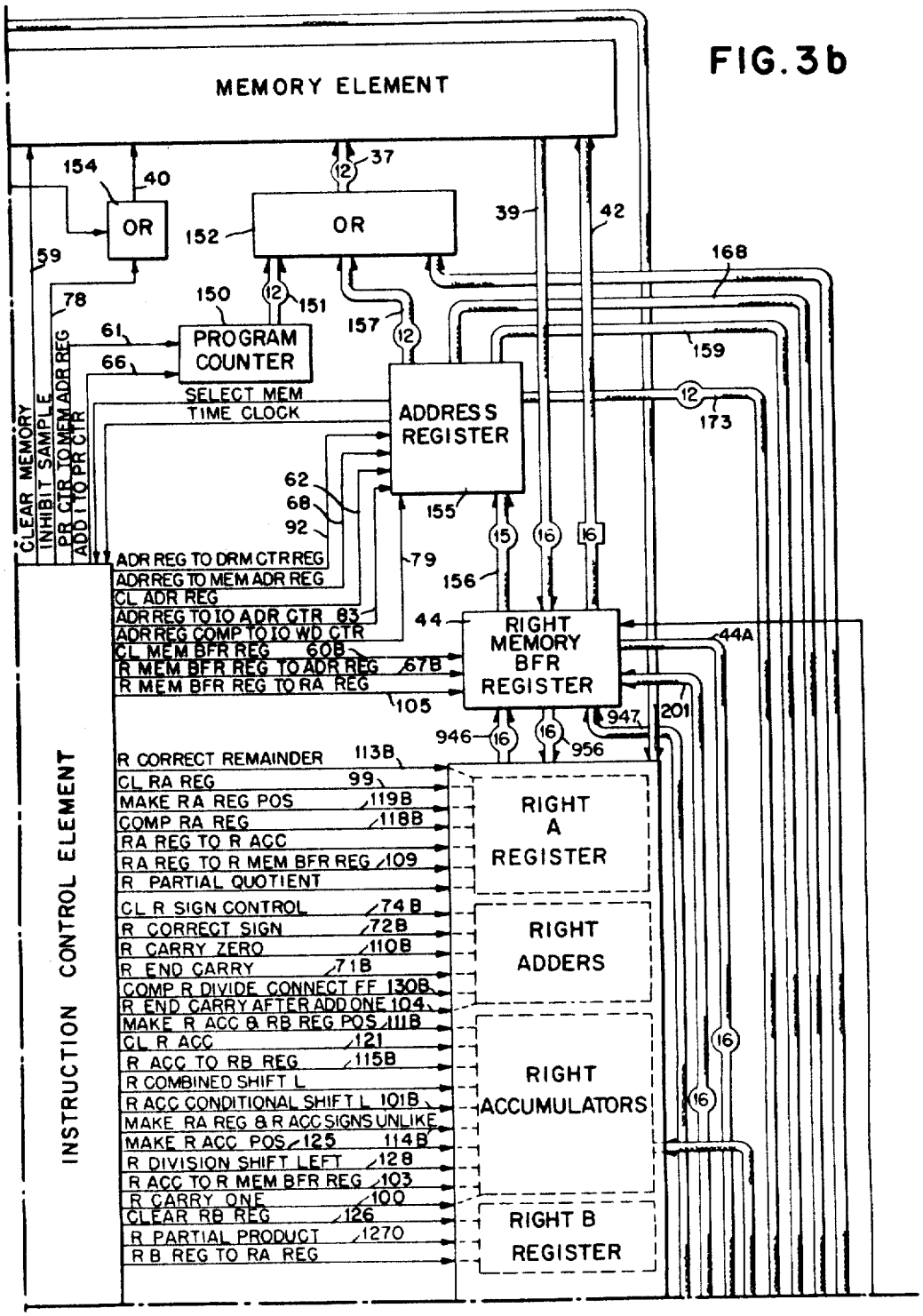
Figure 3C:
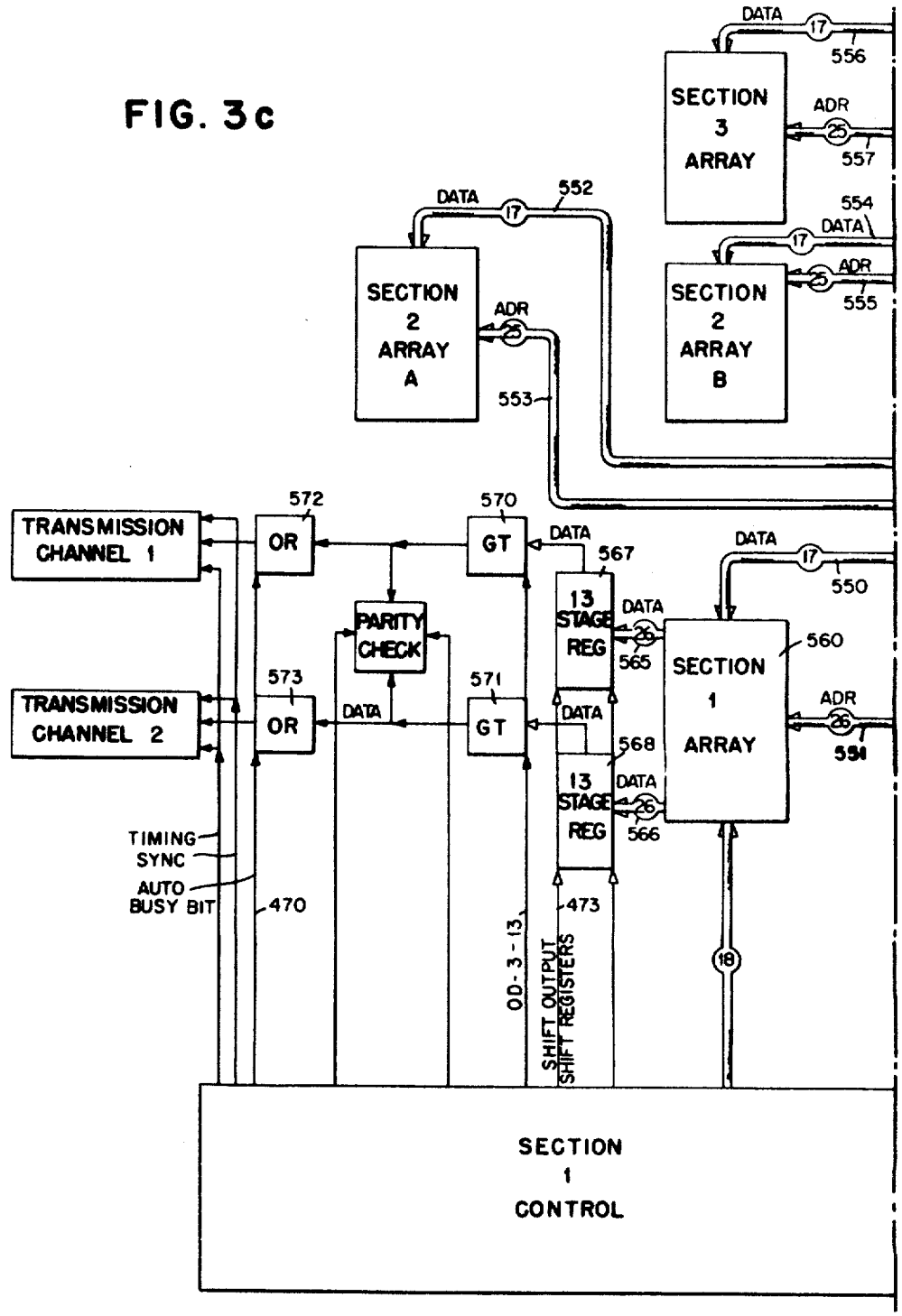
Figure 3D:
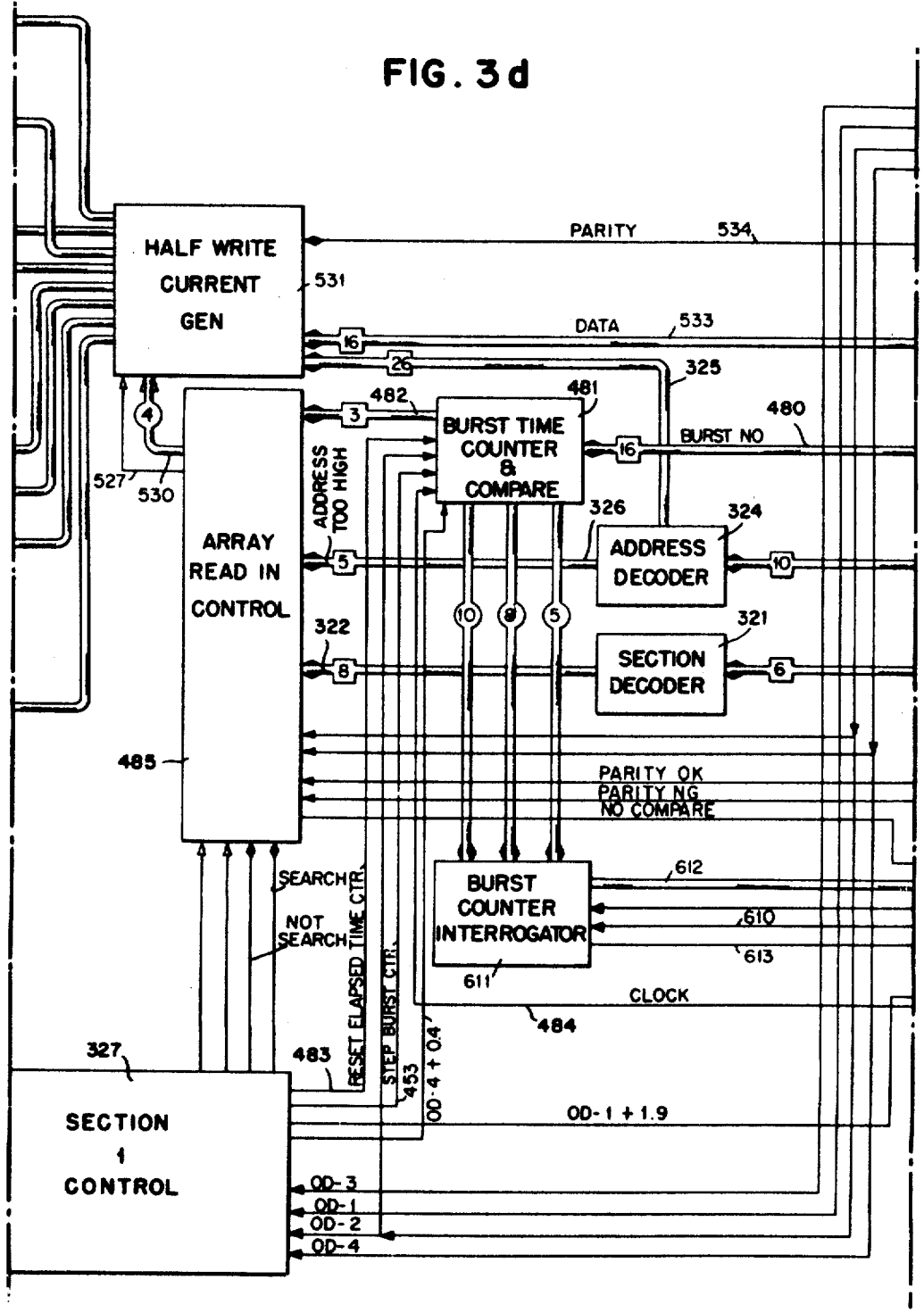
Figure 3H:
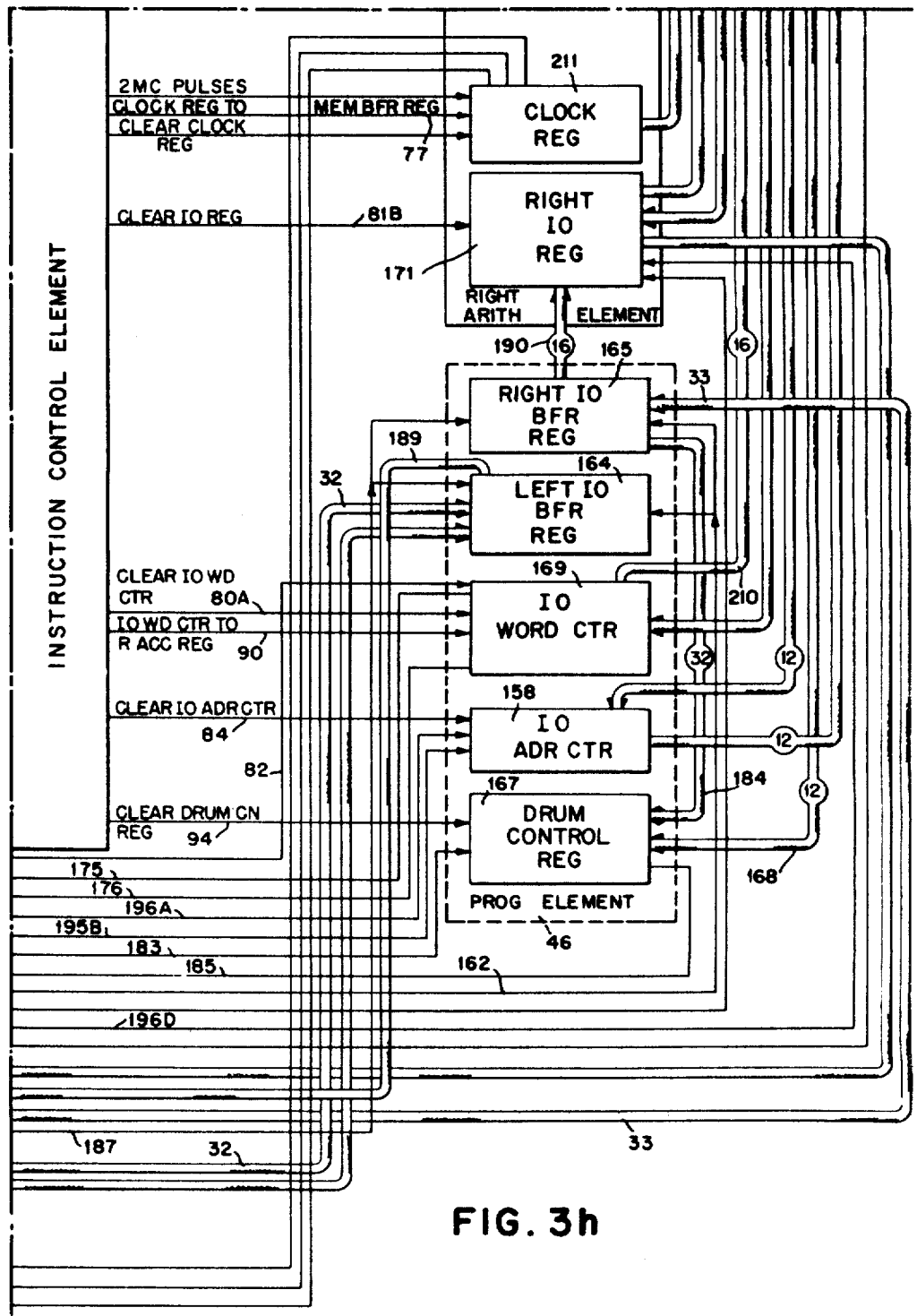
Figure 15:
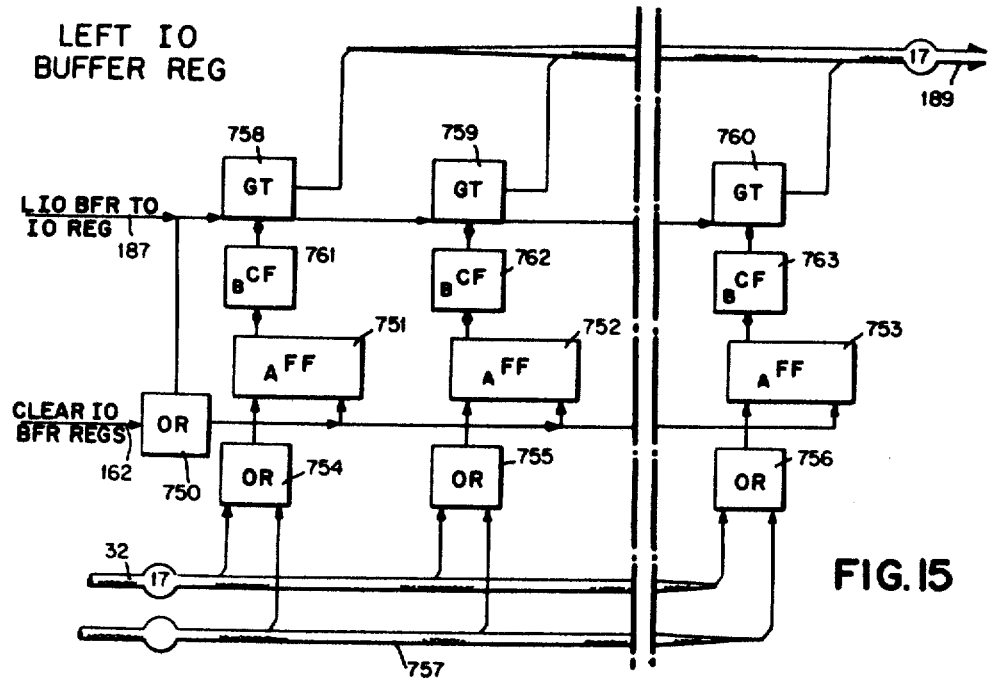

FIG. 15 is a logical block diagram of the Left IO Buffer Register shown as block 164 in FIG. 3h.

Figure 16:
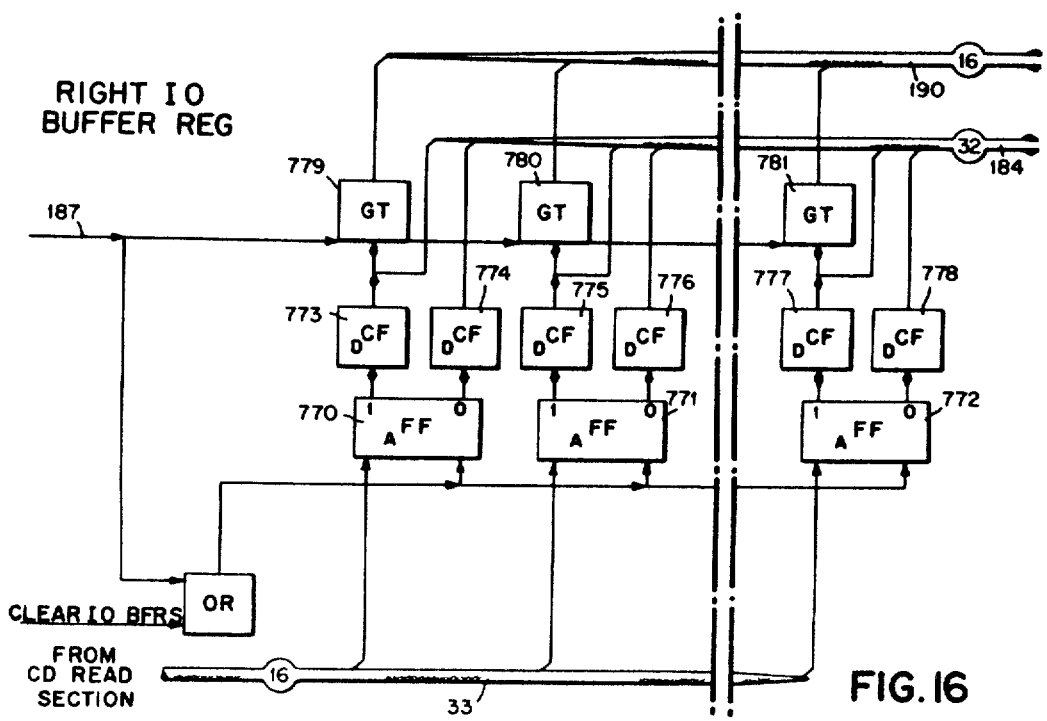

FIG. 16 is a logical block diagram of the Right IO Buffer Register shown as block 165 in FIG. 3h.

Figure 17:
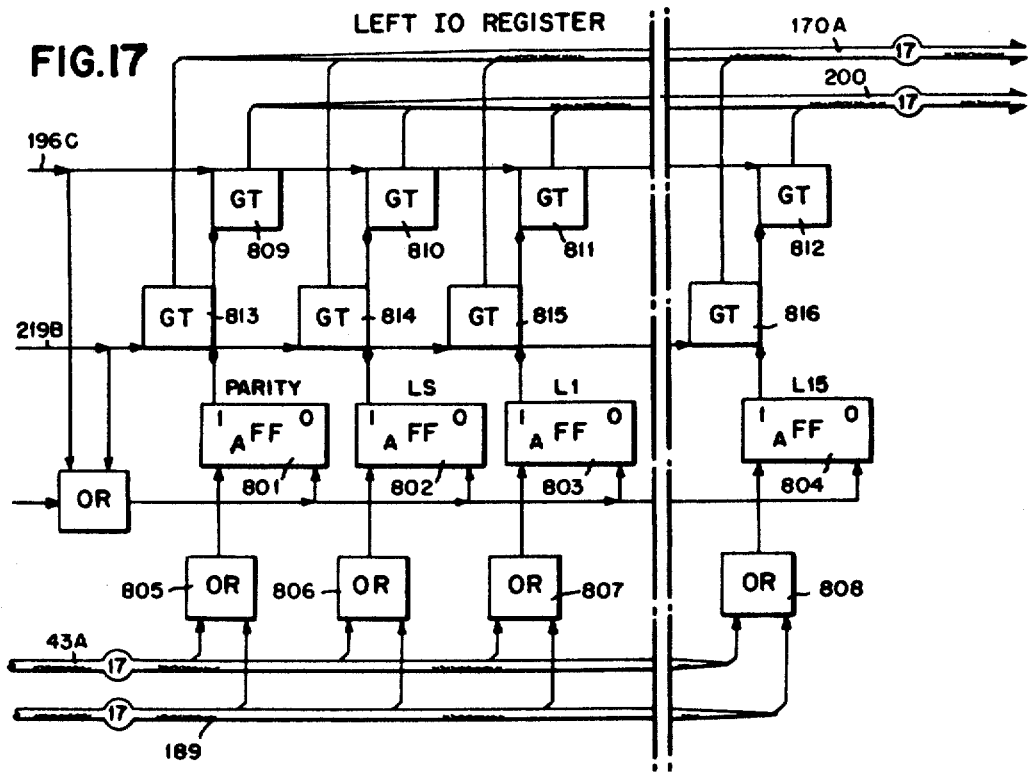

FIG. 17 is a logical block diagram of the Left IO Register shown as block 170 in FIG. 3g.

Figure 18:
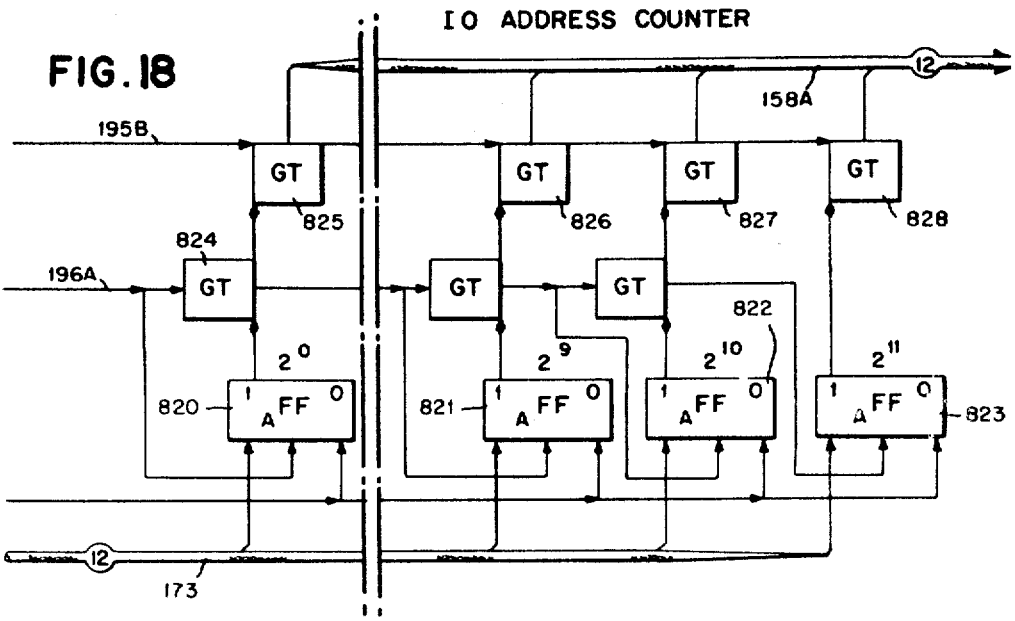
Figure 2I:
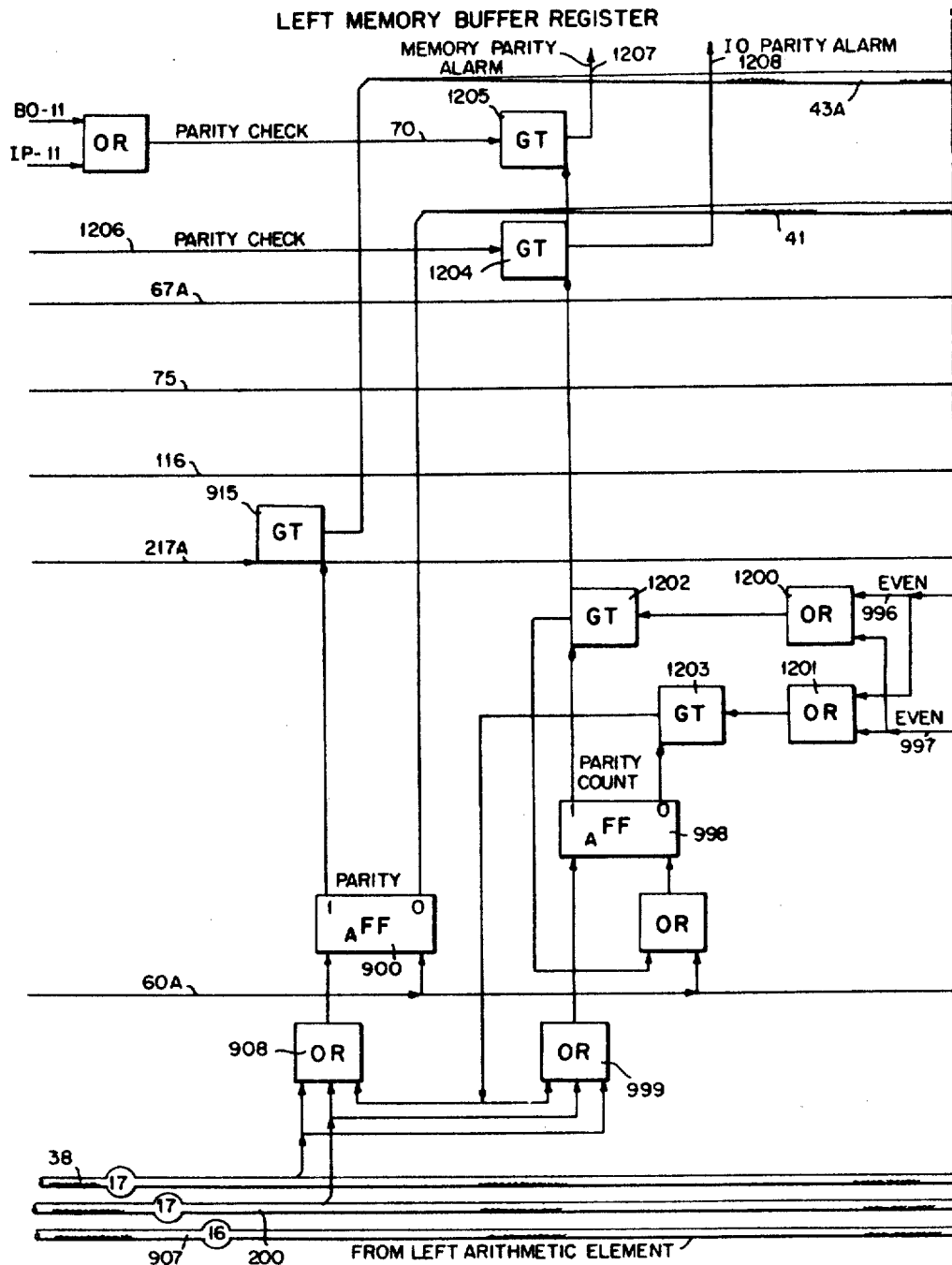
Figure 2I:
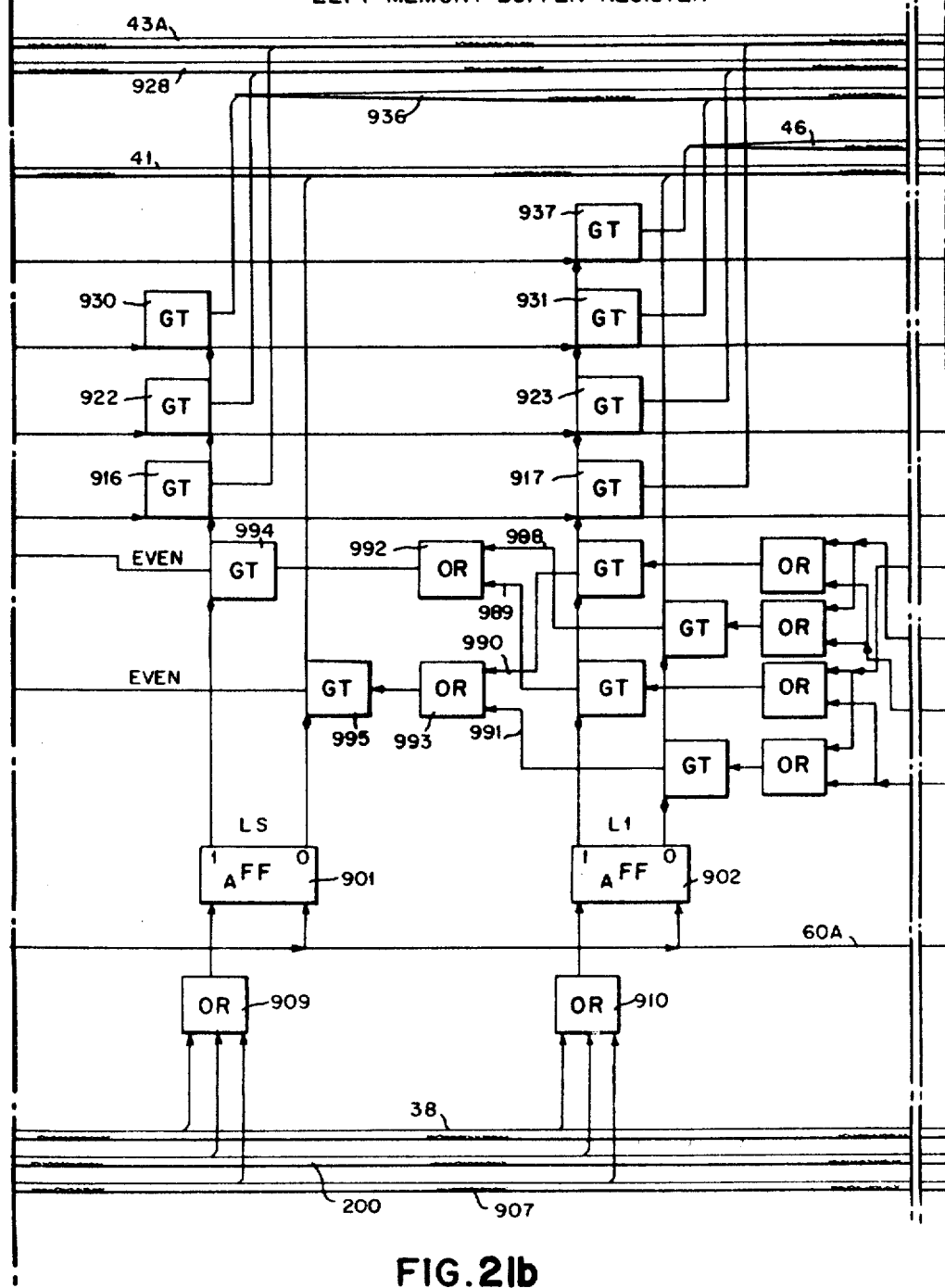
Figure 21C:
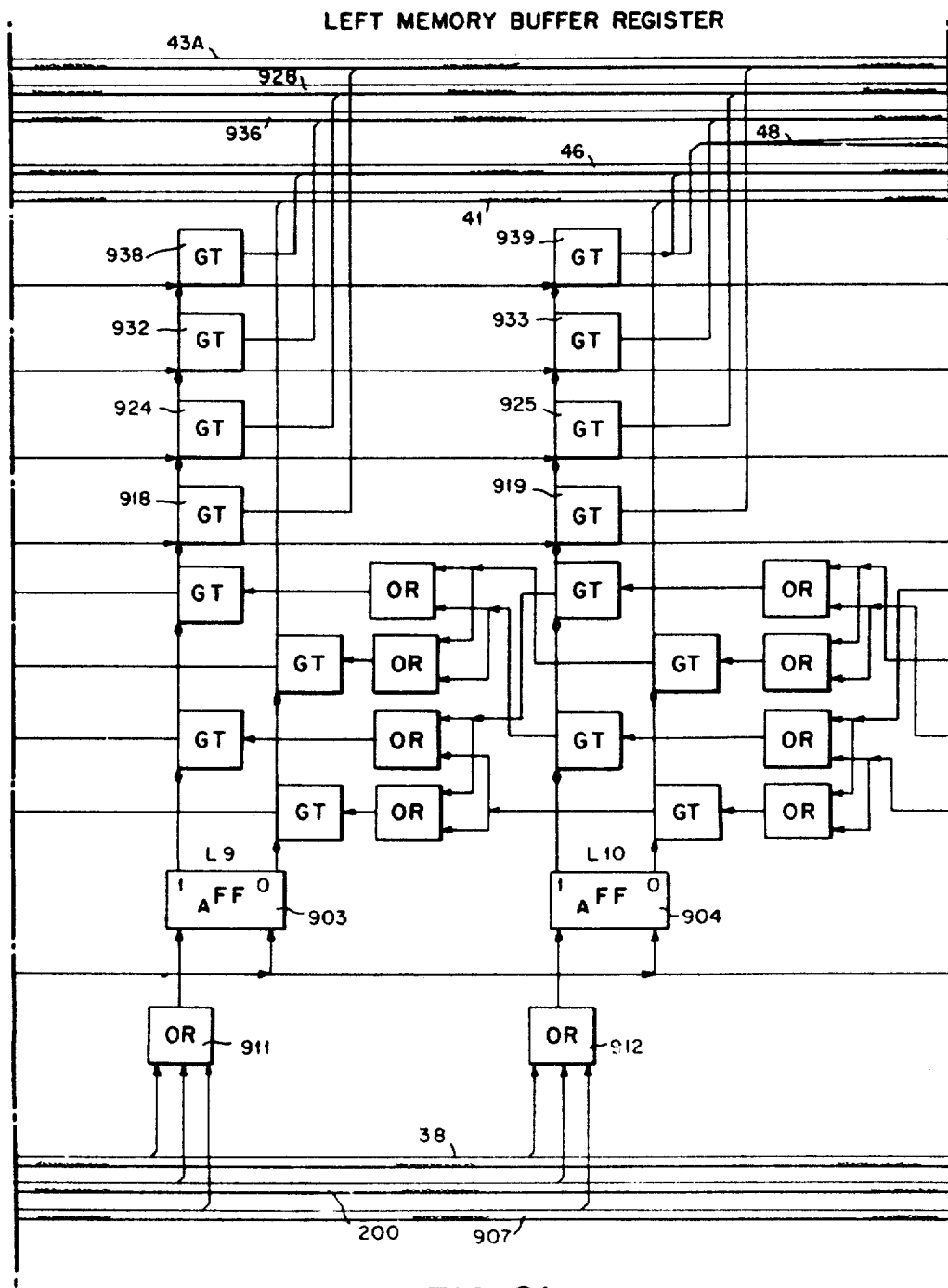
Figure 21D:
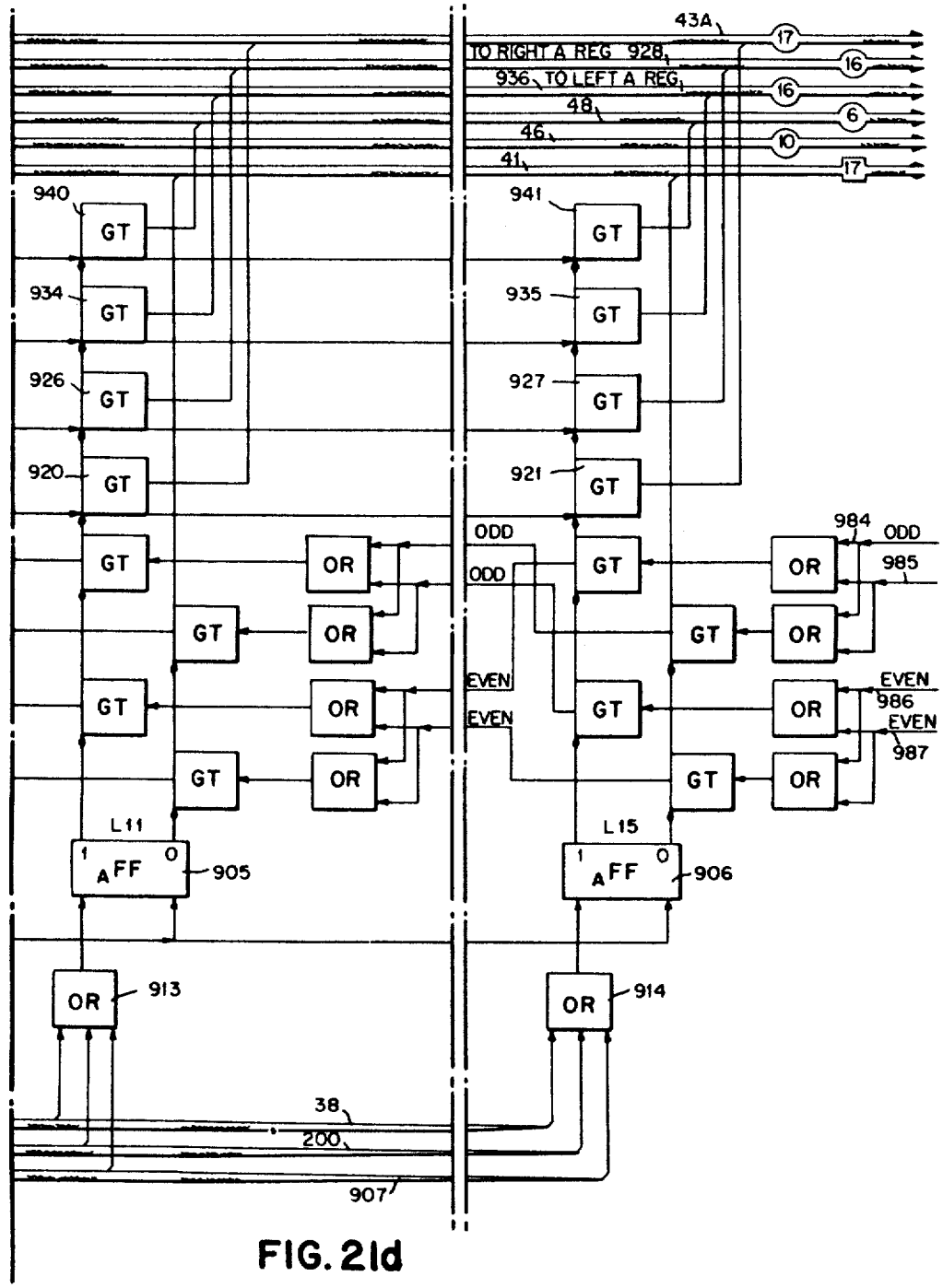

FIG. 18 is a logical block diagram of the IO Address Counter shown as block 158 in FIG. 3h.

FIG. 19 is a logical block diagram of the IO Word Counter which is shown as block 169 in FIG. 3h.

FIG. 20 is a logical block diagram of the Drum Control Register which is shown as block 167 in FIG. 3h.

FIGS. 21a through 21d are a logical block diagram of the Left Memory Buffer Register which is shown as block 43 in FIG. 3a.

Figure 22B:
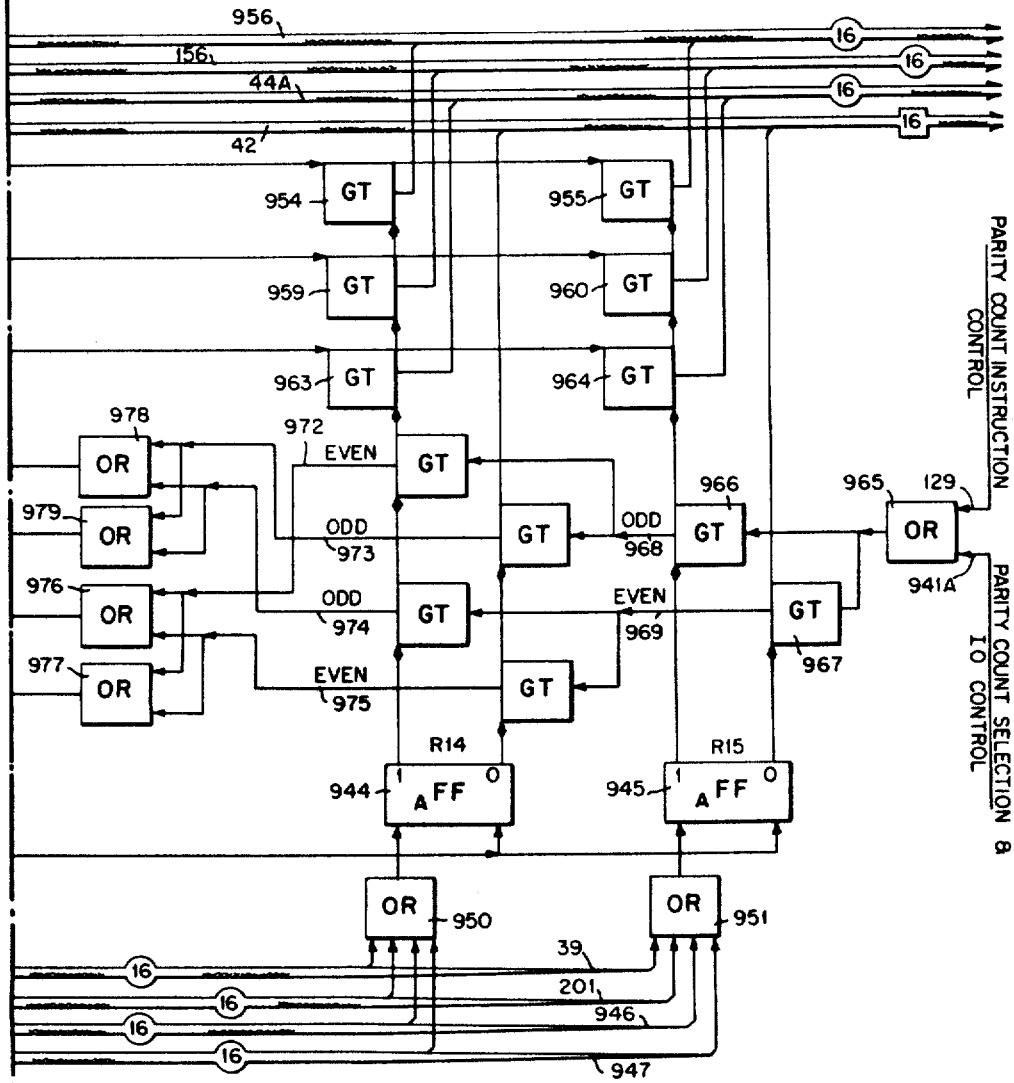

FIGS. 22a and 22b are a logical block diagram of the Right Memory Buffer Register which is shown as block 44 in FIG. 3b.

Figure 23B:
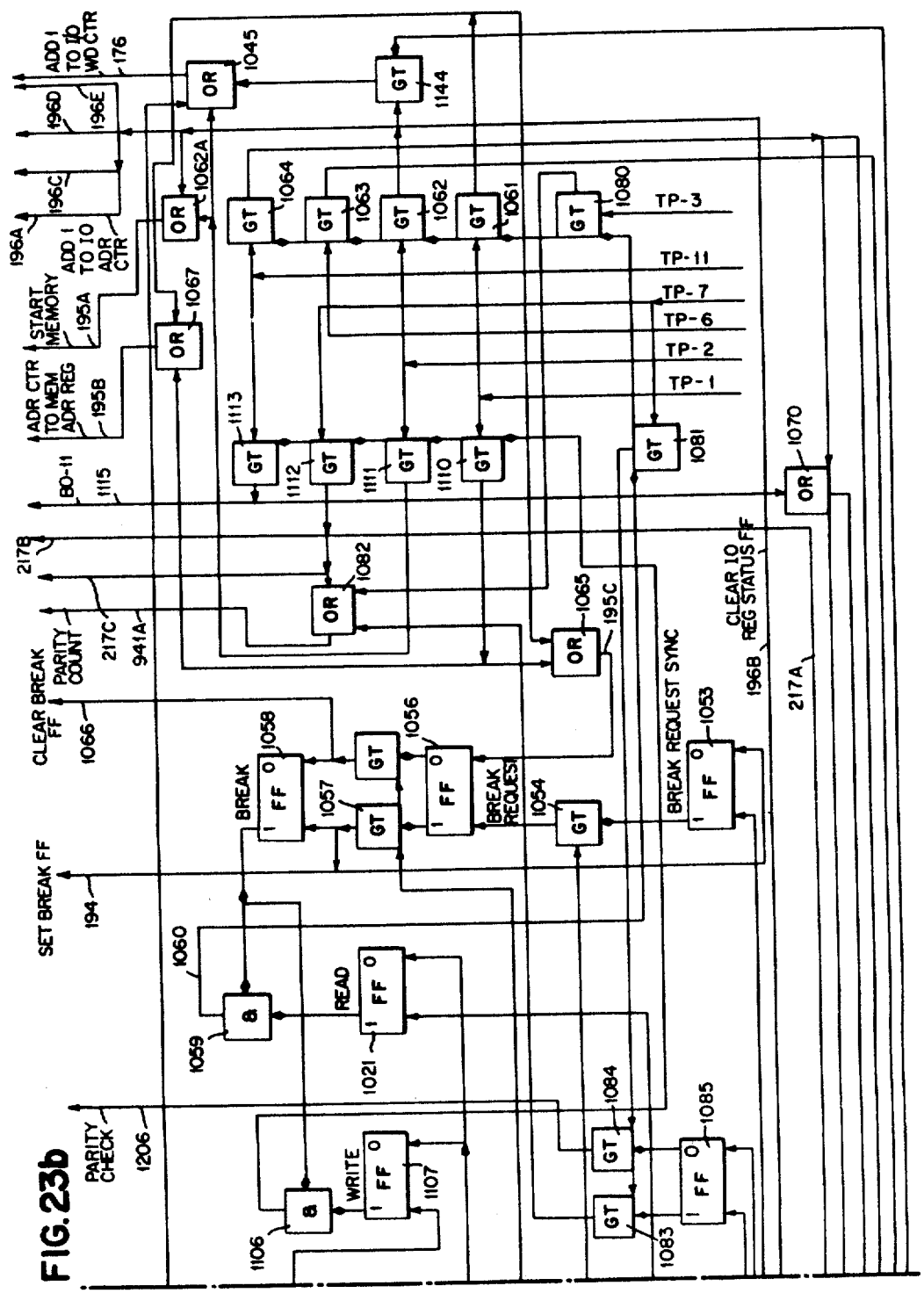
Figure 23C:
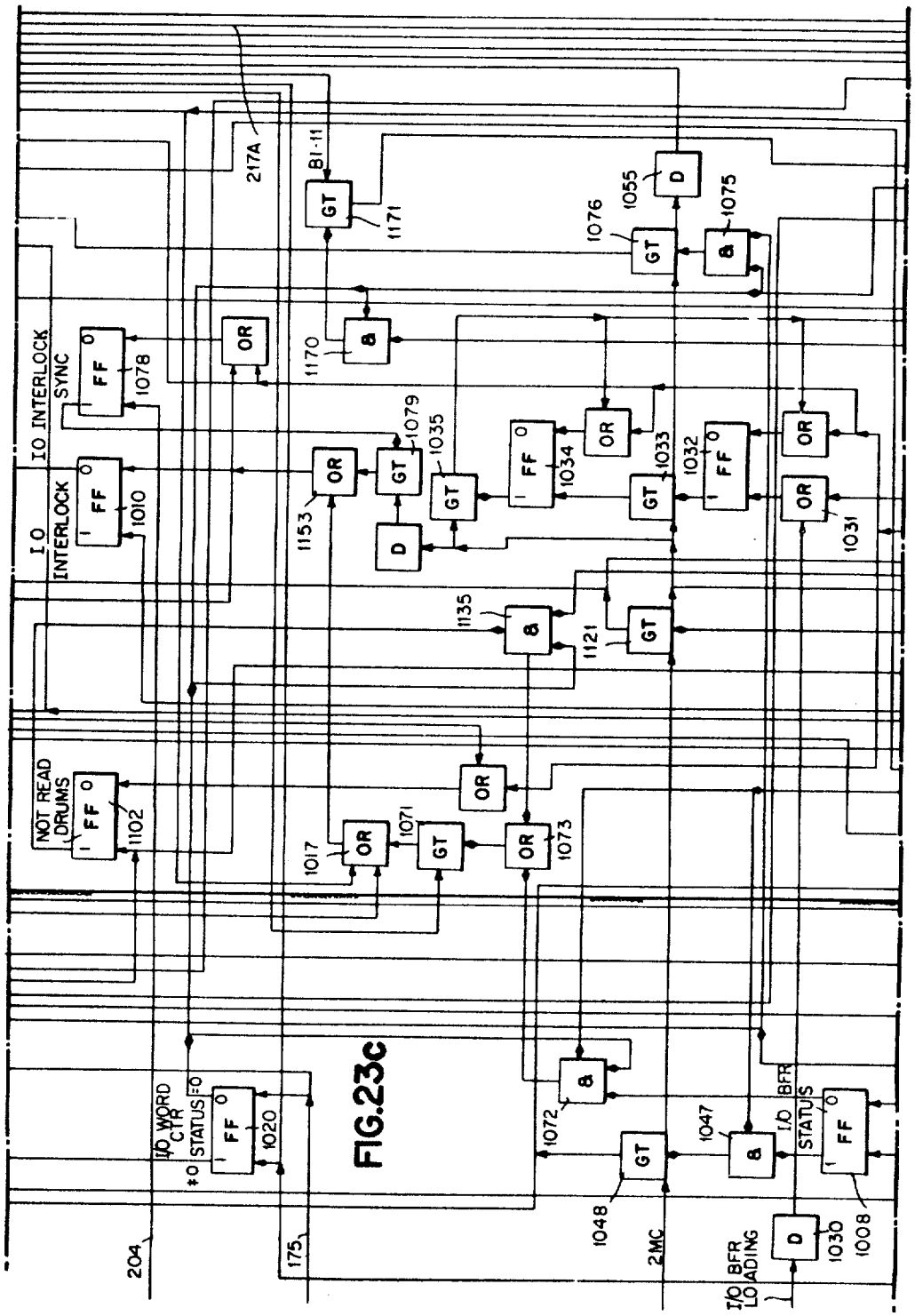
Figure 24A:
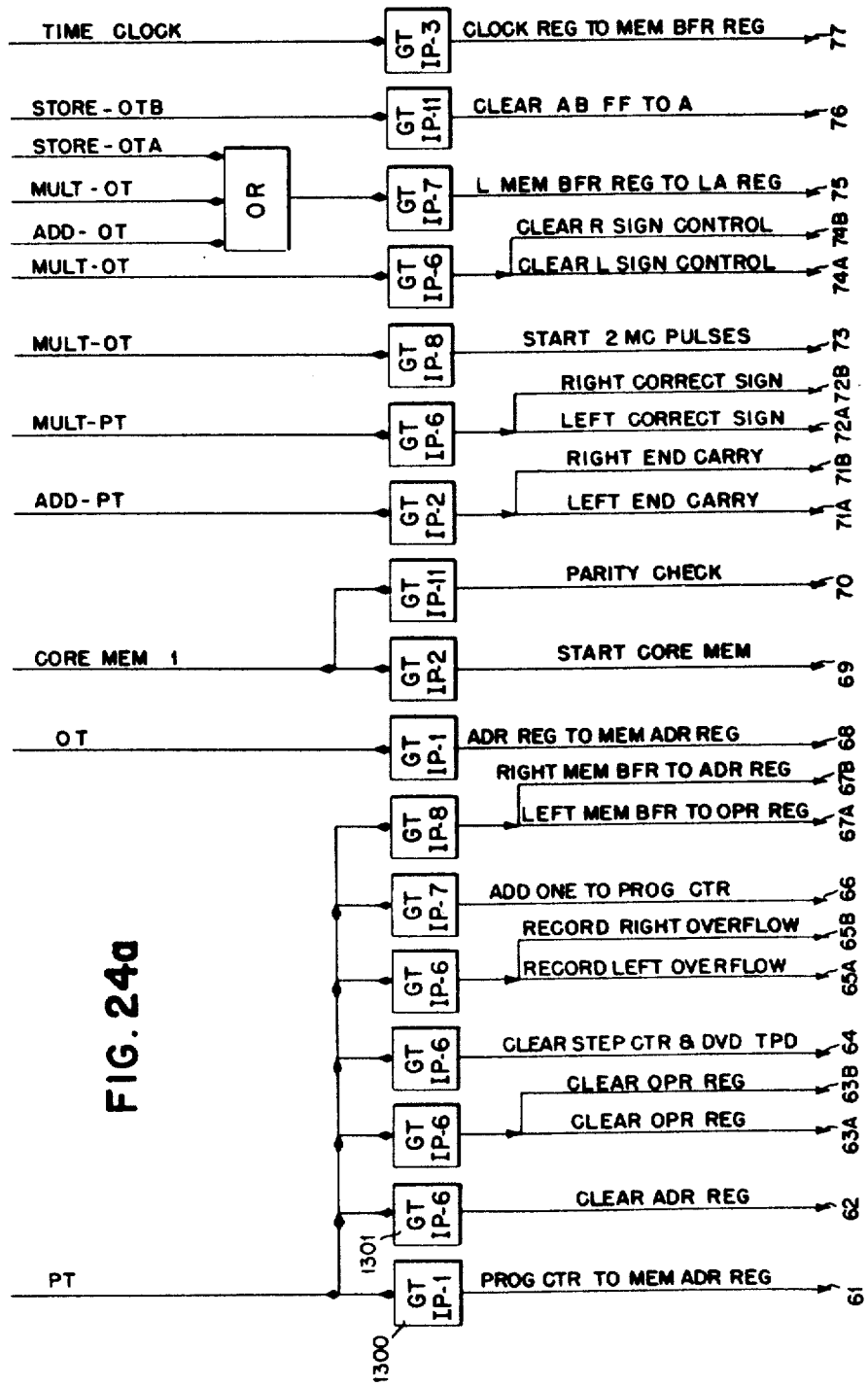
Figure 24E:
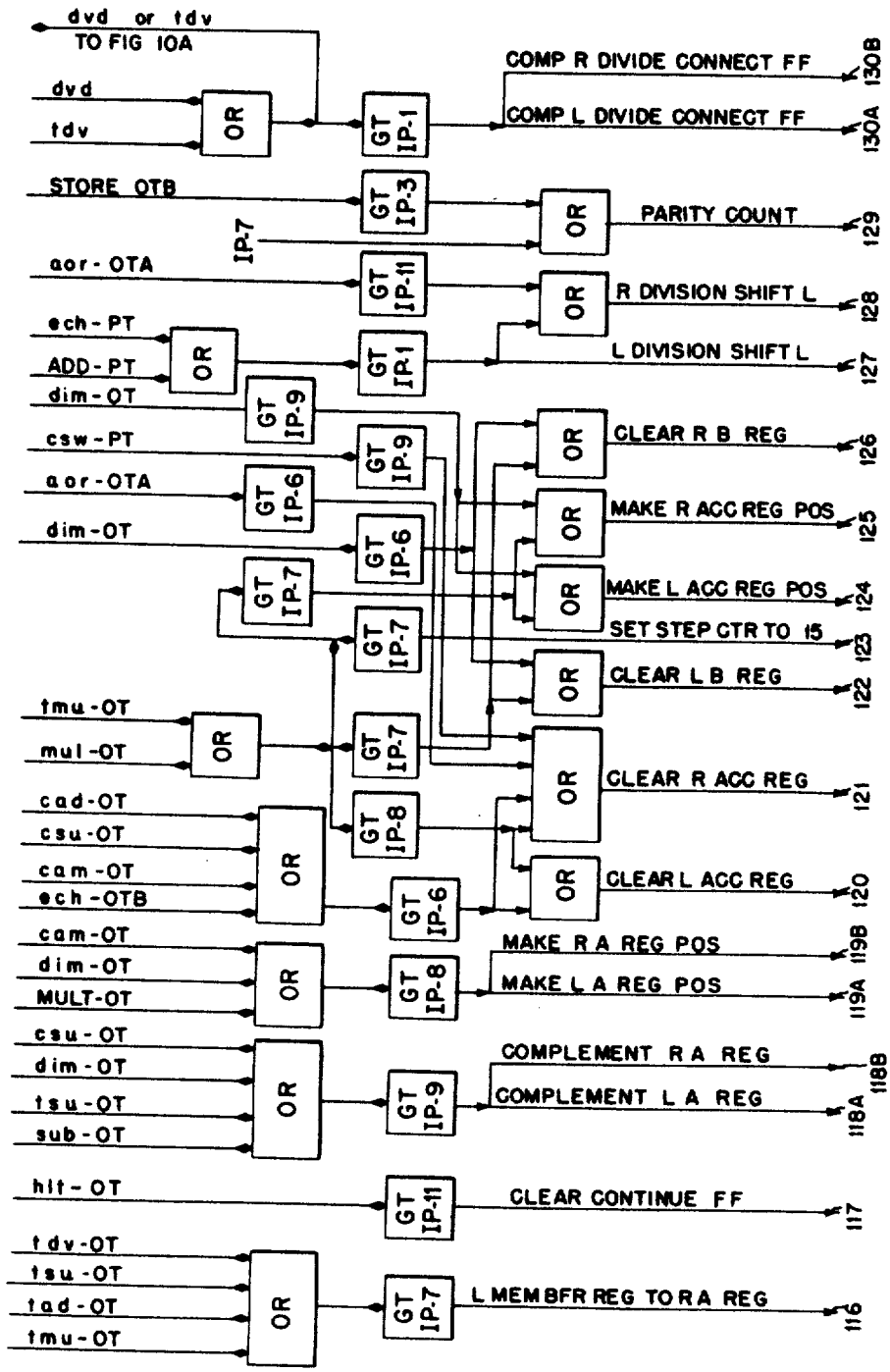

FIGS. 23a through 23d, when arranged according to FIG. 23, illustrate in logical block form those circuits of the Selection and IO Control Element identified by block 49 in FIG. 3g.

FIGS. 24a through 24e when arranged end to end in that order, are a logical block diagram of the Command Generator shown as block 53 in FIGS. 10a through 10c.

Figure 25:
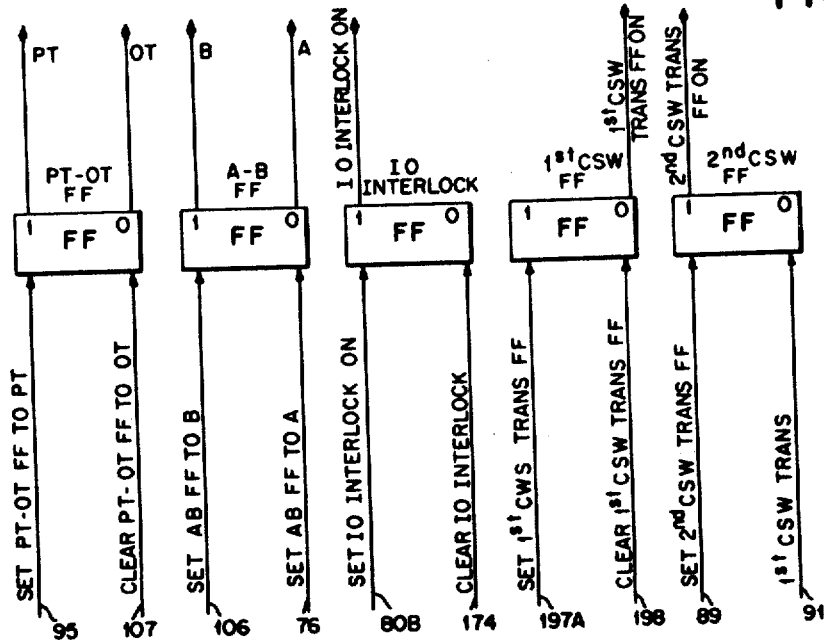

FIG. 25 is a logical block diagram of the Cycle Control Circuits shown as block 54 in FIG. 10b.

Figure 26:
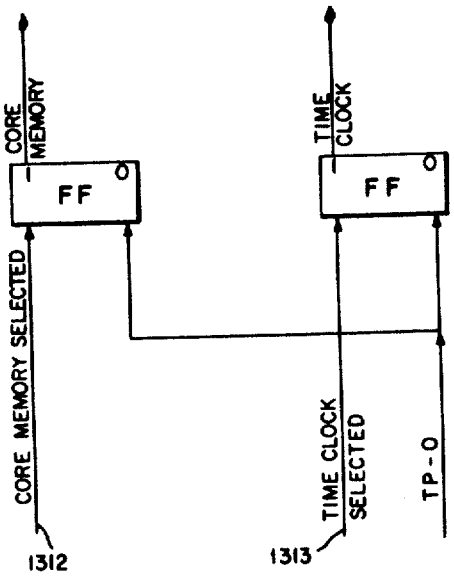

FIG. 26 is a logical block diagram of the Memory Unit Selection Circuits shown as block 58 in FIG. 10c.

FIG. 27 is a block schematic diagram of the Timing and Index Circuit shown as a block and accordingly labeled in FIG. 3f.

In a preferred embodiment the invention is employed to transfer signals to and from the memory of a data processing machine of a control equipment such as that claimed in copending patent application "K." Although the invention will be described as employed in such equipment it is not restricted to use in such equipment but will find application in numerous and different equipments as will become apparent from the following description.

CONVENTIONS EMPLOYED

Throughout the following description and in the accompanying drawings there are certain conventions employed which are familiar to certain of those skilled in the art. Additional information concerning those conventions is as follows:

In FIG. 1 of the drawing, each major part of the apparatus is shown as a block and data transfer and control between major parts is shown by single lines which interconnect those parts. Arrows on the lines of FIG. 1 indicate the direction of data transfer or control.

*In the Block Diagram figures of the drawing* subsequent to FIG. 1, a conventional filled-in arrowhead is employed on lines throughout the drawing to indicate (1) a circuit connection, (2) energization with standard positive pulses, and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer that the pulse represented by a filled-in arrowhead. A diamond-shaped arrowhead indicates (1) a circuit connection and (2) energization with a D.C. level. Cables which are used to transfer data are shown as two parallel lines with the arrowheads at one end thereof and at some point intermediate the ends of those cables, the two parallel lines are widened either in the form of a circle or in the form of a rectangular box and numbers appear within the circle or the rectangular box. Cables employing the circle indicate that the lines or conductors of that cable convey information by the presence or absence of a pulse in parallel transfer whereas those cables having a rectangular box indicate that (1) if those lines are pulse lines, the lines of that cable convey information at different times or (2) that those lines are D.C. level conductors. The numbers appearing within the circle or the rectangular box of a cable indicate the numbers of conductors within the cable. The D.C. levels are on the order of 10 volts when positive and 30 volts when negative, whereas pulses indicated by conventional filled-in arrowheads are positive-going 1/10 microsecond, half-sine 20 to 40 volts in amplitude. Pulses indicated by conventional un-filled-in arrowheads are not necessarily sinusoidal, are usually pulses considerably longer than 1/10 microsecond in duration and those referred to hereinafter are in general on the order of 1 to 10 microseconds in duration. The input and output lines of the block symbols are connected to the most convenient side of the block including the same side in some cases. An input line to a corner of a block symbol and an output line from the adjacent corner of that block symbol indicates that the pulses or D.C. levels are applied to the input of the circuit represented by the block and the input conductor is electrically connected to the output conductor of the adjacent corner.

Bold face character symbols appearing within a block symbol identify the common name for the circuit represented, that is, FF identifies a flip-flop, GT a gate circuit, OR a logical OR circuit, and so forth. The character subscripts preceding bold face characters identify the model of the circuit identified by the bold face character, that is, $_A$FF identifies the model A flip-flop, $_C$FF identifies the model C flip-flop and so forth.

*In the description* the general arrangement of the apparatus of a preferred embodiment of this invention will first be described with respect both to the manner in which the various circuit components and apparatus are interconnected and in respect to the general over-all operation which is performed by these components and apparatus. The description of the general arrangement will be followed by separate and detailed descriptions of the various components and apparatus, which so require it, and each section of the description will have a heading which indicates the apparatus about to be described.

The following is an Index or Table of Contents of the description:

TABLE OF CONTENTS

| | Column |
|---|---|
| Introduction to Control Equipment | 5 |
| Functional Description of Control Equipment | 8 |
| Input System | 8 |
| Drum System | 11 |
| Computer System | 13 |
| Memory Element | 14 |
| Computer System Timing | 14 |
| Table 1 (Machine or Memory Cycles) | 15 |
| Table 2 (Instructions) | 17 |
| Instruction Control Element | 17 |
| Table 3 (Class Cycle Matrix Codes) | 17 |
| Table 4 (Instruction Matrix Codes) | 18 |
| Command Generation | 18 |
| Table 5 (Commands Directly Generated by Time Pulse Distributor) | 19 |
| Table 6 (Commands Generated by PT Condition) | 19 |
| Table 7 (Core Memory Commands) | 19 |
| Table 8 (Commands Generated by wrt-PT or rds-PT Condition) | 20 |
| Table 9 (Commands Generated by sel-PT or sdr-PT Condition) | 20 |
| Table 10 (Commands Common to All PT Cycles) | 21 |
| Table 11 (Commands Common to All OT Cycles) | 22 |
| Read Operation From Input Drum | 22 |
| Load Address Counter Instruction | 22 |
| Table 12 (Unique Commands of ldc) | 23 |
| Select Drums Instruction | 23 |
| Table 13 (Unique Commands of sdr) | 23 |
| Read Instruction | 24 |
| Table 14 (Unique Commands of rds) | 24 |
| Table 15 (Break-In Commands) | 28 |
| Detailed Description of Components | 29 |
| Read Status Control Circuits | 30 |
| Read Control Circuit | 31 |
| IO Buffer Registers | 32 |
| IO Registers | 32 |
| IO Address Counter | 33 |
| IO Word Counter | 33 |
| Drum Control Register | 34 |
| Memory Buffer Registers | 34 |
| Selection and IO Control Element | 36 |
| Table 17 | 36 |
| Table 18 | 36 |
| Word Transfers from Drum to Memory | 37 |
| Command Generators | 39 |
| Table 19 | 40 |
| Cycle Control Circuit | 40 |
| Memory Unit Selection | 40 |
| Timing and Index Circuit | 40 |

INTRODUCTION TO CONTROL EQUIPMENT

Reference is made to FIG. 1 which shows in simplified block form the equipment comprising the invention. The Control Equipment may be considered as having four major systems, each system, each signal source and and each controlled object being shown by a block symbol in FIG. 1.

FIG. 1 shows a SIGNAL SOURCE 1 and a SIGNAL SOURCE 2. There may be as many signal sources as required, that is, there may be a signal source for each object to be controlled, there may be several signal sources for any one object to be controlled or there may be one signal source for several objects to be controlled. The signal sources may be of any suitable form and their characteristics will be largely determined by the device or devices which are to be controlled. In the case that the controlled object is a moving object, such as an aircraft, and the control equipment is so constructed as to automatically deliver signals which indicate the degree of control to be effected upon the moving object, the signal sources may be suitable radar equipment so constructed as to produce signals representative of the instantaneous position or positions of the object or objects to be controlled.

The signals produced by the signal sources may be in serial digital data form and are transmitted to an INPUT SYSTEM 3 where, if in serial form, they are converted into parallel form and stored for subsequent delivery to a DRUM SYSTEM 4. Signals stored in the INPUT SYSTEM 3 are delivered to the DRUM SYSTEM 4 and written in parallel form into the first available empty drum register. These stored signals are processed by a COMPUTER SYSTEM 5 in accordance with a stored program and results of the computation (signals in parallel form) are delivered to the DRUM SYSTEM 4 where they are stored in the first available empty register. These signals representative of computations are read from the DRUM SYSTEM 4 to an OUTPUT SYSTEM 6 where the parallel signals are converted into serial signals and delivered to controlled moving objects 7 and 8.

As so far described, it will be apparent that the signals stored in the INPUT SYSTEM 3 will be delivered to the COMPUTER SYSTEM 5 with a variable time delay which is primarily a function of the rate at which reading operations of the COMPUTER SYSTEM take place, which are in turn controlled by the stored program.

Figure 2:
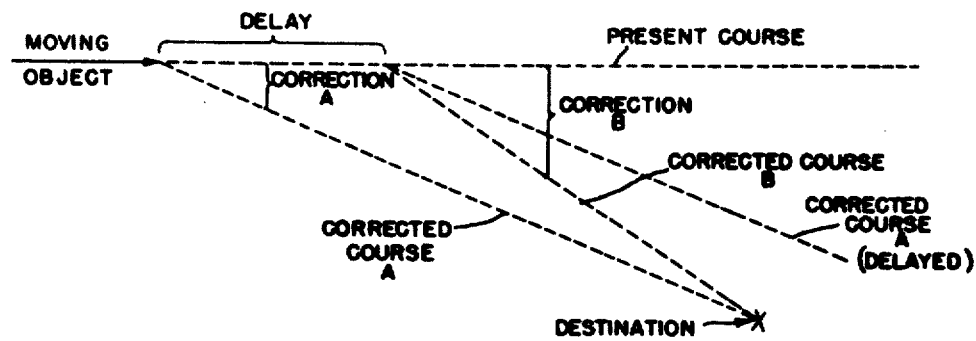
FIG. 2 is a diagram illustrating the effects of delays encountered in the transmission of signals in the equipment of FIG. 1.

Reference is now made to FIG. 1 and FIG. 2. It will be assumed that the SIGNAL SOURCE 1 produces signals indicating the successive instantaneous positions of the moving object, the last of which is shown by the head of the arrow in FIG. 2. If these instantaneous positions are delivered to the COMPUTER SYSTEM 5 without delay, the computer can generate a control signal having a magnitude indicated as Correction A in FIG. 2. This Correction Signal A if immediately received by the moving object will cause the moving object to move in a direction indicated in FIG. 2 as Corrected Course A and the moving object would arrive at the point marked Destination. However, if the instantaneous position of the moving object was delayed in transmission through the INPUT SYSTEM 3 and the DRUM SYSTEM 4, and the COMPUTER SYSTEM 5 generated the signal Correction A and immediately delivered that Correction A signal to the moving object, the moving object would move in the direction marked Corrected Course A Delayed and the moving object would not arrive at the destination.

Each signal delivered from the INPUT SYSTEM 3 through the DRUM SYSTEM 4 to the computer has a time tag which accompanies it. With this time tag the COMPUTER SYSTEM 5 can detect the amount of delay which the input signal has had and generate a control signal (based upon predictions) having a magnitude indicated in FIG. 2 as Correction B and therefore the moving object will arrive at the destination by way of Corrected Course B.

From the above description with reference to FIG. 1 it will also be noted that signals produced by the COMPUTER SYSTEM 5, which are representative of final computations, are delayed in the DRUM SYSTEM 4 by an amount of time which is primarily a function of the rate of which the OUTPUT SYSTEM 6 accepts signals from the DRUM SYSTEM 4. These signals are also delayed by an amount of time determined by the empty and full status of the registers of the DRUM SYSTEM 4.

Referring again to FIG. 2 and assuming that the instantaneous position of the moving object is as shown by the arrow in FIG. 2 and the COMPUTER SYSTEM 5 generates a control signal having a magnitude indicated in FIG. 2 as Correction A, if this Correction A signal is immediately effective upon the moving object it will arrive at the destination as indicated by Corrected Course A in FIG. 2. However, if this Correction A signal is delayed in the DRUM SYSTEM 4 by the amount indicated in FIG. 2 then the path of the moving object would be as indicated in the drawing Corrected Course A Delayed, and the moving object would not arrive at the destination.

The COMPUTER SYSTEM 5 receives signals from the OUTPUT SYSTEM 6 which indicate the amount of delay which a signal now generated by the COMPUTER SYSTEM 5 will encounter. The COMPUTER SYSTEM 5 uses these signals from the OUTPUT SYSTEM 6 to make the necessary computations so that when generated control signals are effective upon the moving object, it will move in the direction marked Corrected Course B in FIG. 2 and the moving object wil arrive at the destination.

When the COMPUTER SYSTEM reads from the DRUM SYSTEM or writes on the DRUM SYSTEM it should not interrupt the sequence of the program except for the brief interval of time required for that reading or writing operation.

In accordance with still another feature of this invention, the COMPUTER SYSTEM operates in what is known as Break Cycles when performing an input or an output instruction. Essentially the reading or writing operation of the COMPUTER SYSTEM is done in block transfers, that is, when the COMPUTER SYSTEM is to read from or write on the drum the READ and WRITE instructions establish the number of words to be read from or written on the DRUM SYSTEM and merely initiate the reading or writing operation. Before that operation is actually executed, the COMPUTER SYSTEM may proceed with the subsequent instructions of the program. The actual execution of the input or output instruction takes place whenever the information is available for transfer to or from the DRUM SYSTEM and in this way the normal sequence of instructions of the program is interrupted only for the length of time actually required for the execution of the input or the output instruction.

BLOCK DIAGRAM OF THE COMPUTER

Reference is now made to FIG. 1a which shows a simplified block diagram directed to the invention. Signals from the input-output system 1601 are delivered to the read-write section 1603 of the magnetic drum 1605. As the drum rotates, the information is transferred to or from the drum. The computer system includes a main memory element 1607 and an arithmetic element 1609.

Words defined by signals received from address register 1611 are delivered to memory buffer 1613 under control of an instruction control element 1615. A portion of the word in the memory buffer register 1613 is delivered to the address register 1611 and a portion to the operation register 1615. The signals which are read from the memory element may be termed a word. The information transferred to the address register will define the location in the memory element 1607 where data may be stored or from which additional pertinent data may be obtained. The data delivered to the operation register 1617 contains coded data which specifies the particular operations that the computer is to perform. Such data may be referred to as instructions. The decoding of this data (instructions) takes place principally in the instruction control element 1615.

Transfer between the drum and the memory element are normally performed on a block basis; that is, a sequence of three instructions is decoded and establishes that a specific memory register in memory element 1607 is the first memory register to be involved in a data transfer, that words are to be transferred between the drum and memory, and that a specified maximum number of words are to be read from the drum or written on the drum. When a transfer is to be effected, the signals stored in the address register 1611 are delivered to the IO address counter 1619. The signals in the IO address counter define the location in the memory element into which data is to be transferred or from which information is to be transferred.

Each word stored on the drum has identification signals accompanying it. It is desirable to specify which words bearing specific identification signals are to be accepted. When a transfer between the drum and memory element is to be effected, the instruction control element prevents any further transfer of data between the drum and the memory under control of other instructions from being executed until the present transfer has been completed. The IO word counter 1623 is a counter which determines the number of words which are to be transferred. When the transfer operation is to begin, the data along with the identification signals is read from the drum and transferred to the IO buffer register. Signals are transferred to the drum control register 1621 from the address register 1611 which when compared with the identification signals read from the drum will cause an indication of the desired comparison to be sent to the IO control element 1627. The identification signals in the IO buffer register are compared with those in the drum control register 1621 to determine if the properly tagged information in the drum is under the read heads. The identification signals are commonly termed tags. When the comparison is successful, the drum control register 1621 notifies the IO control element 1627 of the successful comparison. In the embodiment of the invention illustrated a magnetic drum stores tagged information and the information is transferred to a receiving device which is a main memory. The invention is not limited to a magnetic storage drum but the tagged information may be stored in other types of storage devices other than a magnetic drum and the information may be transferred to other receiving devices. The IO control element 1627 controls the transfer so the data is transferred to the location in memory 1607 identified by the IO address counter 1619. The IO control element 1627 actuates the IO address counter and IO word counter to reflect the change as transfer continues. The information is transferred from the drum to the IO buffer register 1625, to the IO register 1627, to the memory buffer register 1613 before eventually being transferred to the desired location in the memory element. The IO word counter 1623 counts the number of words being transferred and stops the transfer when the desired number have been transferred. The drum writing operation is also normally performed on a block basis in a similar manner.

The status sections 1631 and 1633 assure that information is not read into an already full register nor is information attempted to be read from an empty register.

After information has been read out of or into a storage register the status sections will, under the control of the IO control element, reflect the new condition for future operation.

FIG. 1a is a simplified block diagram of equipment constructed in accordance with the principles of the invention. More detailed information will be found in the following description and accompanying drawings.

FUNCTIONAL DESCRIPTION OF THE CONTROL EQUIPMENT

Reference is now made to FIGS. 3a through 3h which, when arranged in accordance with FIG. 3, illustrate in block form the Control Equipment comprising this invention.

Input System

The INPUT SYSTEM referred to in FIG. 1 is shown in FIG. 3e to include a Range, Theta and Identity Section 9 and a Time Tag Section 10. The Range, Theta and Identity Section 9 receives signals from each of the SIGNAL SOURCES 1 and 2 (FIG. 1) by way of their corresponding group of three conductors, labeled Timing, Sync and Data.

Reference is now made to FIG. 4 which is a timing chart which shows the timing relationship between timing, sync and data signals. The input signals are in the form of pulses, the pulses appearing on the three separate input conductors. The first input conductor is called the timing input, the second input conductor is called the sync input and the third input conductor is called the data input. As shown in FIG. 4, successive pulses are received on the timing conductor. Coincident in time with one of the timing pulses, a sync pulse may occur on the sync input. In FIG. 4 the sync pulse is assumed to occur coincident in time with the timing pulse labeled ITP–1. Beginning with the third timing pulse following the sync pulse, a pulse or no pulse coincident in time with corresponding timing pulses will be received on the data input, the presence of a pulse indicating a binary ONE and the absence of a pulse indicating a binary ZERO. In FIG. 4 the data signals are shown as dotted lines to emphasize that there may or may not be a pulse at any of those indicated times. The bit coincident in time with timing pulse ITP–4 is called a "busy" bit and if there is a pulse in the busy bit, this pulse indicates that a message follows. A message is in digital form having two words and each word could be said to have two half-words. Bits 1 through 10, which are coincident in time with timing pulses ITP–5 through ITP–14, could be said to be the first half-word or left half-word and may be binary signals representing the R coordinate of the instantaneous position of the moving object. Bits 1 through 12, which are coincident in time with timing pulses ITP–16 through ITP–27, could be said to be the second half-word or right half-word and may be binary signals representing the theta coordinate of the instantaneous position of the moving object. In order to simplify the operational description, it will be assumed that the position of an object is defined in a plane. It will be understood however that in many applications the position will be in 3 dimensions. The bit coincident in time with ITP–27 is called a parity bit and is either a pulse or no pulse dependent upon the number of binary ones in the R data and theta data, that is, the sum of binary ones in R and theta and the parity bit is an even number. The presence of a pulse on the data conductor coincident with ITP–28 indicates that a second word occurs in the message. The second word may be representative of any desired information.

The second sync pulse occurs at ITP–53 time and the busy bit for the next message occurs at ITP–56 time. The second message, like the first message, could be said to have two words, each word having two half-words.

Referring back to FIGS. 3a through 3b, and particularly to FIG. 3e, the busy bits as well as the sync pulses and timing pulses are used in the Range, Theta and Identity Data Section for control purposes. This section of the INPUT SYSTEM also receives timing pulses (DTP pulses) and Demand pulses from the DRUM SYSTEM 4.

As will be described in greater detail hereinafter, as the magnetic drum of the DRUM SYSTEM 4 rotates, successive drum registers pass beneath the data writing heads and data reading heads. Each drum register occupies a space such that the register takes approximately 10 microseconds to pass beneath those reading and writing heads. During each of these 10 microsecond intervals four timing pulses (DTP1, DTP2, DTP3 and DTP4) are generated which are approximately 2.5 microseconds apart and appear on separate conductors. Of these drum timing pulses DTP1, DTP2 and DTP4 are delivered to the Range, Theta and Identity Section 9 for synchronizing operations therein. Each pulse received from the conductor labeled Drum Demand effectively requests the INPUT SYSTEM to deliver two successive 33 bit parallel words spaced 10 microseconds apart. The Range, Theta and Identity Section 9 also receives D.C. level signals from the Time Tag Section by way of conductors labeled Odd and Even. The Time Tag Section receives pulses from each of the conductors labeled One Pulse Every 8 Seconds and One Pulse Every .25 Second. This section is basically a binary counter which is reset to ZERO in response to a pulse on the conductor labeled One Pulse Every 8 Seconds and counts the pulses received from the conductor labeled One Pulse Every .25 Second. If the total number of binary ONES of the count is an even number, a positive D.C. level is delivered to the conductor labeled Even whereas if the total number of binary ONES in the count is an odd number, a positive D.C. level is delivered to the conductor labeled Odd. The Time Tag Section also receives Drum Timing pulses DTP1, DTP2 and DTP3 in order to synchronize the operation of that section with respect to the Drum System.

The INPUT SYSTEM functions as follows:

(1) The input data bits of a message which are received in serial form and are stored in the Range, Theta and Identity Section for delivery in parallel form provided that the data bits are preceded by a busy bit pulse and the total number of binary ONES in the message is an even number.

(2) Provided that (a) data bits of a message have been stored and (b) a Drum Demand pulse is received, pulses representative of the Range and Theta data of the first word of the message are delivered to 22 of the conductors of cable 11 and 10 microseconds thereafter, pulses representative of the second word of the message are delivered to those conductors of cable 11.

(3) When pulses representative of the first or second word of a message are delivered to those 22 conductors of cable 11, pulses identifying which source that message came from are delivered to three of the other conductors of cable 11.

(4) Each time that pulses are delivered to the above mentioned 22 conductors of cable 11, a parity signal is delivered to still another conductor of cable 11. This parity signal will be a pulse if an odd signal is received from the Time Tag Section and the total number of pulses delivered to the 22 conductors of cable 11 is an even number or if an even signal is received from the Time Tag Data Section and the total number of pulses delivered to the 22 conductors of cable 11 is an odd number. The parity signal will be a no pulse if an even signal is received from the Time Tag Data Section and the total number of pulses delivered to the conductors of cable 11 is an even number or if an odd signal is received from the Time Tag Data Section and the total number of pulses delivered to the 22 conductors of cable 11 is an odd number.

(5) Each time that pulses are delivered to the conductors of cable 11; (a) a pulse is delivered to the conductor labeled Data Available and (b) a pulse is delivered to the conductor labeled Time Tag Read-Out.

(6) In response to a pulse on the conductor labeled Time Tag Read-Out, the Time Tag Data Section delivers signals to the conductors of a cable 12 representative of the instantaneous count of One Pulse Every .25 Second pulses which have been received subsequent to the last pulse received from the conductor labeled One Pulse Every 8 Seconds.

Summarizing the operation of the INPUT SYSTEM, if the message has been received and checked for parity, and subsequent thereto a Drum Demand pulse is received, two 33 bit words are produced with a Data Available pulse accompanying each word. The bit assignments of the first word of each message produced by the INPUT SYSTEM are shown in FIG. 6.

Referring now to FIG. 6, starting from the left, the first bit (called the parity bit) is either a pulse or no pulse (binary ONE or ZERO) dependent upon the number of binary ONES in the remaining 32 bits of the word. The parity bit makes the total number of binary ONES in the 33 bit word an odd number. The left sign bit is meaningless while the L1 through L5 bits represent the binary count of the number of 1 pulses per .25 second pulses which have been received since the last received pulse of the 1 pulse per 8 second pulses. This count of the number of 1 pulse per .25 second pulses is called a "time tag" and as will be explained in greater detail hereinafter, this count can be used to determine the age of a word of data at the time that the word is used by the COMPUTER SYSTEM 5. The L6 through L15 bits are the bits of the left half-word of the first word of the message received by the INPUT SYSTEM. As noted with respect to FIG. 4, this half-word represents the R coordinate of the position of the moving object. The right sign bit is meaningless while the R1 through R3 bits are a binary code that indicates which one of the several SIGNAL SOURCES that particular word was received from. The R4 through R15 bits are the bits of the right half-word of the first word of the message received from the INPUT CHANNEL SECTION and may represent the $\theta$ coordinate of the position of the moving object.

The bit assignments of the second word of each message may be identical to the bit assignments of the first word. However, bits of the second word which correspond to the R and theta bits of the first word may be representative of information other than Range and theta, such as, for example, the amount of delay which this message has received prior to having been delivered to the INPUT SYSTEM. Although the time tag and the source identity information accompanies both the first word and the second word of the message, it will be understood that in certain applications the time tag and the source identity information need be sent with only one word of the message.

More detailed information concerning the INPUT SYSTEM and a preferred embodiment of the INPUT SYSTEM will be found in the above noted copending application "B."

*Drum System*

As previously noted with respect to FIG. 1, signals from the INPUT SYSTEM 3 are delivered to the DRUM SYSTEM 4. Those circuits of the DRUM SYSTEM which deliver signals to or receive signals from the COMPUTER SYSTEM are designated CD (Computer and Drum Interchange) whereas those circuits of the DRUM SYSTEM which deliver signals to or receive signals from systems other than the COMPUTER SYSTEM are designated OD (Outside and Drum Interchange). As illustrated in FIGS. 3e and 3f, the DRUM SYSTEM 4 may be considered as including (1) an OD DRUM WRITE ELEMENT 13, (2) a CD DRUM READ ELEMENT 14, (3) an OD DRUM READ ELEMENT 15, (4) a CD DRUM WRITE ELEMENT 16, (5) a DRUM AND HEAD ASSEMBLY 17, and (6) a DRUM COMMON ELEMENT 18.

As the drum rotates, a portion of the drum surface (known in the art as a timing channel) passes beneath a reading head 19. This timing channel is indicated in FIG. 3 as a dotted line, labeled accordingly, and is in reality merely a succession of magnetized spots. These spots are recorded on the drum surface in such a manner that when the drum rotates a sine wave signal is induced in the read head 19. Each magnetized spot of the timing channel occupies a space indicating a drum register. As a magnetized spot passes underneath the read head 19 one sine wave cycle of voltage is induced in the winding of the read head. Assuming that there are 2,048 equidistantly spaced spots in the timing channel, the drum is said to have a closed timing channel and 2,048 registers. As the drum rotates, another portion of the drum surface (designated as an index channel) passes underneath another read head 20 and still another read head 21. This index channel is indicated in FIG. 3 as a dotted line, labeled accordingly, and is in reality merely a succession of equidistantly spaced magnetized spots with one of those spots being magnetized in the opposite direction with respect to all other spots. When this one magnetized spot passes underneath the read head 20 and read head 21, one sine wave of voltage of opposite phase with respect to the other cycles is induced in the windings of each of those read heads. These heads are circumferentially displaced so that this unique sine wave is induced in those heads at different times.

Since the timing channel effectively divides the drum surface into 2048 equidistantly spaced registers around the circumference of the drum, the oppositely polarized spot in the index channel when received by the read head 20 is arbitrarily said to be the zero register and the oppositely polarized spot when received by the read head 21 coincides in time with the last or 2047th register.

The signals induced in the read heads 19, 20 and 21 are delivered to a Timing and Index circuit 22. For the purposes of the immediate description this timing and index circuit is capable of performing the following functions:

(1) Upon receipt of each cycle of voltage from the read head 19, the previously noted DTP1 through DTP4 pulses are generated, and (2) In response to the cycle of voltage received from the read head 20 which is of opposite phase to all other cycles, the TIMING AND INDEX CIRCUIT produces a pulse on the conductor labeled CD IX hereinafter referred to as the CD index pulse and this pulse occurs coincident in time with one of the DTP1 pulses, and (3) In response to the cycle of voltage induced in the read head 21, which is of opposite phase, the TIMING AND INDEX CIRCUIT produces a pulse on the conductor labeled OD IX, hereinafter referred to as the OD index pulse and this pulse occurs coincident in time with one of the DTP3 pulses.

As the drum rotates still another portion of the drum surface (referred to hereinafter as OD STATUS CHANNEL) passes beneath a read head 22 and a write head 23. The OD STATUS CHANNEL is also a succession of magnetized spots representative of binary ONES and binary ZEROS. A binary ZERO recorded in the OD STATUS CHANNEL indicates that the register of the drum which corresponds to that bit is empty whereas a binary ONE recorded in the OD STATUS CHANNEL indicates that the register corresponding to that bit is full.

As the drum rotates still another portion of the drum surface (hereinafter referred to as the CD STATUS CHANNEL) passes beneath a write head 24 and a read head 25. The CD STATUS CHANNEL is also a succession of magnetized spots. A binary ONE recorded in the CD STATUS CHANNEL indicates that the register corresponding to that bit is full, whereas a binary ZERO recorded in the CD STATUS CHANNEL indicates that the register corresponding to that bit is empty.

Signals from the read head 22 are delivered to an OD WRITE STATUS CONTROL SECTION 26 of the INPUT DRUM WRITE ELEMENT 13.' The OD WRITE STATUS CONTROL SECTION 26 in addition to receiving the signals from the OD STATUS CHANNEL receives the previously mentioned Data Available signals from the Range, Theta and Identity Section 9 of the INPUT SYSTEM 3 and also receives DTP and OD index pulses as well as Status Write Sample pulses.

The OD WRITE STATUS CONTROL SECTION 26 functions as follows:

(1) If a ZERO signal or no signal is received from the read head 22 (including that the next register which is available to be written into either contains no word or a word which has already been transferred from the drum) a Demand pulse at DTP3 time is applied to the conductor labeled Drum Demand provided that this next register is an even numbered register.

(2) If a binary ONE signal is received from the read head 22 (indicating that the next register which is available to be written into contains a word which has not yet been transferred from the drum) a Write a One signal at DTP3 time is applied to the write head 24.

(3) If a pulse is received from the conductor labeled Data Available, a write pulse at DTP3 time is applied to the comductor labeled Write followed by a reset pulse at DTP4 time being applied to the conductor labeled Reset, and a Write a One signal at DTP3 time is applied to the write head 24.

(4) If a ZERO signal or no signal is received from the read head 22 and no Data Available pulse is received in response to the pulse on the conductor labeled Drum Demand, a Write a Zero signal beginning at DTP3 time is applied to the write head 24.

The OD DRUM WRITE ELEMENT 13 also includes an OD WRITE SECTION 27 which receives 33 bit word signals from the INPUT SYSTEM 3, stores those signals and in response to the Write pulse from the OD WRITE STATUS CONTROL SECTION 26 it delivers signals representative of the 33 bit word to a set of write heads 28 which are positioned adjacent to an input drum field 29. In a similar manner, by use of the signals from the STATUS CHANNEL, successive words of a block of data are randomly stored on the drum, that is, in available or empty storage registers of the drum. Obviously, in the first use of the drum system, the entire surface of the drum is available for storage and all signals from the STATUS CHANNEL will so indicated. However, it must be borne in mind that since this is not an addressable drum, the writing operation when ready to be executed will commence at some random point on the drum. Also, it should be noted that in normal usage of the drum system, blocks of data from one or more sources are written on and subsequently read from the drum. Thus, as the drum system is used over and over again, different configurations of storage patterns will exist on the drum so that in all likelihood non-contiguous storage locations will be available for writing new information. This presents no problem inasmuch as the STATUS CHANNEL provides an indication of the available storage registers of the drum. Hence, this permits a new block of data to be written on the drum starting at a random point where there is an available storage register and continuing wherever subsequent available storage registers exist so that the data is randomly scattered over the surface of the drum. These subsequently available storage registers which may be in contiguous or non-contiguous storage locations constitute a random portion of the drum that is available for storing data.

The circuits involved in the operation of writing two successive words in adjacent registers of the drum on a "Status" basis are described in detail in the above noted copending application "G."

Signals recorded in the CD STATUS CHANNEL are delivered from the read head 25 to a CD READ STATUS CONTROL SECTION 30 of the CD DRUM READ ELEMENT 14. The CD READ STATUS CONTROL SECTION 30 also receives timing pulses from the Timing and Index Circuit 22. The CD READ STATUS CONTROL SECTION 30 performs the following functions:

(1) Provided that a read signal (positive 10 volts) is received from a conductor labeled Read, and a binary ONE signal (indicating a full register) is received from the read head 25, then a pulse is delivered to the conductor labeled Read Sample. If no pulse is received on the conductor labeled No Compare before the next DTP3 pulse following the Read Sample pulse, then a Write a Zero signal is delivered to the write head 23. If a pulse is received on the conductor labeled No Compare before the next DTP3 pulse following the Read Sample pulse, then a Write a One signal is delivered to the Write head 23.

(2) Provided that a read signal is received from the conductor labeled Read, and a binary ZERO signal (indicating an empty register) is received from the read head 25, then NO pulse is delivered to the conductor labeled Read Sample and a Write a Zero signal is delivered to the write head 23.

(3) Provided that a no read signal (−30 volts) is received from the conductor labeled Read then (a) if a binary ONE signal is received from the read head 25, a Write a ONE signal is delivered to the write head 23 and (b) if a binary ZERO signal is received from the read head 25, a write a Zero signal is delivered to the write head 23.

The CD DRUM READ ELEMENT 14 also includes an INPUT READ SECTION 31 which receives signals from the read heads 31a and delivers those signals in the form of .1 microsecond pulses to the conductors of cables 32 and 33 provided that a Read Sample pulse is received from the CD READ STATUS CONTROL SECTION 30.

*Computer System*

As noted above, reading operations from the drum require control signals on the conductor labeled Read and No Compare. These control signals result from operations within the COMPUTER SYSTEM 5 of FIG. 1. The COMPUTER SYSTEM shown as block 5 in FIG. 1 is shown in more detail in FIGS. 3a, 3b, 3g and 3h.

MEMORY ELEMENT

The COMPUTER SYSTEM includes a MEMORY ELEMENT 34 which functions as follows:

(1) In response to a pulse on a conductor 59 followed by a pulse on the conductor 36, the signals, stored in the particular memory register defined by the signals on the conductors of a cable 37, are delivered to the conductors of a cable 38 and a cable 39. The signals delivered to the conductors of cable 38 represent the left half-word of the word stored in the particular memory register whereas the signals delivered to the conductors of cable 39 represent the right half-word. This operation will hereinafter be referred to as reading a word from memory. This operation does not take place if a pulse is received on the conductor 40.

(2) In response to a pulse on the conductor 59 followed by a pulse on each of the conductors 36 and 40, the signals received from the conductors of a cable 41 and a cable 42 are stored in the memory register defined by the signals on the conductors of cable 37. This operation will hereinafter be referred to as storing a word in memory.

More detailed information concerning the Memory Element 34 and a preferred embodiment will be found in the above noted copending application "D."

As a result of the operation of reading a word from memory, the left half-word and the right half-word are delivered by way of the conductors of cables 38 and 39 to a Left Memory Buffer Register 43 and a Right Memory Buffer Register 44, respectively. In response to a pulse on the conductor labeled Left Memory Buffer Register to Operation Register, bits 1 through 10 of the left half-word stored in the Left Memory Buffer Register 43 are delivered by way of the conductors of a cable 46 to an Operation Register 47 and bits 10 through 15 are delivered by way of the conductors of a cable 48 to a Selection and Input-Output Control Element 49.

COMPUTER SYSTEM TIMING

Signals stored in the Operation Register 47 are delivered by way of the conductors of cable 50 to an INSTRUCTION CONTROL ELEMENT 51. The INSTRUCTION CONTROL ELEMENT generates various pulses dependent upon the signals received from the Operation Register 47. These pulses are delivered to units of the COMPUTER SYSTEM to cause various operations in a manner to be described in detail hereinafter. The relative occurrence times of these pulses with respect to other COMPUTER SYSTEM events are shown in FIG. 7. In FIG. 7 it will be seen that there are 15 time pulses in a machine cycle. Instruction pulses are numbered in the following manner: IP1, IP2, IP3, IP4, IP5, IP6, IP6A, IP7, IP8, IP8A, IP9, IP10, IP11 and IP11A. A similar method of numbering is utilized for the time pulses (TP's). A machine cycle begins with IP1 and ends with IP11A at which time the cycle is resequenced from 1 through 11A for the next machine cycle. TP and IP pulses are usually generated simultaneously.

The minimum time between successive words read from or written into the MEMORY ELEMENT 34 is called a memory cycle. As illustrated and described herein the time interval of a memory cycle is 7½ microseconds. The time pulses (shown as occurring at ½ microsecond intervals along the horizontal axis of FIG. 7) establish approximate relationships between events in the memory cycle and in the machine cycles. Except for those pulses which coordinate and synchronize the core memory with respect to the COMPUTER SYSTEM, the internal memory timing is independent of the time pulses. The machine cycle comprises an interval of time equal to the memory cycle and its events are controlled by the TP or IP pulses described above. Although the machine cycle is of the same duration as the memory cycle, the two should be distinguished since in certain program instructions, information from core memory is not used.

Operation of the COMPUTER SYSTEM may also be discussed in terms of an instruction cycle. An instruction cycle is defined as that time required for the COMPUTER to execute one complete instruction and is usually composed of from one to three machine cycles. Of the many instructions which may be performed by the COMPUTER SYSTEM some involve simple operations such as setting up control circuits or transferring words between registers. Because of this simplicity of operation, these instructions are completed in one memory cycle, or less, and are called "one-memory-cycle instructions."

Some of the many instructions require two memory cycles for completion and these instructions are called "two-memory-cycle instructions." Before such instructions can be completed, an operand must be obtained from the MEMORY ELEMENT 34 and therefore a second memory cycle is provided and during this second memory cycle the operand is obtained and the instruction completed. Still other instructions require three memory cycles for completion; the instruction word is obtained and decoded during the first memory cycle; an operand is obtained and the required operation is performed during the second memory cycle; and the result of the operation is stored in the MEMORY ELEMENT during the third memory cycle. The memory or machine cycles which compose the instruction cycle, have been assigned distinctive names for easy reference. The names and characteristics of these are listed in Table 1 below:

TABLE 1.—NAMES AND CHARACTERISTICS OF MACHINE OR MEMORY CYCLES

| Memory or Machine Cycle | Name | Characteristic |
| --- | --- | --- |
| First | Program Time (PT) | Decodes instruction and initiates execution. |
| Second | Operate Time A (OTA). | Obtains operand and performs operation. If no operate time B follows, this cycle is called simply operate time. |
| Third | Operate Time B (OTB). | Stores result of operation in core memory. |

Although a machine cycle begins with TP-0, an instruction cycle starts with IP7 of a program time cycle which is denoted PT7. FIG. 8 shows the basic machine and instruction cycle timing relationships. In FIG. 8 the instruction cycles are shown as cross-hatched areas on the sequence of the machine cycles. Thus in a one-memory cycle instruction, the decoding process starts at PT7 and the instruction is completed by PT6 of the subsequent machine cycle and the decoding of the next instruction is initiated at this time. Similarly, a two-memory-cycle instruction starts at PT7, continues through the subsequent OTA cycle and is completed by PT6 of the next PT cycle, when the execution of the next instruction begins. As has been noted, the time from IP1 to IP6 of a program time cycle is used to complete an instruction previously begun and this time interval is also utilized to bring the new instruction out of the MEMORY ELEMENT 34.

An exception to the usual sequence of machine cycles as described above occurs in certain instructions performed by the COMPUTER SYSTEM. In these instructions additional time is required for the performance of a series of repetitious operations. Such operations are multiplication, which requires repeated addition; and division, which requires repeated subtraction. This additional time is supplied by stopping the generation of IP pulses thus stopping the operation of instruction and machine cycle sequences. This stoppage is known as "Pause" since the COMPUTER SYSTEM pauses in its usual sequential operation long enough to complete the repetitious operations. An example of an instruction cycle utilizing a pause is depicted in the last diagram of FIG. 8. In the illustration, the decoding of the instruction begins at PT7; the operand (in this case either the multiplicand or the divisor) is obtained during the subsequent OTA cycle. At the end of the OTA cycle, the generation of instruction pulses is stopped and the COMPUTER SYSTEM goes into a pause, the duration of which is determined by the particular instruction being executed. The repetitious additions or subtractions composing the multiplication or division, for example, are executed during this period. The "pause" condition then ends and the program time cycle begins, completing the instruction by PT6.

An instruction word is read from the MEMORY ELEMENT 34 during each program time cycle. This word contains coded information which specifies the particular operations that the CENTRAL COMPUTER is to perform during the ensuing cycle. As stated in the preceding paragraph this cycle normally begins at PT7, when decoding of the instruction word is just beginning. The decoding of the instruction word takes place principally in the INSTRUCTION CONTROL ELEMENT 51. The 32 bits of the instruction word are given names to facilitate reference or discussion; these names are shown in FIG. 9.

Referring now to FIG. 9, the 32 bit instruction word is divided into two 16 bit half-words termed respectively the left and right half-words. Each half-word consists of the sign bit and 15 numerical bits which are designated LS, L1, L2, . . . L15 for the left half-word and RS, R1, R2 . . . R15 for the right half-word. The left half-word is sometimes called the operation part of the word and the right half-word the address part. Bits L1 through L3 are termed the "Index Indicator" since they are used to specify which of one of several index registers is to be used during indexing. Indexing provides a means of altering or cycling the COMPUTER SYSTEM program for repetitive operation and is more fully described in the above referred to copending application "D."

Bits L4 through L10 are termed the "operation code." These bits determine which one of the many instructions is to be performed. Bits L4 through L6 specify one of 8 classes of instructions whereas L7 through L10 specify one of the variations of the basic instruction class. Bits L10 through L15 are termed the index interval and are used to provide additional information required by particular instructions as described in greater detail in the previously referred to copending application "D." Bits L10 through L15 are also used for selection of one of the several input or output devices as will be subsequently described. Bit 10 is utilized in both the operation code and the index interval. However this causes no ambiguity for whenever the index interval is used by an instruction, bit 10 is not used to identify the instruction involved. Thus when the whole index interval is utilized, the appropriate instruction is completely specified by only those bits of the operation code instead of the usual seven.

The right half-word of the instruction word usually denotes the location in the MEMORY ELEMENT 34 where data may be stored or from which additional pertinent data may be obtained. This additional data usually takes the form of an operand required in the execution of a mathematical operation. In certain instructions the right half-word is used to load some of the registers within a PROGRAM ELEMENT 46 (FIG. 3h). The address part of an instruction word is meaningless in certain instructions since no reference to a memory unit is required. An example of this is the Clear and Subtract Word Counter instruction. In this case no new information from memory is necesary and there is no new information to be stored in memory and therefore the address part is extraneous and meaningless.

For the purpose of illustrating and describing this invention, the following table lists by name and code number those instructions which will be specifically described subsequently. It is to be understood that in many practical embodiments of this invention, many other instruction operations may be performed by the Equipment.

TABLE 2

| Class | Binary Code | Variation | Binary Code | Abbrev. |
|---|---|---|---|---|
| INPUT-OUTPUT | 110 | Load IO Address Counter. | 0000 | ldc |
| | | Select Drum | 001– | sdr |
| | | Select | 010– | sel |
| | | Read | 1110 | rds |
| | | Write | 1111 | wrt |

INSTRUCTION CONTROL ELEMENT

As previously noted with respect to FIG. 3a, the signals stored in the Operation Register 47 are delivered to the INSTRUCTION CONTROL ELEMENT 51. Although the ONE and ZERO signals of each of the 10 bits stored in the Operation Register are delivered by way of the 20 conductors to the INSTRUCTION CONTROL ELEMENT 51, bits 1 through 3 will receive no further consideration herein since their purpose is fully described in the previously mentioned copending application "D."

Reference is now made to FIGS. 10a, 10b and 10c which, when arranged end to end in that order, illustrate in logical block form the INSTRUCTION CONTROL ELEMENT shown as block 51 in FIG. 3a.

A Time Pulse Distributor 52, in response to a positive D.C. level on the conductor labeled Break or No Pause and pulses on the conductors labeled IP Driver and TP Driver, causes the IP conductors as well as the TP conductors to be sequentially and cyclically pulsed. The IP pulses are delivered to a Command Generator 53 where they will cause various ones of its output conductors to be pulsed. The particular ones of those conductors which are pulsed is dependent upon which of the various output conductors from a Cycle Control Circuit 54, a Class Cycle Matrix 55 and a Variation Matrix 56 are positive. It should be noted that various output conductors of the Class Cycle Matrix 55 and the Variation Matrix are applied to the input of an Instruction Matrix 57 whose outputs are connected to the Command Generator 53. It should be further noted that a Memory Unit Selector 58 has its outputs also connected to the Command Generator 53.

The Class Cycle Matrix 55, which is essentially a decoder and preferably of the conventional diode type, receives bits 4 through 6 of the Left half-word of an instruction. As previously noted, these bits specify one of several classes of instruction. The Class Cycle Matrix also receives signals from the Cycle Control Circuit 54. The output conductors of the Class Cycle Matrix are appropriately labeled in accordance with the conditions under which those conductors will be positive.

The following table shows which combination of positive potentials on input conductors will produce a positive potential on a given output conductor of the Class Cycle Matrix 55:

TABLE 3

| Output Conductor | Positive Potentials on Input Conductors | |
|---|---|---|
| | Code from Operation Register | From Cycle Control Circuit |
| MISC-OT | 000 | OT. |
| IO-OT | 110 | OT. |
| ADD-PT | 001 | PT. |
| ADD-OT | 001 | OT. |
| MULT | 010 | |
| MULT-PT | 010 | PT. |
| MULT-OT | 010 | OT. |
| STORE-PT | 011 | PT. |
| STORE-OTA | 011 | OT and A. |
| STORE-OTB | 011 | OT and B. |
| MISC-PT | 000 | PT. |
| IO-PT | 110 | PT. |

The Variation Matrix 56, which is also a decoder of the diode type, receives bits 7 through 10 of the left half-word of an instruction. As previously noted, these bits specify a variation within a given class of instructions. The output conductors of the Variation Matrix 56 are appropriately labeled in accordance with the binary code which causes the conductor to be positive.

Certain of the output conductors from the Class Cycle Matrix 55 and the output conductors from the Variation Matrix 56 are applied to the Instruction Matrix 57. The output conductors of the Instruction Matrix 57 are appropriately labeled in accordance with the conditions under which those conductors will be positive.

The following table shows which combination of positive potentials on input conductors will produce a positive potential on a given output conductor of the Instruction Matrix 57:

TABLE 4

| Output Conductor | Positive Potentials on Input Conductors | | |
|---|---|---|---|
| | From Class Cycle Matrix | From Variation Matrix | From Cycle Control Circuit |
| tmu | MULT | 1011 | |
| mul | MULT | 1010 | |
| tad-OT | ADD-OT | 0010 | |
| dim-OT | ADD-OT | 1101 | |
| tsu-OT | ADD-OT | 1000 | |
| csu-OT | ADD-OT | 0110 | |
| add-OT | ADD-OT | 0001 | |
| sub-OT | ADD-OT | 0111 | |
| cad-OT | ADD-OT | 0000 | |
| cam-OT | ADD-OT | 1100 | |
| dud | MULT | 1100 | |
| tmu | MULT | 1011 | |
| tdv | MULT | 1101 | |
| dvd-PT | MULT-PT | 1100 | |
| tdv-PT | MULT-PT | 1101 | |
| mult-OT | MULT-OT | 1010 | |
| tmu-OT | MULT-OT | 1011 | |
| dvd-OT | MULT-OT | 1100 | |
| tdv-OT | MULT-OT | 1101 | |
| fst-PT | STORE-PT | 0101 | |
| ech-PT | STORE-PT | 1010 | |
| rst-OTA | STORE-OTA | 0111 | |
| aor-OTA | STORE-OTA | 1001 | |
| lst-OTA | STORE-OTA | 0110 | |
| sta-OTA | STORE-OTA | 1000 | |
| ech-OTA | STORE-OTA | 1010 | |
| rst-OTB | STORE-OTB | 0111 | |
| aor-OTB | STORE-OTB | 1001 | |
| lst-OTB | STORE-OTB | 0110 | |
| sta-OTB | STORE-OTB | 1000 | |
| fst-OTB | STORE-OTB | 0101 | |
| ech-OTB | STORE-OTB | 1010 | |
| hlt-PT & IO Interlock ON | MISC-PT | 0000 | IO Interlock ON. |
| csw-PT | MISC-PT | 0100 | |
| hlt-PT | MISC-PT | 0000 | |
| IO-PT & IO Interlock ON | IO-PT | | IO Interlock ON. |
| sel-PT | IO-PT | 010– | |
| sdr-PT | IO-PT | 001– | |
| rds-PT | IO-PT | 1110 | |
| wrt-PT | IO-PT | 1111 | |
| sel-OT | IO-OT | 010– | |
| sdr-OT | IO-OT | 001– | |

The Class Cycle Matrix 55, the Variation Matrix 56 and the Instruction Matrix 57 may be of well known construction and require no further description as to their structure.

Since the Command Generator 53 produces many command pulses which are generated in a particular order for various instructions and since an understanding of those command pulses will assist in an understanding of this invention, the commands will be discussed as to the conditions under which a given command is generated and these commands are also tabulated in FIGS. 11a through 11e. FIGS. 11a through 11e show for a given instruction, the commands which are generated during that instruction time and also show the time of the PT and OT cycles at which a given command occurs. While reading the following discussion as to under what circumstances a given command is generated it should be noted that the information is tabulated in FIGS. 11a through 11e.

In FIGS. 10a, 10b and 10c the commands produced by the Command Generator 53 and the Time Pulse Distributor 52 are identified by a particular reference number on each conductor. The reference numbers will not only serve to identify the conductors but also serve to identify the command number associated with a given conductor.

The following commands are generated at the indicated time directly from the output of the Time Pulse Distributor 52:

TABLE 5

| Command Name | Conductor (Command) Number | Time |
| --- | --- | --- |
| Clear Memory Controls | 59 | TP-0. |
| Clear Left Memory Buffer Register | 60A | TP-1. |
| Clear Right Memory Buffer Register | 60B | TP-1. |

Each of the following commands is generated by the Command Generator 53 as a result of a positive potential received from the conductor labeled PT:

TABLE 6

| Conductor (Command Number) | Command Name | Time |
| --- | --- | --- |
| 61 | Program Counter to Memory Address Register. | IP-1. |
| 62 | Clear Address Register. | IP-6. |
| 63A | Clear Operation Register. | IP-6. |
| 63B | Clear Index Interval Register. | IP-6. |
| 64 | Clear Step Counter & Divide Time Pulse Distributor. | IP-6. |
| 65A | Record Left Overflow. | IP-6. |
| 65B | Record Right Overflow. | IP-6. |
| 66 | Add ONE to Program Counter. | IP-7. |
| 67A | Left Memory Buffer to Operation Register. | IP-7. |
| 67B | Right Memory Buffer to Address Register. | IP-7. |

In response to a positive D.C. level on the conductor labeled OT, the Command Generator 53 produces a pulse on the conductor 68 and this command which occurs at IP-1 time is called Address Register to Memory Address Register.

In response to a positive potential on the conductor labeled Core Memory the following commands are generated at the times indicated:

TABLE 7

| Command Name | Conductor (Command) Number | Time |
| --- | --- | --- |
| Start Memory | 69 | IP-2. |
| Parity Check | 70 | IP-11. |

In response to a positive potential on the conductor labeled wrt-PT or the conductor labeled rds-PT the following commands are generated at the times indicated:

TABLE 8

| Command Name | Conductor (Command) Number | Time |
| --- | --- | --- |
| Address Register Complement to IO Word Counter | 79 | IP-2. |
| Clear IO Word Counter | 80A | IP-1. |
| Set IO Interlock ON | 80B | IP-1. |
| Clear Left IO Register | 81A | IP-2. |
| Clear Right IO Register | 81B | IP-2. |
| Sense IO Word Counter | 82 | IP-3. |

In response to a positive potential on the conductor labeled ldc-PT a pulse is produced on the conductor 83 at IP-3 time, a pulse is produced on the conductor 84 at IP-2 and these commands are called Address Register to IO Address Counter and Clear IO Address Counter, respectively.

In response to a positive potential on the conductor labeled sel-PT, a pulse is produced on the conductor 85 and this command which occurs at IP-5 time is called Select Pulse.

In response to a positive potential on the conductor labeled rds-PT a pulse is produced on the conductor 86 and this command which occurs at IP-6 time is called PT-6 on Read.

In response to a positive potential on the conductor labeled wrt-PT, a pulse is produced on conductor 87 and this pulse which occurs at IP-6 time is called PT-6 on Write. In response to a positive potential on the conductor labeled sdr-PT a pulse is produced on conductor 88 and this pulse, which occurs at IP-5 time is called Select Pulse for Drums.

In response to a positive potential on the conductor sel-PT or the conductor sdr-PT, the following commands are generated at the times indicated:

TABLE 9

| Command Name | Conductor (Command) Number | Time |
| --- | --- | --- |
| Address Register to Drum Control Register | 92 | IP-3. |
| Clear Drum Control Register | 94 | IP-2. |

In response to a positive potential on either conductor labeled sdr-OT or sel-OT a pulse is produced on conductor 93 at IP-5 time and this command is called Deselect pulse.

In response to a positive potential on any one of the conductors labeled sdr-PT, MULT-PT, hlt-PT, ADD-PT, STORE-PT or sel-PT, a pulse is produced on the conductor 95 and the command, which occurs at IP-11 time, is called Set PT-OT flip-flop to OT.

In response to a positive potential on any one of the conductors labeled IO-PT and IO Interlock ON, MULT-OT, or hlt-PT and IO Interlock ON, a pulse is produced on the conductor 96 and this command which occurs at IP-10 time is called Pause.

In response to a positive potential on any one of the conductors labeled MISC-OT, ADD-OT, IO-OT, MULT-OT, or STORE-OTB, a pulse is produced on the conductor 107 and this command, which occurs at IP-11 time is called Clear PT-OT Flip-Flop to PT.

In response to a positive potential on the conductor labeled STORE-OTB, a pulse is produced on the conductor 129 and this command, which occurs at IP-3 time, is called Parity Count. This command 129 is also produced in response to each IP-7 pulse.

COMMON COMMANDS

Certain commands, called Common Commands, are generated during every instruction cycle.

From FIGS. 11a through 11e it will be noted that the following Common Commands are generated during the PT cycle of each instruction:

TABLE 10

| Command Number | Name | Time |
|---|---|---|
| 59 | Clear Memory Controls | PT-0. |
| 60A | Clear Left Memory Buffer Register. | PT-1. |
| 60B | Clear Right Memory Buffer Register. | PT-1. |
| 61 | Program Counter to Memory Address Register. | PT-1. |
| 69 | Start Memory | PT-2. |
| 62 | Clear Address Register | PT-6. |
| 63A | Clear Operation Register | PT-6. |
| 63B | Clear Index Interval Register | PT-6. |
| 64 | Clear Step Counter & Divide Time Pulse Distributor. | PT-6. |
| 65A | Record Left Overflow | PT-6. |
| 65B | Record Right Overflow | PT-6. |
| 66 | Add ONE to Program Counter. | PT-7. |
| 67A | Left Memory Buffer to Operation Register. | PT-7. |
| 67B | Right Memory Buffer to Address Register. | PT-7. |
| 129 | Parity Count | PT-7. |
| 70 | Parity Check | PT-11. |

Referring now to FIGS. 3a through 3h and Table 6 above, the commands 60A and 60B, as their names imply, are delivered to the Left and Right Memory Buffer Registers 43 and 44 and cause those registers to have all of their stages cleared to the binary ZERO state.

The commands 61 and 66 are delivered to a Program Counter 150. This counter is essentially a binary counter which may be initially set to any desired number; in response to the command 66 a binary ONE is added to that number and in response to the command 61 the Program Counter delivers the signals stored therein to the conductors of a cable 151. These signals are delivered through an OR circuit 152 to the previously mentioned conductor of the cable 37.

Pulses on the conductors 36 cause the Memory Element 34 to perform the previously described Read operation and the particular memory register, which is read during the PT cycle, is indicated by the signals delivered from the Program Counter 150. The memory registers whose locations are specified by the Program Counter are those registers containing instruction words.

The Read Memory operation performed during Program Time (PT) causes the binary signals representative of the left and right half-words of the instruction to be delivered to the conductors of cables 38 and 39, respectively. Since the Left and Right Memory Buffer Registers 43 and 44 were cleared by commands 60A and 60B at PT-1 time and since the signals on the conductors of cables 38 and 39 occur at substantially PT-6 time, those signals are stored in those registers.

The commands 62, 63A and 63B are delivered to an Address Register 155, the Operation Register 47 and the Selection and IO Control Element 49, respectively. These commands, as their names imply, cause a conventional clearing operation of the registers that they are delivered to.

The commands 64, 65A, 65B, 129 and 70 perform operations not essential to the immediate description and therefore further discussion of them will be made only when required.

The commands 67A and 67B, as their names imply, are delivered to the Left and Right Memory Buffer Registers, respectively, where, in response to command 67A, the signals stored in the Left Memory Buffer Register are delivered to the Operation Register and, in response to 67B the signals stored in the Right Memory Buffer Register are delivered by way of the conductors of a cable 156 to the Address Register 155.

Summarizing the operation described which occurs during each Program time cycle, left and right half-words of the instruction whose location is specified by the contents of the Program Counter are stored in the Operation Register and Address Register, respectively, at the end of the PT cycle and the contents of the Program Counter is increased by ONE.

From FIGS. 11a through 11e it will be noted that at PT-11 time of each instruction which requires an Operate Time, the command 95 (Set PT-OT Flip-Flop to OT) is generated. In a manner to be described in detail hereinafter, this command essentially prevents the commands occurring from PT-0 through PT-7 of the instruction cycle from being generated until the operate time commands for that instruction have been generated.

It will be noted that during the OT cycle of those instructions the following common commands are generated:

TABLE 11

| Command Number | Name | Time |
|---|---|---|
| 59 | Clear Memory Controls | OT-0. |
| 60A | Clear Left Memory Buffer Register. | OT-1. |
| 60B | Clear Right Memory Buffer Register. | OT-1. |
| 68 | Address Register to Memory Address Register. | OT-1. |
| 69 | Start Memory | OT-2. |
| 129 | Parity Count | OT-7. |
| 70 | Parity Check | OT-11. |
| 107 | Clear PT-OT Flip-Flop to PT | OT-11. |

Command 68 is delivered to the Address Register 155 where, in response to this command, the signals stored therein are delivered to the conductors of a cable 157 and through OR circuit 152 to the conductors of cable 37.

Commands 129 and 70 perform operations an understanding of which is not essential to the immediate description and therefore will not be discussed further at this time.

The commands 59 and 69 cause the previously noted Read Memory operation; however, during the OT cycle, the particular memory register being read is specified by the contents of the Address Register since command 68 (Address Register to Memory Address Register) is generated.

The command 107 (Clear PT-OT Flip-Flop to PT) essentially results in the Program time being resumed, that is, the commands during PT-0 through PT-6 of the instruction cycle are generated subsequent to the OT cycle of the instruction.

READ OPERATION FROM INPUT DRUM

In order to effect a reading operation from the Input Drum, the program must include a sequence of three instructions. Those three instructions, which are Load Address Counter (ldc), Select Drums (sdr) and Read (rds), are preferably performed in the order as stated.

Drum Reading as well as Drum Writing operations are normally performed on a block basis, that is, the sequence of three instructions merely establishes that a specified memory register (whose address is indicated by the Load Address Counter instruction) is the first register to be involved in a transfer, that words are to be transferred between the drum and Memory (the Select Drum Instruction) and that a specified maximum number of words are to be read from the drum or written on the drum (the maximum number being specified by a part of the Read or Write instruction word).

As indicated in FIG. 11a, the Load Address Counter instruction causes the following commands, besides the Common Commands described with reference to Table 10 above, to be generated:

TABLE 12

| Command Number | Name | Time |
|---|---|---|
| 96 | Pause | PT–10. |
| 84 | Clear IO Address Counter | PT–2. |
| 83 | Address Register to IO Address Counter. | PT–3. |

Command 96 is a conditional command (indicated by being underlined in FIG. 11a), that is, it is generated only if a certain condition is met. For the immediate description, it will be assumed that this condition is not met and therefore the command is not generated.

Referring back to FIGS 3a through 3h and more particularly to FIGS. 3a, 3b, 3g and 3h, command 84 is delivered to an IO Address Counter 158 where it causes a conventional Clearing Operation. Command 83 is delivered to the Address Register 155 where in response to this command, the signals stored therein are delivered by way of the conductors of a cable 159 to the IO Address Counter 158 for storage therein.

As indicated in FIG. 11b, the Select Drums instruction, besides causing the common commands described with respect to Tables 10 and 11 above to be generated, causes generation of the following commands:

TABLE 13

| Command Number | Name | Time |
|---|---|---|
| 96 | Pause | PT–10. |
| 95 | Set PT–OT Flip-Flop to OT | PT–11. |
| 93 | Deselect Pulse | OT–5. |
| 107 | Clear PT–OT Flip-Flop to PT | OT–11. |
| 94 | Clear Drum Control Register | PT–2. |
| 92 | Address Register to Drum Control Register. | PT–3. |
| 88 | Select Pulse for Drums | PT–5. |

At PT–10 time of the Select Drums instruction, as during the Load Address Counter instruction, the command Pause (96) may be generated. Since this command is conditional and since an understanding of this operation is not essential to the immediate description, it will be assumed that the command is not generated. At PT–11 time of the Select Drums instruction the previously mentioned command Set PT–OT Flip-Flop to OT (95) is generated in order to provide an OT cycle.

At OT–5 time the command 93 (Deselect Pulse) is generated and this command (as shown in FIGS. 3g and 3f) is delivered to (1) the Selection and IO Control Element 49, (2) a Drum Selection Register 160, and (3) a CD Write Control Circuit 161. The Deselect Pulse received by the Selection and IO Control Element causes various control flip-flops therein to be set to their ZERO state and further causes a pulse to be delivered to a conductor 162 (Clear IO Buffer Registers). The Deselect Pulse received by the Drum Selection Register 160 causes each stage of that register to be cleared to the ZERO state. The Deselect Pulse received by the CD Write Control Circuit 161 causes various control flip-flops therein to be cleared to their ZERO state, causes a pulse to be delivered to a conductor 163 (Write Register Reset) and further causes a negative D.C. level to be established for a predetermined length of time on a conductor 161A (Deselect SS output). The pulse on conductor 162, as its name implies, causes a conventional clearing operation of a Left IO Buffer Register 164 and a Right IO Buffer Register 165. The pulse on conductor 163, as its name implies, causes a conventional clearing operation of a Write Register 166. A preferred embodiment of this invention includes many physical drums, each having many fields (logical drums). In that preferred embodiment the CD Read Section 31 (FIG. 3f) and the CD Write Section 253 (FIG. 3f) have their inputs and outputs, respectively, switched by means of diode type switches to the drum heads selected by the Drum Selection Register 160 (FIG. 3f). In the interest of simplifying and thereby clarifying the description of this invention, no switching circuits of the CD Read Section or the CD Write Section have been shown; however, the Control circuits 161 and 178, to be described in detail hereinafter, include to a certain degree some of the logical circuits necessitated by the switching circuits. The negative D.C. level established on conductor 161A (Deselect SS output) has a duration sufficient to permit the switching operation to be completed before the read or write operation can be effective.

Although the common commands described with respect to Table 11 are generated during this OT cycle of the Select Drums instruction, they will have no effect on the overall result of the instruction as will be apparent hereinafter.

At PT–2 of the Select Drums Instruction, the command 94 (Clear Drum Control Register) is delivered to a Drum Control Register 167 (FIG. 3h) to effect a conventional clearing operation. At PT–3 time command 92 causes the signals stored in the Address Register 155 (FIG. 3b) to be delivered by way of the conductors of a cable 168 to the Drum Control Register 167 for storage therein. From the preceding description it will be seen that the signals delivered to the Drum Control Register are those signals of the right half word of the instruction. As will become more apparent hereinafter, the right half-word of a Select Drum instruction is used to determine which words read from the drum are to be accepted and delivered to the Memory Element 34.

As will be recalled from the description relating to the Input System, each word stored on the drum has source identification bits accompanying it. During normal operation, it is desirable, by means of the Select Drums instruction, to specify which words will be read from the drum, that is, words from only a specified source will be accepted.

The right half-word of the Select Drums instruction is therefore provided with a binary code in bit positions R1 through R3 which identifies the source from which words are to be accepted. It will be recalled with respect to the description of FIG. 6 that source identity bits are assigned to R1 through R3 of all input words.

Referring back to Table 8 above, at PT–5 time of the Select Drums instruction the command 88 (Select Pulse for Drums) is generated. This command is delivered to the Selection and IO Control Element 49 where it effects a Set operation of various control flip-flops and also causes the Index Interval Bits 10 through 15, which had previously been delivered to and stored in the Selection and IO Control Element 49, to be delivered by way of the conductors of a cable 160A to the Drum Selection Register 160 whose output is decoded by a suitable decoder 160B. When the index interval portion of the Select Drums instruction is the binary code 011 101, a positive D.C. level is established on conductor 160C (Select Input Drum) by the decoder 160B.

Figure 11D:
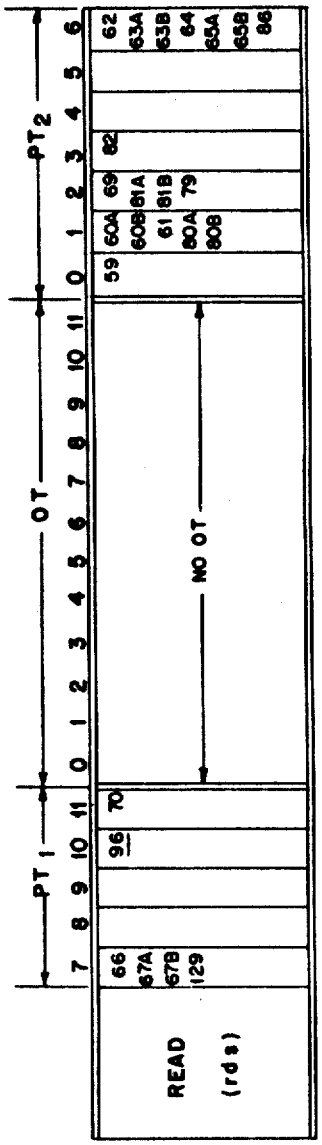
Figure 11E:
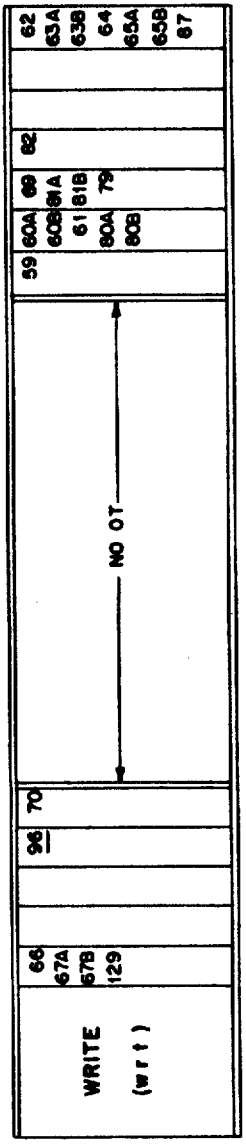

As indicated in FIG. 11d, the Read (rds) instruction, besides causing the common commands described with respect to Table 10 above to be generated, causes the following commands to be generated:

TABLE 11

| Command Number | Name | Time |
|---|---|---|
| 96 | Pause | PT–10. |
| 80A | Clear IO Word Counter | PT–1. |
| 80B | Set IO Interlock ON | PT–1. |
| 79 | Address Register Complement to IO Word Counter. | PT–2. |
| 81A | Clear Left IO Register | PT–2. |
| 81B | Clear Right IO Register | PT–2. |
| 82 | Sense IO Word Counter | PT–3. |
| 86 | PT 6 on Read | PT–6. |

At PT–10 time, the command 96 is generated provided that a certain condition is met, and it will be again assumed that this condition is not met and the command not generated.

At PT-1 time the command 80A (Clear IO Word Counter) is delivered to an IO Word Counter 169 where it effects a conventional clearing operation. The command 80B (Set IO Interlock ON) is generated and this command is delivered to the Cycle Control Circuit 54 (FIG. 10*b*) where it causes the output conductor labeled IO Interlock ON to be made positive. The primary purpose of this command is to prevent any further instruction of the Input-Output class or a Program Stop instruction from being executed until the present Input (or Output) operation has been completed. As will be more apparent subsequently, an input or output operation is not complete until the number of words involved in the transfer have actually been transferred or for some reason or other there can be no further transfers made.

At PT-2 time the commands 81A and 81B cause conventional clearing operations of a Left IO Register 170 and a Right IO Register 171, respectively. At this same time, command 79 causes signals representative of the complement of the number stored in the Address Register 155 to be transferred by way of the conductors of a cable 173 to the IO Word Counter 169 for storage therein. The right half-word of the Read instruction is a binary number indicating the maximum number of words to be transferred, the actual number of words transferred during a read instruction will of course be determined by the actual number of words available for transfer provided that there are less than the number specified by the Read instruction.

The command 82 (Sense IO Word Counter) is delivered to the Selection and IO Control Element 49 as well as to the IO Word Counter 169. When this command is received by the IO Word Counter a binary ONE is added to the contents thereof. This command 82 (Sense IO Word Counter) which occurs at PT-3 time as well as the command 86 (PT-6 on Read) are delivered to the Selection and IO Control Element where if a pulse is received on a conductor 175 (IO Word Counter End Carry) between the time of command 82 and command 86, a pulse is delivered to the conductor 174 (Clear IO Interlock). The IO Word Counter is a binary counter which in response to a pulse on the conductor 82 (Sense IO Word Counter) or a pulse on a conductor 176 (Add ONE to IO Word Counter) a binary ONE is added to the number stored therein. The IO Word Counter produces a pulse on the conductor 175 (IO Word Counter End Carry) if, when a pulse is received on either the conductor 82 or the conductor 176, the counter has the binary number of all ONES stored therein. As noted above, the *complement* of the number specified by the right half-word of the Read instruction is transferred to the IO Word Counter. If the Read instruction specified zero number of words then, all stages of the IO Word Counter would be set to their ONE state and the command 82 (Sense IO Word Counter) of the Read instruction would cause an end carry pulse resulting in a pulse being delivered to the conductor Clear IO Interlock. This pulse, generated by the Selection and IO Control Element 49, is delivered to the Cycle Control Circuit 54 (FIG. 10*b*) where it causes a negative potential to be produced on the conductor labeled IO Interlock ON. The use and importance of an instruction to read zero number of words will become apparent subsequently.

Assuming for the purpose of description that the Read instruction specifies a number of words greater than ZERO, then no pulse will be delivered to the conductor 174 labeled Clear IO Interlock during the Read instruction cycle. The subsequent instructions of the program will be executed provided that IP pulses are delivered to the Command Generator 53 (FIGS. 10*a* through 10*c*).

When a transfer of a word from the drum to Memory is actually ready to take place, controls are effected to interrupt the generation of IP pulses. It is to be understood that if any one of the instructions of the Input-Output class or the instruction Program Stop appears in the Program before the Clear IO Interlock pulse is delivered to the conductor 174, then at PT-10 time of that instruction the aforementioned conditional command 96 (Pause) will be generated which, as will be apparent from the subsequent description, effectively prevents further commands of that instruction from being generated until the Clear IO Interlock pulse has been received.

If, as previously assumed, the Read instruction specifies a number of words greater than ZERO, the Selection and IO Control Element will generate a pulse on a conductor 177 (Start Read Drums) which is delivered to a Read Control Circuit 178. In response to this pulse, the Read Control Circuit 178 produces a positive potential on a conductor 179 (Read Drum Flip-Flop ON) which is delivered to the CD Write Control Circuit 161. The CD Write Control Circuit in response to this D.C. level and in response to a pulse on the conductor labeled DTP-4 causes a positive D.C. level to be established on a conductor 180 (Sync FF ON) which begins at substantially CD-4 time. It should be noted that time pulses (TP) and the Instruction Pulses (IP) are asynchronous with respect to the Drum Time Pulses (DTP). For this reason synchronizing circuits are employed in the CD Write Control Circuit 161 to synchronize control pulses from the Selection and IO Control Element 49 with respect to the Drum System timing.

The Read Control Circuit 178 in response to the previously mentioned pulse on conductor 177 (Start Read Drums) and in response to a positive potential on each of the conductors 180 and 161A causes a positive potential on a conductor 181 (Read).

As previously described with respect to the CD Read Status Control Section 30, a positive potential on the conductor labeled Read causes a drum register which is full to be read, the left half-word of the word read from the drum being delivered to the conductors of the cable 32 and the right half-word being delivered to the conductors of the cable 33.

These signals on the conductors of cables 32 and 33 are stored in the Left and Right IO Buffer Registers 164 and 165, respectively.

As was described in detail in the description of the CD Read Status Control Section 30, this reading a word from the drum resulted from a pulse on the conductor labeled Read Sample. As shown in FIGS. 3*f* and 3*g*, this Read Sample pulse is also delivered to the Selection and IO Control Element 49 and to Read Control Circuit 178.

If the CD Read Status Control receives a positive D.C. level from the conductor labeled Read at such a time that the first register which is sampled by the Read Sample pulse is the second register of a two-register slot, no signal will be delivered to a conductor 182 labeled Compare. This condition will be sensed by the Selection and IO Control which will generate a pulse on conductor 186 labeled No Compare. As previously described with reference to the operation of the CD Read Status Control Circuit, this no compare pulse will cause the status of the drum register to remain "full," that is, a Write a ONE signal is delivered to Write head 23. In response to a Read Sample pulse, the Read Control Circuit 178 generates a pulse on the conductor 182 (Compare) provided that the drum register which is being read is the first register of a two-register slot. This compare pulse on conductor 182 is delivered to the Selection and IO Control Element 49.

The Selection and IO Control Element 49, in response to this compare pulse, causes a pulse to be produced (after a suitable delay) on a conductor 183 (Compare by Identification 1-3) provided that the previously mentioned Select Drum instruction had the binary code 011 101 specified by its Index Interval bits 10 through 15.

The pulse on the conductor 183 (Compare by Identification 1-3) is delivered to the Drum Control Register 167 and it will also be noted that the right half-word of the word read from the drum (now stored in the Right IO Buffer Register 165) is also delivered by way of the conductors of a cable 184 to the Drum Control Register 167. As noted previously in the description relating to the Select Drum instruction, the drum control register has stored therein (at this time) the right half-word of that Select Drums instruction.

If, at the time that the pulse on conductor 183 (Compare by ID 1-3) is received, bits 1 through 3 of the right half-word read from the drum compare with bits 1 through 3 of the word stored in the Drum Control Register, no signal will be delivered to a conductor 185 (No Compare).

If the comparison is not successful, a pulse is delivered by way of the conductor 185 (No Compare) to the Selection and IO Control which in turn delivers a succession of pulses to a conductor 186 (No Compare). These pulses on conductor 186 are delivered to the CD Read Status Control Circuit 30 where they cause two successive Write a ONE signals to be delivered to the Write head 23 as described in detail in the above description relating to the CD Read Status Control Circuit 30.

If the comparison was successful, since no pulse is received from conductor 185, the Selection and IO Control Element delivers a pulse to a conductor 187 (IO Buffer Registers to IO Registers and Clear IO Buffer Registers), delivers a pulse to the conductor 176 (Add ONE to IO Word Counter) and stores the fact that the comparison was successful. The pulse on conductor 187, as its name implies, causes the signals stored in the Left and Right IO Buffer Registers 164 and 165 to be delivered by way of the conductors of cables 189 and 190 to the Left and Right IO Registers 170 and 171, respectively. This pulse on conductor 187 also causes the Left and Right IO Buffer Registers to be cleared. The pulse on conductor 188 causes a binary ONE to be added to the signals previously stored in the IO Word Counter 169.

It should be noted that this pulse on conductor 188 is asynchronous with respect to the operations controlled by the Instruction Control Element, that is, the Instruction Control Element may well be proceeding to perform subsequent instructions of the program and during such time an incoming word from the drum may have been accepted, transferred from the buffer registers to the IO registers and a binary ONE added to the IO Word Counter. In the event that the particular instruction being controlled by the Instruction Control Element at this instant is the instruction Clear and Subtract Word Counter, the contents of the IO Word Counter should not be transferred while it is in the act of being changed. For this reason, whenever a pulse is delivered to the conductor 188 to cause a binary ONE to be added to the IO Word Counter, a pulse is delivered to a conductor 197A labeled Set the 1st csw Flip-Flop ON and with a short and suitable delay thereafter a pulse is delivered to the conductor 198 labeled Clear the 1st csw Flip-Flop. The precise way in which pulses on the conductor 197A and the conductor 198 operate to insure that the contents of the IO Word Counter are not transferred while that counter is being stepped will become more apparent subsequently.

Since two-word messages are stored on the input drum, any set of instructions to read words from that drum should establish an even number of words to be read.

If as has been assumed, the first word read from the drum is accepted and transferred to the IO Registers, then the second one is bound to be accepted and for this reason when the CD Read Status Control Circuit 30 generates the Read Sample pulse for that second word, although the Read Control Circuit 178 receives this Read Sample pulse, it does not generate a pulse on the conductor 182 (Compare) in response thereto. The Read Sample pulse causes the signals stored in the drum register to be delivered to the IO Buffer Registers 164 and 165 and although the Read Sample pulse is delivered to the Selection and IO Control Element 49 and no pulse is received from the conductor 185 (No Compare) this second word might or might not be immediately transferred to the IO Registers 170 and 171 since those registers may still contain the first word read from the drum. The fact is stored in the Selection and IO Control Element 49 that the second accepted word is now stored in the IO Buffer Registers.

When the first word was transferred from the IO Buffer Registers to the IO registers (in response to the pulse on conductor 187) that fact (called a break request) was stored in the Selection and IO Control Element 49.

Referring back now to FIG. 10a, it will be noted that TP-11 pulses are delivered through an OR circuit 191 to a conductor 192 (Sense Break Request Flip-Flop). If IP pulses are being generated then at IP-11 time of each PT or OT cycle, a pulse will be delivered to the conductor 192 (Sense Break Request Flip-Flop). As will be described subsequently, IP pulses are generated except during the previously noted Pause operation and during a Break Operation. If a Pause operation is being performed and no Break operation is being performed, pulses at a 2 megacycle rate are produced on a conductor 193 labeled 2 mc. (Pause and No Break) and these pulses are delivered through OR circuit 191 to the conductor 192 (Sense Break Request Flip-Flop).

The Sense Break Request Flip-Flop pulses on conductor 192 are delivered to the Selection and IO Control Element 49, where in response to one of these pulses and if the previously noted fact (called Break Request) has been stored, an operation called "Break in" is initiated by the generation of a pulse on a conductor 194 (Set Break Flip-Flop). This command 194 (Set Break Flip-Flop) is delivered to the Instruction Control Element 51 where it causes the generation of IP pulses to cease and insures the generation of TP pulses.

This "Drum Break in" operation essentially starts a memory cycle and during that memory cycle the word stored in the Left and Right IO Registers 170 and 171 is delivered to the Memory Element 34 where it is stored at the location specified by the contents of the IO Address Counter 169. This Memory cycle, like any other, begins at TP-1 and ends at TP-11. In order to distinguish this type of memory cycle from other memory cycles the time periods from 1 through 11 are referred to as "break in" (BI) pulses BI-1, BI-2, etc. Since these BI time periods are controlled by TP pulses generated by the Time Pulse Distributor 52 (FIG. 10a), they are substantially coincident in time therewith.

As previously noted, the commands 59 (Clear Memory Controls), 60A (Clear Left Memory Buffer Register) and 60B (Clear Right Memory Buffer Register) are generated directly from the output of the Time Pulse Distributor 52 (FIG. 10a). During the "Break in" operation of the Selection and IO Control Element 49 (FIG. 3g) the following commands are generated by the Selection and IO Control Element 49 at the times indicated:

TABLE 15

| Conductor (Command) Number | Name | Time |
| --- | --- | --- |
| 195A | Start Memory | BI-2 |
| 195B | IO Address Counter to Memory Address Register | BI-1 |
| 195C | Clear Break Request Flip-Flop | BI-1 |
| 196A | Add ONE to IO Address Counter | BI-2 |
| 196B | Clear IO Reg. Status Flip-Flop | BI-2 |
| 196C | Left IO Register to Left Memory Buffer Register | BI-2 |
| 196D | Right IO Register to Right Memory Buffer Register | BI-2 |
| 196E | Inhibit Sample | BI-11 |
| 199 | BI-11 | BI-11 |

In response to the command 59 (Clear Memory Controls), the command 195A (Start Memory), and the Command 196E (Inhibit Sample), the Memory Element 34 performs the previously noted write memory operation. The word written into memory is the first word accepted from the drum since commands 196C and 196D are generated at BI–2 time and these commands cause the signals stored in the Left and Right IO Registers 170, 171 to be transferred to the Left and Right Memory Buffer Registers 43 and 44 by way of the conductors of cables 200 and 201, respectively. The memory location into which this word is written is the location specified by the contents of the IO Address Counter since the command 195B (IO Address Counter to Memory Address Register) is generated at BI–1 time.

The command 196A (Add ONE to IO Address Counter) is delivered to the IO Address Counter 158 which in response to this pulse causes the number stored therein to be increased by ONE so that the second word read from the drum will be stored in the next higher address in memory.

During the time period BI–1 through BI–5, the fact is stored in the Selection and IO Control Element 49, that the IO Register status has been made empty (commands 196C and 196D having been generated). As previously mentioned, the fact that the IO Buffer Register now contains the second accepted word is also stored therein. These two facts cause the Selection and IO Control Element 49 to generate a pulse on conductor 187 (IO Buffer Registers to IO Registers and Clear IO Buffer Registers) and also causes the fact (called Break Request) to be stored, thus initiating another "Break in" operation when the next pulse on conductor 192 (Sense Break Request Flip-Flop) is received.

In this manner words read from the drum are stored in memory and this operation of reading words from the drum, comparing and storing accepted words in memory continues until either the IO Word Counter 169 produces a pulse on the conductor 175 (IO Word Counter End Carry) or the Read Control Circuit 178 generates a pulse on a conductor 202 (Read Disconnect). The pulse is generated on the conductor 202 if the drum has made a complete revolution since the Read Control Circuit 178 received a pulse on the conductor 177 (Start Read Drum).

The pulse on conductor 202 is delivered through an OR circuit 203 and by way of a conductor 204 (Drum Disconnect) to the Selection and IO Control Element 49. A pulse on either the conductor 204 (Drum Disconnect) or the conductor 175 (IO Word Counter End Carry) causes the Selection and IO Control Element to generate a pulse on a conductor 205 (Clear IO Interlock). The primary result of the command 205 (Clear IO Interlock), which is delivered to the Cycle Control Circuit 52 (FIG. 10b) is to allow subsequent Input Output Class instructions or a Program Stop Instruction to be executed.

Detailed description of other operations performed by the system will be found in the following columns of the Thomas Patent No. 3,018,959 (Ref. I):

Subject: Column

Clear and Subtract Word Counter Instruction___ 20–34
Determining Age of Input Words_____ 35
Generation of Moving Object Control Signals__ 36
Writing Operation on the Output Drum _____ 36–38
Reading from the Output Drum _____ 39–49
Reading the Burst Counter and Elapsed
  Time Counter _____ 50
Calculation of Burst Number and Delay for
  Output Messages _____ 51–52
Computer Instructions for Data Processing ____ 53

DETAILED DESCRIPTION OF COMPONENTS

A detailed description of examples of circuits suitable for use as the following components will be found in the identified copending applications:

| Component | Copending Application | |
|---|---|---|
| | Reference Number | Figures |
| Range, Theta and Identity Section 9 (Fig. 3e). | B | 10. |
| Time Tag Section 10 (Fig. 3e) | B | 15. |
| OD Drum Write Element 27 (Fig. 3e) | G | 12 and 13. |
| OD Write Status Control Section 26 (Fig. 3e). | G | 5. |
| Drum and Drum Head Assembly | A | 3 through 7. |
| CD Read Section 31 (Fig. 3f) | A | 14. |
| OD Read Section 303 (Fig. 3e) | A | 14. |
| Write Register 166 (Fig. 3f) | A | 12. |
| CD Write Section 253 (Fig. 3f) | A | 12. |
| Memory Element 34 (Figs. 3a and 3b) | D | 23 through 36. |
| Operation Register 47 (Fig. 3a) | D | 39. |
| Program Counter 150 (Fig. 3b) | D | 41. |
| Address Register 155 (Fig. 3b) | D | 42. |
| Left or Right Arithmetic Elements (Figs. 3a, 3b). | H | 1 through 20. |
| Drum Word Register (Fig. 3e) | C | 20a and 20b. |
| Parity Generator & Delay 307 (Fig. 3e) | C | 20a and 20b. |
| 13 Stage Registers 567 and 568 (Fig. 3c) | C | 24. |
| 13 Counter and 25 Counter (Fig. 13b) | J | 2. |
| CD Write Control Circuit (Fig. 3f) | I | 26. |
| CD Write Status Control Section (Fig. 3f) | I | 27. |
| Time Pulse Distributor Control and (Fig. 10a) Special Command Generator, etc. | I | 37. |
| Clock Register (Fig. 3h) | I | 41. |
| Burst Time Counter and Compare (Fig. 3d). | I | 42–43. |
| Burst Counter Interrogator (Fig. 3d) | I | 44. |

*Read Status Control Circuits*

Reference is now made to FIG. 13 which shows, in logical block form, the CD Read Status Control Section shown as block 30 in FIG. 3f. The signals induced in the read head 25 (FIG. 3f), which are the CD Status Channel signals, are delivered through a Read Circuit 620 to the conditioning input of a gate 621. Gate 621 is sampled by CD–1 pulses and will therefore produce a pulse on its output conductor when a binary ONE signal is received from the CD Status Channel and will not deliver a pulse on its output conductor when a binary ZERO signal is received from the CD Status Channel. Pulses passed by gate 621 are delivered to the sample input of a gate 622 and a gate 623. Gate 622 has its conditioning input energized by signals on the conductor labeled Read (output of Read Control Section 178 of FIG. 3f), whereas gate 623 has its conditioning input energized by signals on the conductor labeled Read through an inverter 624. When a positive D.C. level is applied to the conductor labeled Read, gate 622 will be conditioned whereas, when a negative D.C. level is applied to that conductor gate 623 will be conditioned.

A pulse passed by gate 622 causes the read circuits 33 (FIG. 3f) to be sampled thereby delivering the word, stored in the register of the drum indicated as being full by a ONE in the CD Status Channel, to the IO Buffer Registers. A flip-flop 625 is set to its ZERO state by CD–4 pulses and set in its ONE state by pulses on the conductor 186 (no compare) which are passed by a gate 626, when conditioned, through an OR circuit 627. Flip-flop 625 is also set in its ONE state by pulses passed by gate 623 through OR circuit 627. Flip-flop 625 has its ONE and ZERO outputs applied to the conditioning input of a Drum Writer 628 which is sampled by pulses on the conductor labeled Status Write Sample. The output of Drum Writer 628 is delivered to the write head 23 (FIG. 3f) to record signals in the OD Status Channel.

When the CD Read Status Control circuit is instructed to read (a positive potential is received on the conductor labeled Read) each binary ONE signal (indicating a full register is passing beneath the read heads of the drum) causes a pulse to be delivered to the conductor labeled Read Sample at substantially OD–1 time. Flip-flop 625 is set to its ZERO state at every CD–4 time to condition the Drum Writer 628 to write a ZERO when sampled by the Status Write Sample pulse which begins at CD-3 time and stops at substantially CD-3+1.7 μsec. When a positive potential is received on the conductor labeled Read, inverter 624 prevents gate 623 from being conditioned and therefore the Drum Writer 628 will cause a binary ZERO to be written on the OD Status Channel for indicating that each drum register which passes under the Read Heads is empty unless a no compare pulse is received on conductor 186 for a given register. A pulse on conductor 186 must arrive at the CD Read Status Control Section a predetermined time before CD-3 time. This predetermined time is sufficient to permit the no compare pulse to cause the Drum Writer 628 to be conditioned to generate a "Write a ONE" signal before it is sampled by the Status Write Sample pulse.

When the CD Read Status Control Section is not instructed to Read (a negative potential is received on the conductor labeled Read) gate 623 passes pulses received from gate 621 and therefore when a binary ONE signal is read in the CD Status Channel a binary ONE is recorded in the OD Status Channel and when a binary ZERO is read in the CD Status Channel a binary ZERO is recorded in the OD Status Channel.

The circuit shown in FIG. 13 may also be employed as the OD Read Status Control Section 253 (FIG. 3e).

Read Control Circuit

Reference is now made to FIG. 14 which is a logical block diagram of the Read Control Circuit shown as block 178 in FIG. 3f. A pulse on the conductor 177 (Start Read) causes a flip-flop 650 to be set in its ONE state. Flip-flop 650 is cleared to its ZERO state by pulses on the conductor labeled Read-Write reset which also causes a flip-flop 651 to be cleared to its ZERO state and a disconnect counter 652 to be cleared. When the flip-flop 650 is in its ONE state, it delivers a positive D.C. potential to the conductor 179 (Read Drum FF ON) and flip-flop 650 also conditions one leg of a two-input AND circuit 653, the other input of which is conditioned by a positive D.C. level on the conductor 180 (Sync flip-flop ON). The output of AND circuit 653 therefore becomes positive when a start read pulse has been received and the drum head diode switches have had time to complete the switching operation (Sync FF ON). A positive output from AND circuit 653 is delivered by way of the conductor labeled Read to the CD Read Status Control Section 30 (FIG. 3f). The output of AND circuit 653 is also delivered to a three-input AND circuit 654 which receives a positive potential on conductor 160c (Select input drum) from Decoder 160B (FIG. 3f) when the input drum has been selected to read and also receives a positive potential from a flip-flop 655 when in the ONE state. Flip-flop 655 is set in its ONE state by CD index pulses and complemented by CD-3 pulses. Flip-flop 655, when in the ONE state, also conditions a gate 656 which is sampled by Read Sample pulses. Gate 656 therefore passes a pulse to conductor 182 (compare) when the drum has been instructed to read and the first register of a two register slot is being sensed by the Drum Read Heads 31a (FIG. 3f). The output of AND circuit 634, when positive, conditions a gate 657 which is sampled by CD-1 pulses. Gate 657 will therefore pass a pulse to set a flip-flop 658 in the ONE state the first time that the register of a two register slot passes beneath the Drum Read Heads 31a (FIG. 3f) following the time that a positive D.C. level is established on the conductor labeled Read. Flip-flop 658, when in the ONE state, conditions a gate 659 which is sampled by CD-4 pulses. Pulses passed by gate 659 cause stepping of the disconnect counter 652 which will produce a pulse on its output conductor 202 (Read Disconnect) when 2048 pulses have been received at its input (the drum has made a complete revolution).

IO Buffer Registers

Reference is made to FIG. 15 which is a logical block diagram of the Left IO Buffer Register shown as block 164 in FIG. 3h. As previously mentioned, the Selection and IO Control Element 49 (FIG. 3g) delivers a pulse to conductor 162 (Clear IO Buffer Registers) before a reading operation from the drum or the Burst Counters begins. This pulse is delivered through an OR circuit 750 to the Clear input of each of the flip-flops of the Left IO Buffer Register. Only flip-flops 751 through 753 (associated with the Parity, Left Sign, and Left 15 bits respectively) have been shown in FIG. 15, it being understood that in the preferred embodiment a flip-flop is provided for each bit of the word to be stored. Signals representative of the left half-word read from the drum are received by way of the conductors of cable 32 and delivered through OR circuits 754 through 756 to the set input of flip-flops 751 through 753. Signals representative of the burst counter and elapsed time counter contents are received by way of the conductors of cable 757 and delivered through OR circuits 754 through 756 to the set input of flip-flops 751 through 753.

When the Selection and IO Control Element delivers a pulse to conductor 187 (Left IO Buffer Register to Left IO Register) the pulse samples each of gates 758 through 760 and also through OR circuit 750 causes flip-flops 751 through 753 to be cleared. Gates 758 through 760 have their conditioning input connected to the ONE output of flip-flops 751 through 753 respectively, through cathode followers 761 through 763 respectively. In this way signals received from the drum or the burst counter and elapsed time counter are temporarily stored and in response to a pulse on conductor 187, the stored signals are delivered by way of the conductors of cable 189 to the Left IO Register 170 (FIG. 3g).

Reference is now made to FIG. 16 which is a logical block diagram of the Right IO Buffer Register shown as block 165 in FIG. 3h. The Right IO Buffer Register is similar to the Left IO Buffer Register and differs therefrom in the following respects:

(1) It receives signals representative of the right-half word read from the drum by way of the conductors of cable 33.

(2) It receives only 16 bits, Right sign through Right 15 (parity of a drum word being considered as a part of the Left half-word).

(3) D.C. levels from the ONE and ZERO outputs of flip-flops 770 through 772 (Right sign, Right 1 and Right 15 bits respectively) are delivered through cathode followers 773 through 778 and by way of the conductors of cable 184 to the drum control Register 167 (FIG. 3h).

(4) In response to the command 187 (IO Buffer Registers to IO Registers) gates 779 through 781 are sampled to deliver signals stored in the register to the conductors of cable 190.

IO Registers

Reference is now made to FIG. 17 which is a logical block diagram of the Left IO Register which is shown as block 170 in FIG. 3g. As mentioned previously, a pulse is delivered to the conductor 81A (Clear the Left IO Register) at PT-2 time of each Read or Write instruction. A pulse on conductor 81A is delivered through an OR circuit 800 to cause each of flip-flops 801 through 804 to be cleared. Signals delivered from the Left IO Buffer Register 164 (FIG. 3h) by way of the conductors of cable 189 are delivered through OR circuits 805 through 808 to the set input of flip-flops 801 through 804 for storage therein. Signals delivered from the Left Memory Buffer Register 43 (FIG. 3a) by way of the conductors of cable 43A are delivered through OR circuits 805 through 808 to the set input of flip-flops 801 through 804.

A pulse received on conductor 196C (Left IO Register to Left Memory Buffer Register) causes each of gates 809 through 812 to be sampled and also is delivered through OR circuit 800 to clear the Left IO Register. In this way the signals stored in the register are delivered by way of the conductors of cable 200 to the Left Memory Buffer Register 43 (FIG. 3a). A pulse received on conductor 219B causes each of gates 813 through 816 to be sampled and is also delivered through OR circuit 800 to clear the Left IO Register. In this way the signals stored in the register are delivered by way of the conductors of cable 170A to the Write register 170 (FIG. 3f). Although only flip-flops 801 through 804 for storage of the parity, left sign, left 1 and left 15 bits are illustrated in FIG. 30 it will be understood that flip-flops for storage of the remaining bits of the left half-word are provided in the preferred embodiment.

The Right IO Register 171 (FIG. 3h) may be substantially identical to the Left IO Register as shown in FIG. 17, but differs in that the number of stages of the register need only be sufficient to store the 16 bits of the right half-words.

IO Address Counter

Reference is now made to FIG. 18 which is a logical block diagram of the IO Address Counter shown as block 158 in FIG. 3h. A pulse on conductor 84 (Clear IO Address Counter) causes each of flip-flops 820 through 823 to be cleared. Although FIG. 18 shows only the least significant and three highest orders of the IO Address Counter, the construction and operation of the remaining order will be obvious from the following description. As mentioned previously, the Memory Element 34 (FIGS. 3a and 3b) in the preferred embodiment provides for storage of 33 bit words in a selected one of 4096 registers whose addresses can be specified by 12 binary orders. It will be understood, however, that the number of addresses in a memory element as well as the number of memory elements is a matter of choice and in the preferred embodiment, all registers used for addressing memory were provided with 16 stages in order to permit expansion of the number of memory registers.

Signals received on the conductors of cable 173 from the Address Register 155 (FIG. 3b) are stored in the various flip-flops of the IO Address Counter. A pulse received on conductor 196A (Add 1 to IO Address Counter) causes a gate 824 to be sampled and also causes flip-flop 820 to be complemented. Gate 824 is conditioned by the ONE output of flip-flop 820 and will therefore pass the pulse to the input of the next higher order stage of the counter when flip-flop 820 is in the ONE state. The remaining orders of the counter operate in a like binary counting fashion so that each pulse received on conductor 196A causes the number stored in the register of the counter to be increased by one.

A pulse received on conductor 195B (IO Address Counter to Memory Address Register) causes each of gates 825 through 828 to be sampled. Gates 825 through 828 are conditioned by the ONE output of flip-flops 820 through 823, respectively, and therefore a pulse received on conductor 195B causes signals representative of the number stored in the IO Address Counter to be delivered to the conductors of cable 158A.

IO Word Counter

Reference is now made to FIG. 19 which is a logical block diagram of the IO Word Counter which is shown as block 169 in FIG. 3h. A pulse on conductor 89A (Clear IO Word Counter) causes each of flip-flops 850 through 853 to be cleared. Signals received by way of the conductors of cable 173 from the Address Register 155 (FIG. 3b) are delivered to the set inputs of flip-flops 850 through 853. A pulse on conductor 82 (Sense IO Word Counter) or conductor 176 (Add 1 to IO Word Counter) is delivered through an OR circuit 854 to sample a gate 855 and to complement flip-flop 850. Gate 855 is conditioned by the ONE output of flip-flop 850 and will therefore pass the pulse from OR circuit 854, when flip-flop 850 is in the ONE state, to the input of the next higher order stage of the counter. In this way the various stages of the counter operate in binary counting fashion to cause the number stored in the counter register to be increased by one in response to a pulse passed by OR circuit 854. When all flip-flops of the counter are in their ONE state, a pulse passed by OR circuit 854 will cause a pulse to be delivered to conductor 175 (IO Word Counter End Carry).

A pulse received on conductor 90 (IO Word Counter to Right Accumulator) causes each of gates 856 through 859 to be sensed. Gates 856 through 859 are conditioned by the ONE outputs of flip-flops 850 through 853 and therefore in response to a pulse on conductor 90, signals are delivered to the conductors of cable 210 which are representative of the number stored in the register of the counter.

Drum Control Register

Reference is now made to FIG. 20 which is a logical block diagram of the Drum Control Register which is shown as block 167 in FIG. 3h. A pulse on conductor 94 (Clear Drum Control Register) causes each of flip-flops 870 through 874 to be cleared. Although only five flip-flops, for storing Right sign, Right 1 through Right 3 and Right 15 bits, are shown in FIG. 20 it will be understood that additional flip-flops are provided for storing the rest of the bits of the right half-word. Signals received by way of the conductors of cable 168 from the Address register 155 (FIG. 3b) are stored in the flip-flops of the drum control register. The ONE outputs of flip-flops 871 through 873 are applied as one of the inputs of AND circuits 875 through 877, respectively, and the ZERO outputs of those flip-flops are applied as one of the inputs of AND circuits 878 through 880, respectively. AND circuits 875 through 877 receive at their other input, by way of some of the conductors of cable 184, the ZERO outputs of those flip-flops of the Right IO Buffer Register which store R1 through R3 bits. AND circuits 878 through 880 receive at their other input, by way of some of the conductors of cable 184, the ONE outputs of those flip-flops of the Right IO Buffer Register which store R1 through R3 bits. If any one of the R1 through R3 bits stored in the Right IO Buffer Register fails to compare with the corresponding bits stored in the Drum Control Register, a positive D.C. level will be delivered through an OR circuit 881 to the conditioning input of a gate 882. Gate 882 is sampled by pulses on conductor 183 (compare by identity 1 through 3) and will therefore pass a pulse to conductor 185 (no compare) when a comparison does not exist.

In a preferred embodiment, the drum control register is provided with 16 stages (RS and R1 through R15) since that register is so constructed as to perform many operations other than comparing bits R1 through R3. It is not essential to an understanding of this invention what other operations may be performed by the Drum Control Register. For this reason, the various other circuits associated with the Drum Control Register are not illustrated in the FIG. 20.

Memory Buffer Registers

Reference is now made to FIGS. 21 and 22 which are logical block diagrams of the Left Memory Buffer Register and Right Memory Buffer Register which are indicated by blocks 43 and 44, respectively, in FIGS. 3a and 3b.

In FIG. 21, a pulse received on conductor 60A causes flip-flops 900 through 906 to be cleared. In the interest of simplifying the description of the Left Memory Buffer Register only those stages of the Register for storing bits Parity, Left Sign, Left 1, Left 9 through Left 11 and Left 15 have been shown in the drawing. The construction and operation of the remaining stages will be obvious from the following description.

Pulses received on the conductors of cables 38, 200 or 907 are delivered through OR circuits 908 through 914 to cause flip-flops 900 through 906 to be set in their ONE state. In this way, signals received from Memory, the Left IO Register or the Left Arithmetic Element may be stored in the Left Memory Buffer Register.

A pulse received on conductor 217A (Left Memory Buffer Register to Left IO Register) causes gates 915 through 921 to be sampled. Those gates are conditioned by their corresponding one of the flip-flops 900 through 906 and pulses passed by those gates are delivered to the conductors of cable 43A. In this way the entire Left Half Word together with the Parity Bit which is stored in the Left Memory Buffer Register may be transferred to the Left IO Register.

A pulse received on conductor 116 (Left Memory Buffer Register to Right A Register) causes gates 922 through 927 to be sampled. Gates 922 through 927 are conditioned by flip-flops 901 through 906, respectively, and pulses passed by those gates are delivered to the conductors of cable 928. In this way bits Left Sign and Left 1 through Left 15 of the Left Half Word stored in the Left Memory Buffer Register may be transferred to the Right Arithmetic Element.

In response to a pulse on conductor 75 (left Memory Buffer to Left A Register), gates 930 through 935 are sampled. Those gates are conditioned by their corresponding one of flip-flops 901 through 906 and pulses passed by those gates are delivered to the conductors of cable 936. In this way the left half-word stored in the Left Memory Buffer Register may be transferred to the Left A Register.

Pulses received on conductor 67A cause gates 937 through 941 to be sampled. Those gates are conditioned by their corresponding one of flip-flops 852 through 856. Pulses passed by gates 937 and 938 are delivered to the conductors of cable 46, pulses passed by gates 940 and 941 are delivered to the conductors of cable 48, and pulses passed by gate 939 are delivered to one of the conductors of cable 48 and also to one of the conductors of cable 46. In this way a pulse received on conductor 67A causes bits Left 1 through Left 10 of the word stored in the Left Memory Buffer Register to be delivered to the conductors of cable 46 and causes bits Left 10 through Left 15 to be delivered to the conductors of cable 48.

The ZERO outputs of flip-flops 901 through 906 are connected to the Memory Element by way of the conductors of cable 41.

In FIG. 22, a pulse received on conductor 60B causes flip-flops 942 through 945 to be cleared. In the interest of simplifying the description of the Right Memory Buffer Register only those stages of the Right Memory Buffer Register for storing bits Right Sign and Right 13 through Right 15 have been shown in the drawing. The construction and operation of the remaining stages will be obvious from the following description.

Pulses received on the conductors of cables 39, 201, 946 and 947 are delivered through OR circuits 948 through 951 to cause flip-flops 942 through 945 to be set in their ONE state. In this way signals received from Memory, the Right IO Register, the Right Arithmetic Element or from the Clock Register may be stored in the Right Memory Buffer Register.

A pulse received on conductor 105 causes gates 952 through 955 to be sampled. Those gates are conditioned by their corresponding one of flip-flops 942 through 945 and deliver their outputs to the conductors of cable 956. In this way the signals stored in the Right Memory Buffer Register may be delivered to the Right Arithmetic Element.

A pulse received on conductor 67B causes gates 957 through 960 to be sampled. Those gates are conditioned by their corresponding one of flip-flops 942 through 945 and deliver their outputs to the conductors of cable 156. In this way the signals stored in the Right Memory Buffer Register may be transferred to the Address Register.

A pulse received on conductor 217B causes gates 961 through 964 to be sampled. Those gates are conditioned by their corresponding one of flip-flops 942 through 945 and deliver their outputs to the conductors of cable 44A. In this way the signals stored in the Right Memory Buffer Register may be transferred to the Right IO Register.

Flip-flops 942 to 945 have their ZERO outputs delivered to the Memory Element by way of the conductors of cable 42.

Selection and IO Control Element

The Selection and IO Control Element, as its name implies, is a group of logical circuits whose primary function is to select an input or an output device and to control the transfer of information between the selected device and the Memory Element of the computer system. Since those logical circuits are, for the most part, independent in operation they will be described separately according to the operations performed.

Reference is now made to FIGS. 23a through 23d which, when arranged according to FIG. 23 illustrate in logical block form those circuits known as the Selection and IO Control Element.

During the *Select drums* instruction the following signals are received by the Selection and IO Control Element in the following time order:

TABLE 17

| | Conductor |
|---|---|
| Clear Index Interval Register | 63B. |
| Bits 10–15 of Instruction | Conductors of cable 48. |
| Deselect | 93. |
| Select Pulse for Drums | 88. |

The Clear Index Interval Register command 63B followed by the bits 10–15 of the instruction word cause those bits to be stored in an index interval register 1000. The deselect command 93 causes various flip-flops in the Selection and IO Control Element to be cleared to their ZERO state. The particular ones which are cleared by this command will be apparent from an inspection of the drawing. Bits 10–15 of the instruction which are stored in the index interval register are a code which indicates not only the input-output device to be selected but also in the case where a drum is selected to read, what type of reading is to take place. In the event that the index interval code is octal 35, this code being delivered from the index interval register 1000 by way of the conductors of a cable 1001 to a selection decoder 1002, causes the conductor labeled 011, 101 to be made positive. When that conductor is positive a gate 1003 is conditioned.

The command select pulse for drums (88) samples a group of gates 1004 thereby delivering signals in the form of pulses to the conductors of cable 160A and these signals are representative of the index interval part of the Select Drums instruction which is now stored in the index interval register 1000. This command 88 also causes a "drum operate" flip-flop 1005 and a "slot" flip-flop 1006 to each be set in their ONE state and also the gate 1003 is sampled which, if conditioned, passes the pulse to the set input of a flip-flop 1007.

During the *Read instruction* the Selection and IO Control Element receives the following commands in the order stated:

TABLE 18

| Command: | Conductor |
|---|---|
| Set IO Interlock ON | 80B |
| Sense IO Word Counter | 82 |
| PT–6 on Read | 86 |

The Command Set IO Interlock ON (80B) causes an "IO Buffer Status" flip-flop 1008 to be set in its ZERO state, an "IO Register Status" flip-flop 1009 to be set in its ZERO state, an "IO Interlock" flip-flop 1010 to be set in its ONE state and this command is also delivered through an OR circuit 1042 to the conductor 162 (Clear IO Buffer Register).

The command "Sense IO Word Counter" (82) causes a "Sense Word Counter" flip-flop 1015 to be set in its ONE state. The command "PT–6 on Read" (86) causes flip-flop 1015 to be cleared to its ZERO state. Flip-flop 1015 is therefore in its ONE state for the time period between the command "Sense IO Word Counter" (82) and the command "Pt–6 on Read" (86). If during that time period a pulse is received on the conductor 175 (IO Word Counter End Carry) then a gate 1016 (conditioned by the ONE output of flip-flop 1015) will pass the pulse through an OR circuit 1017 whose output is passed through OR circuits 1153 and 1018 to the conductor 174 (Clear IO Interlock). The pulse passed by OR circuit 1017 also causes the "IO Interlock" flip-flop 1010 to be cleared to its ZERO state. The command "PT–6 on Read" (86) samples a gate 1019 which is conditioned by the ONE output of an "IO Word Counter Status" flip-flop 1020. Flip-flop 1020 is set in the ONE state by the command "Set IO Interlock ON" (80B) and is cleared by a pulse on conductor 175 (IO Word Counter End Carry). A pulse passed by gate 1019 causes a "Read" flip-flop 1021 to be set in the ONE state and this flip-flop is cleared to the ZERO state by the command "Set IO Interlock ON" (80B). If the IO Word Counter Status flip-flop 1020 is not set to its ZERO state between the time period between the commands "Set IO Interlock ON" (80B) and "PT–6 on Read" (86) then the "Read" flip-flop will be set in its ONE state at the completion of the Read instruction.

The command "PT–6 on Read" (86) also samples another gate 1022 which is conditioned by the output of an AND circuit 1023. AND circuit 1023 receives the ONE output of the "IO Word Counter Status" flip-flop 1020 and the ONE output of the "Drum Operate" flip-flop 1005. The "PT–6 on Read" command 86 will therefore be delivered to the conductor 177 (Start Read Drums) if the IO Word Counter Status is not equal to ZERO and the "Drum Operate" flip-flop is ON.

*Word transfers from drum to memory* may take place after the completion of the Select Drums and Read instructions. Each time a word is transferred from the drum to the IO Buffer Registers, a pulse is received on conductor 182 (compare) by the Selection and IO Control Element provided that the word read is the first word of a message. This pulse on conductor 182 causes an "accept" flip-flop 1024 to be set in the ONE state and this pulse is also delivered through a suitable delay circuit 1025 to sample a gate 1026 which is conditioned by the ONE output of flip-flop 1007. In the case that the index interval specifies the octal code 35 (011, 101), meaning that the read operation is to compare by identity of bits 1 through 3, then gate 1026 will pass the pulse to conductor 183 (compare by Identity 1–3). This pulse on conductor 183 is delayed by delay circuit 1025 long enough to insure that the flip-flops of the IO Buffer Register have had time to settle after having received the word read from the drum.

Each time that a word is delivered from the drums to the IO Buffer Register a pulse is received by the Selection and IO Control Element on the conductor labeled IO Buffer Loading. This pulse is received if the word read is the first or the second word of the message. This pulse is delivered through a delay circuit 1030 and an OR circuit 1031 to cause a flip-flop 1032 to be set in the ONE state thereby conditioning a gate 1033 to pass the next received pulse on the conductor labeled 2 mc. and set a flip-flop 1034 in the ONE state. Flip-flop 1034, when in the ONE state, conditions a gate 1035 to pass the next received 2 mc. pulse which clears flip-flops 1034 and 1032 and also samples a gate 1036 and another gate 1037. Flip-flops 1032, 1034 and gates 1033 and 1035 form a synchronizing circuit for synchronizing the IO Buffer Loading pulse, which occurs at drum timing, with the computer timing which is controlled by the 2 mc. pulses. Gate 1036 is not conditioned during drum reading operations; however, during a drum operation flip-flop 1005 is in its ONE state, as above described, conditioning gate 1037 and the synchronized IO Buffer Loading pulse is passed to sample a gate 1038 as well as a gate 1039.

Assuming that the first word being transferred from the drum to the IO Buffer Register is not the first word of a two word message, then the IO Buffer Loading pulse will not be accompanied by a pulse on the conductor 182 (compare). In that case the pulse passed by gate 1037 will be passed by gate 1038 to sample a gate 1040. Gate 1040 is conditioned by the ONE output of the previously mentioned flip-flop 1006 which is set in its ONE state during the Select Drums instruction. The pulse will therefore be passed by gate 1040 through an OR circuit 1041 to conductor 186 (no compare). The pulse passed by gate 1038 is also delivered through an OR circuit 1042 to conductor 162 (Clear IO Buffer Register).

If the word being transferred from the drum to the IO Buffer registers is the first word of a two-word message, then the IO Buffer Loading pulse will be accompanied by a pulse on conductor 182 (compare). The IO Buffer Loading pulse is delayed by the previously mentioned delay circuit 1030 for a suitable length of time to permit a comparison of the word with the drum control register. If the comparison is not successful, a pulse will be received on the conductor 185 (no compare) which will be delivered through an OR circuit 1043 to clear the Accept flip-flop 1024 and through the OR circuit 1041 to the conductor 186 (no compare). The delayed and synchronized IO Buffer Loading pulse, which is passed by gate 1037, is passed by gate 1038 when the comparison is not successful and this pulse is delivered through the OR circuit 1042 whose output is delivered to the conductor 162 (clear IO Buffer Register). If the comparison is successful, no pulse will be received on conductor 185 (no compare) and since the "accept" flip-flop 1024 is set in the ONE state by the pulse on conductor 182 (compare) the pulse passed by gate 1037 is passed by gate 1039 by way of a conductor 1044 (FIGS. 11*d*, 11*c*, 11*a*, 11*b*) and through an OR circuit 1045 to conductor 176 (Add One to IO Word Counter). The pulse passed by gate 1039 (FIG. 11*d*) is also delivered through an OR circuit 1046 to set the "IO Buffer Register Status" flip-flop 1008 to the ONE state.

The "IO Buffer Register Status" flip-flop 1008, when in the ONE state (indicating a full condition of the IO Buffer Register), conditions one leg of a two input AND circuit 1047 which has as its other input the ZERO output of the "IO Register Status" flip-flop 1009. The output of AND circuit 1047 will therefore condition a gate 1048 when the IO Buffer Register is full and the IO Register is empty. Gate 1048 is sampled by 2 mc. pulses and, when conditioned, passes the first of these pulses to the conductor 187 (IO Buffer Registers to IO Registers and Clear IO Buffer Registers). This first pulse passed by gate 1048 is also delivered through an OR circuit 1049 to the ZERO input of flip-flop 1008 and is also delivered through an OR circuit 1150 to the ONE input of the "IO Register Status" flip-flop 1009. This first pulse passed by gate 1048 is also delivered through an OR circuit 1051 to sample a gate 1052 which is conditioned by the ONE output of the "IO Word Counter Status" flip-flop 1020. The timing relationship is made such that a pulse which samples gate 1052 is bound to arrive at that gate before the "IO Word Counter Status" flip-flop 1020 can be changed to its ONE state in response to an "IO Word Counter End Carry" pulse on conductor 80B resulting from the pulse passed by gate 1039. A pulse passed by gate 1052 causes a "break request sync" flip-flop 1053 to be set in the ONE state to thereby condition a gate 1054 to pass 2 mc. pulses from delay circuit 1055. A pulse passed by gate 1054 causes a "break request" flip-flop 1056 to be set in the ONE state thereby conditioning a gate 1057. Gate 1057 is sampled by the command pulses "sense break request flip-flop" (192). A pulse passed by gate 1057 causes flip-flop 1053 to be cleared, a flip-flop 1058 to be set in the ONE state and also delivers the pulse to conductor 194 (Set break flip-flop). The ONE output of the "break" flip-flop 1058 conditions one leg of a two input AND circuit 1059, the other input of which is the ONE output of the "read" flip-flop 1021. The output of AND circuit 1059 is delivered by way of a conductor 1060 to the conditioning input of gates 1061, 1062, 1063 and 1064. Gate 1061, which is sampled by TP-1 pulses, delivers its output through an OR circuit 1065 to the ZERO input of the "Break Request" flip-flop 1056 so that the next command pulse "Sense break request flip-flop" (192) will cause the "break" flip-flop 1058 to be turned off and also causes a pulse to be delivered to a conductor 1066 (Clear break flip-flop) unless another pulse causes the "Break Request" flip-flop to be turned on again before that time. A pulse passed by gate 1061 is also delivered through an OR circuit 1067 to the conductor 195B (IO Address Counter to Memory Address Register).

A pulse passed by gate 1062 is delivered to conductors 196A (Add ONE to IO Address Counter), 196B (Clear IO Register Status flip-flop), 196C (Left IO Register to Left Memory Buffer Register and Clear Left IO Register), 196D (Right IO Register to Right Memory Buffer and Clear Right IO Register) and 196E (Inhibit Sample). A pulse passed by gate 1062 is also delivered through an OR circuit 1062A to the conductor 195A (Start Memory).

A pulse passed by gate 1063 during a drum reading operation is ineffective as will be apparent subsequently.

A pulse passed by gate 1064 is delivered through an OR circuit 1070 to sample a gate 1071. The ZERO output of the "IO Buffer Status" flip-flop 1008, the ZERO output of the "IO Register Status" flip-flop 1009 and the ZERO output of the "IO Word Counter Status" flip-flop 1020 are delivered through an AND circuit 1072 and an OR circuit 1073 to the conditioning input of gate 1071.

Gate 1071, which is sampled at BI-11 time, will therefore pass that pulse when the IO Buffer is empty and the word counter status is ZERO. A pulse passed by gate 1071 is delivered through OR circuit 1017 to cause the "IO Interlock" flip-flop 1010 to be turned off and this pulse is also delivered by way of conductor 174 to the Instruction Control Element.

The ONE output of the Drum Operate flip-flop 1005 (FIG. 23d) is delivered to an AND circuit 1075 (FIG. 23c), the other input of which is the ZERO output of the IO Word Counter Status flip-flop 1020. The output of AND circuit 1075 will therefore condition a gate 1076 to pass the next 2 mc. pulse to the conductor 1077 (Disconnect Drum) under the condition that the drum is selected and the IO Word Counter has gone to ZERO.

If the drum has made a complete revolution after having been selected, a pulse is received by the Selection and IO Control Element on the conductor 204 (Disconnect). A pulse on conductor 204 sets an IO Interlock Sync flip-flop 1078 in the ONE state to thereby condition a gate 1079 to pass the next 2 mc. delayed pulse. A pulse passed by gate 1079 is delivered through OR circuit 1153 to turn off the IO Interlock 1010 and is also delivered through OR circuit 1018 to the conductor 174 (Clear IO Interlock).

COMMAND GENERATORS

Reference is now made to FIGS. 24a through 24e which, when arranged end to end in that order, show in logical block form the Command Generator 53 of FIGS. 10a through 10c.

The gate circuits of FIGS. 24a through 24e are not illustrated in accordance with the conventions above recited since the maze of lines to illustrate conductors would tend to confuse rather than clarify the operation of those circuits. Each gate is shown with a D.C. level input which conditions that gate when positive. The pulse which samples a given gate is indicated by a legend within the block symbol for the gate, for example, gate 1300 is sampled by IP-1 pulses, gate 1301 is sampled by IP-6 pulses, etc.

The operation of the Command Generator will be obvious from an inspection of FIGS. 24a through 24e. For example, a positive D.C. level received on the conductor labeled PT causes the following commands to be generated at the times indicated:

TABLE 10

| Command Name | Conductor (Command) Number | Time |
|---|---|---|
| Program Counter to Memory Address Register. | 61 | PT-1. |
| Clear Address Register | 62 | PT-6. |
| Clear Left Operation Register | 63A | PT-6. |
| Clear Right Operation Register | 63B | PT-6. |
| Clear Step Counter and Divide TPD | 64 | PT-6. |
| Record Left Overflow | 65A | PT-6. |
| Record Right Overflow | 65B | PT-6. |
| Add ONE to Program Counter | 66 | PT-6. |
| Left Memory Buffer to Operation Register | 67A | PT-8. |
| Right Memory Buffer to Address Register | 67B | PT-8. |

From an inspection of FIGS. 24a through 24e it will be seen that in certain cases two or more gates are conditioned by the same D.C. level and those gates are sampled by the same pulse. From a logic circuit standpoint only one gate would have been required in such instances; however, for power considerations several gates are used. It will be understood that these power considerations may be satisfied in different ways, for example, one gate may be employed, the output of which could be suitably amplified by one or more pulse amplifiers. The duplication of gates as above indicated solves the logical and power considerations with fewer components and less space than when pulse amplifiers are employed.

CYCLE CONTROL CIRCUIT

Reference is now made to FIG. 25 which illustrates in logical block form the Cycle Control Circuits shown as block 54 in FIG. 10b. The Cycle Control Circuit is a group of flip-flops for control of the instruction cycles. Each flip-flop has its input and output conductors appropriately labeled and therefore no further description is required.

MEMORY UNIT SELECTION

Reference is now made to FIG. 26 which illustrates in logical block form the Memory Unit Selection Circuits shown as block 58 in FIG. 10c. The flip-flops 1310 and 1311 are both cleared by TP-0 pulses. When the Address Register 155 (FIG. 3b) receives a pulse on conductor 68 (Address Register to Memory Address Register) it delivers a pulse to conductor 1312 if the number stored in that register specifies one of the 4096 registers in the Memory Element, whereas it delivers a pulse to conductor 1313 if the number stored in the address register specifies the address of the Time Clock.

*Timing and Index Circuit*

Reference is now made to FIG. 27 which is a block schematic diagram of the Timing and Index Circuit shown as a block and accordingly labeled in FIG. 3f.

The signals of the timing channel of the drum 17 are sensed by the read head 19 whose output is delivered to a timing pulse generator 1550. The timing pulse generator 1550 is essentially a circuit which generates a 0.1 $\mu$sec. pulse on the conductor labeled DTP-1 at each positive-going zero crossing of the sine wave input signal and a 0.1 $\mu$sec. pulse on the conductor labeled DTP-3 at each negative-going zero crossing of the sine wave input signal.

The signals recorded in the Index Channel are sensed by read heads 20 and 21 whose outputs are delivered through read circuits 1551 and 1552, respectively, to the conditioning inputs of gates 1553 and 1554, respectively. When the index signal in the Index Channel is sensed by read head 20 it causes gate 1553 to be conditioned at such a time that a DTP–1 pulse is passed to the conductor labeled CD–IX. When the index signal in the Index Channel is sensed by read head 21 is causes gate 1554 to be conditioned at such a time that a DTP–3 pulse is passed to the conductor labeled OD–IX.

DTP–2 pulses are obtained by passing DTP–1 pulses through a 2.5 μsec. delay circuit 1555 and DTP–4 pulses are obtained by passing DTP–3 pulses through a 2.5 μsec. delay circuit 1556. Each DTP–3 pulse causes a flip-flop 1557 to be set in its ONE state and through a 1.7 μsec. delay circuit 1558 causes that flip-flop to return to its ZERO state. The negative pulse thereby produced at the ZERO output of flip-flop 1557 is delivered through a drum write driver 1559 to the conductor labeled Status Write Sample.

The various component circuits shown in FIG. 27 are shown and described in the above referred to copending application "A."

Detailed descriptions of other operations performed by the components of the system will be found in the following columns of the Thomas Patent No. 3,018,959 (Ref. I):

| Subject: | Column |
| --- | --- |
| Memory Buffer Registers Parity Count and Parity Check | 65–66 |
| Parity Check Control of Words Read From Drum | 71 |
| Initiation of Drum Writing Operations | 71–72 |
| Read Operation With IO Register Selected | 73 |
| Read Operation With Burst Time Counters (BTC) Selected | 74 |

Throughout the above description and in the drawings, very little reference has been given with respect to passive circuits in component circuits. Passive circuits such as cathode followers, pulse amplifiers, level setters and the like, must obviously be included between various of the component circuits. However, the characteristics of those passive circuits will largely be determined not only by the load component circuits but also by the length of conductors coupling a given logical circuit to its load logical circuit. For example, the various core stages illustrated and described herein require that sufficient current be supplied to the shift windings of those cores for a length of time sufficient to transfer signals from one stage to the next or for reading out the information in a given stage. Since core circuits respond to four conditions, that is, (1) number of turns on the core, (2) the current through the winding, (3) the length of time that the current flows, and (4) the rate of change of current, it will be obvious that in a specific design of an equipment constructed in accordance with the principles of this invention, the designer may use these variables in any way that he finds desirable. Furthermore, as described in the preceding section entitled "Conventions Employed" the various logical circuits respond to standard D.C. voltage levels of +10 and −30 volts and respond to pulse levels 20 to 40 volts in magnitude, and it will be obvious that various passive circuits will be required to attain these voltage requirements. These voltage requirements may be met by the use of conventional passive circuits such as level setters, cathode followers, current drivers and the like.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A data processing machine comprising a storage device having a plurality of signal storage registers, each storage register being capable of storing data signals and associated tag signals, means for randomly storing data signals and associated tag signals in said signal storage registers, said tag signals being individually recognizable, a receiving device, and a control means including means for recognizing individually each tag signal and responsive to said tag signals for causing an associated data signal to be delivered to said receiving device.

2. A data processing machine comprising a storage device having a plurality of signal storage registers each being capable of storing digital signals and associated tag signals, means for randomly storing data signals and associated tag signals in said signal storage registers, a receiving device, a control register having means to store predetermined signals and to produce control signals when there is a predetermined relationship between the stored predetermined signals and received tag signals, means for causing said tag signals to be delivered to said control register and means for causing said digital signals to be delivered to said receiving device upon receipt of said control signals from said control register.

3. A data processing machine comprising a storage device having a plurality of signal storage registers and status signal generating means for producing signals indicative of the empty and full status of the signal storage registers, each of said signal storage registers being capable of storing digital signals and associated tag signals, means for storing data signals and associated tag signals in said signal storage registers, a receiving device, a control register having means to store predetermined signals and to produce control signals when there is a predetermined relationship between the stored predetermined signals and received tag signals, and a control means responsive to full status signals from said status signal generating means for causing said tag signals to be delivered to said control register means, means including said control means and responsive to said control signals from said control register for causing the digital signals associated with the tag signal to be delivered to said receiving device and means including said control means and responsive to said control signals for causing said status signal generator to produce an empty status signal associated with the signal storage register from which signals are delivered to said receiving device.

4. Apparatus for the storage of information comprising a storage medium, means for applying information signals to said apparatus, means associated with said storage medium providing storage availability indicating signals for indicating a portion of said storage medium available for storing information signals, means responsive to said indicating means for entering the information signals in the available portion of said storage medium, a receiving device, and means sensing part of each information signal for selecting the entered information signals to be transferred to said receiving device.

5. Apparatus for the storage of information comprising a storage medium capable of storing information comprising data signals and associated tag signals, means associated with said storage medium for indicating a portion of said storage medium available for storing information signals, means responsive to said indicating means for entering the information signals in the available portion of said storage medium, a receiving device, and means responsive individually to each tag signal for causing an associated data signal to be transferred to said receiving device.

6. Apparatus for the storage of information comprising a storage medium having a plurality of signal storage registers, each capable of storing information signals and associated tag signals, means for storing information signals and associated tag signals in said signal storage registers, status signal generating means associated with said signal storage registers producing signals indicative of the empty and full status of said signal storage registers, control means storing predetermined signals and responsive to full status signals for comparing said tag signals with said predetermined signals to determine whethed there is a predetermined relationship between said tag signals and said predetermined signals, first means responsive to said control means for transmitting information signals when said predetermined relationship exists between said tag signals and said predetermined signals, and second means responsive to said control means for causing said status signal generating means to produce empty status signals when said predetermined relationship exists between said tag signals and said predetermined signals.

7. Storage equipment for electrical intelligence comprising a number of stores each capable of storing a related set of intelligence signals including an identification signal, means for randomly storing intelligence signals including an identification signal in said stores, reading means associated with said stores for scanning the intelligence signals stored in said stores, means independent of said stores for producing control signals, a comparator connected to said reading means and said control signal producing means for comparing said identification signal with said control signals to determine whether there is a predetermined relation between said identification signals and said control signals.

8. Storage equipment for electrical intelligence comprising a number of stores each capable of storing a related set of intelligence signals including an identification signal, reading means associated with said stores for scanning the intelligence signals stored in said stores, means for temporarily storing the intelligence signals read by said reading means, means independent of said stores for producing control signals, a comparator connected to said temporary storing means and said control signal producing means for comparing an identification signal stored in said temporary storing means with a control signal produced by said control signal producing means to determine whether there is a predetermined relation between said identification signal and said control signal, and means responsive to the operation of said comparator for performing a further operation in respect of a store when said comparator finds the said predetermined relation.

9. Storage equipment for electrical intelligence comprising a number of stores each capable of storing a related set of intelligence signals including an identification signal, reading means associated with said stores for scanning the intelligence signals stored in said stores, means for temporarily storing the intelligence signals read by said reading means, means independent of said stores for producing control signals, a comparator connected to said temporary storing means and to said means for producing control signals for comparing an identification signal stored in said temporary storing means with a control signal to determine whether there is a predetermined relation between said identification signal and said control signal and signal transmitting means responsive to said comparator for transmitting a further signal from said temporary storing means when said comparator finds the said predetermined relation.

References Cited in the file of this patent
UNITED STATES PATENTS

| | | |
|---|---|---|
| 2,614,169 | Cohen et al. | Oct. 14, 1952 |
| 2,679,638 | Bensky et al. | May 25, 1954 |
| 2,792,991 | Di Cambrio | May 21, 1957 |
| 2,847,657 | Hartley et al. | Aug. 12, 1958 |
| 2,914,248 | Ross et al. | Nov. 24, 1959 |
| 2,916,210 | Selmer | Dec. 8, 1959 |
| 2,960,683 | Gregory et al. | Nov. 15, 1960 |
| 2,969,525 | Hill | Jan. 24, 1961 |
| 2,978,175 | Newman et al. | Apr. 4, 1961 |
| 3,001,708 | Glaser et al. | Sept. 26, 1961 |
| 3,014,660 | Patterson et al. | Dec. 26, 1961 |

FOREIGN PATENTS

| | | |
|---|---|---|
| 1,099,467 | France | Mar. 23, 1955 |
| 749,836 | Great Britain | June 6, 1956 |

UNITED STATES PATENT OFFICE
CERTIFICATE OF CORRECTION

Patent No. 3,170,142                      February 16, 1965

Morton M. Astrahan et al.

It is hereby certified that error appears in the above numbered patent requiring correction and that the said Letters Patent should read as corrected below.

In the heading to the sheets of drawings, line 2, and in the heading to the printed specification, line 2, for "DATA PROCESSING MACHINE", each occurrence, read -- TAG RETRIEVAL OF RANDOMLY STORED INFORMATION --; column 1, line 53, for "accompanying" read -- accompany --; column 4, line 22, for "that" read -- than --; column 9, line 29, for "3b" read -- 3h --; column 11, line 43, for "the" read -- that --; column 12, line 44, for "including" read -- indicating --; column 13, line 4, for "indicated" read -- indicate --; column 16, line 32, strike out "of", first occurrence; line 67, for "necesary" read -- necessary --; column 21, line 41, for "conductor" read -- conductors --; column 28, TABLE 15, second column, line 4 thereof, for "Rexuest" read -- Request --; column 33, line 28, for "order" read -- orders --; column 41, line 9, for "is", second occurrence, read -- it --; column 43, line 10, for "whethed" read -- whether --.

Signed and sealed this 24th day of January 1967.

(SEAL)
Attest:

ERNEST W. SWIDER
Attesting Officer

EDWARD J. BRENNER
                                             Commissioner of Patents